US010073428B2

(12) United States Patent
Bruhn et al.

(10) Patent No.: US 10,073,428 B2
(45) Date of Patent: Sep. 11, 2018

(54) METHODS AND SYSTEMS FOR CONTROL OF HOME AUTOMATION ACTIVITY BASED ON USER CHARACTERISTICS

(71) Applicant: Echostar Technologies L.L.C., Englewood, CO (US)

(72) Inventors: Christopher William Bruhn, Aurora, CO (US); Frank Nafe, Denver, CO (US)

(73) Assignee: EchoStar Technologies International Corporation, Englewood, CO (US)

( * ) Notice: Subject to any disclaimer, the term of this patent is extended or adjusted under 35 U.S.C. 154(b) by 103 days.

(21) Appl. No.: 14/986,496

(22) Filed: Dec. 31, 2015

(65) Prior Publication Data
US 2017/0191695 A1    Jul. 6, 2017

(51) Int. Cl.
*G05B 19/042*    (2006.01)
*G05B 15/02*    (2006.01)
(Continued)

(52) U.S. Cl.
CPC .......... *G05B 19/042* (2013.01); *G05B 15/02* (2013.01); *H04L 12/2803* (2013.01);
(Continued)

(58) Field of Classification Search
None
See application file for complete search history.

(56) References Cited

U.S. PATENT DOCUMENTS

| 3,803,575 | A | 4/1974 | Gotanda |
| 4,127,966 | A | 12/1978 | Schmidt |
| 4,386,436 | A | 5/1983 | Kocher et al. |
| 4,581,606 | A | 4/1986 | Mallory |
| 4,694,607 | A | 9/1987 | Ishida et al. |
| 4,728,949 | A | 3/1988 | Platte et al. |
| 4,959,713 | A | 9/1990 | Morotomi et al. |
| 5,400,246 | A | 3/1995 | Wilson et al. |
| 5,770,896 | A | 6/1998 | Nakajima |

(Continued)

FOREIGN PATENT DOCUMENTS

| CA | 2 267 988 A1 | 4/1998 |
| CH | 702136 B1 | 5/2011 |

(Continued)

OTHER PUBLICATIONS

"Acoustic/Ultrasound Ultrasonic Flowmeter Basics," Questex Media Group LLC, accessed on Dec. 16, 2014, 4 pages. Retrieved from http://www.sensorsmag.com/sensors/acoustic-ultrasound/ultrasonic-flowmeter-basics-842.

(Continued)

*Primary Examiner* — Dennis M Butler
(74) *Attorney, Agent, or Firm* — Kilpatrick Townsend & Stockton LLP

(57) ABSTRACT

The present technology relates to systems and methods for control of home automation activity based on user preferences. More specifically, the present technology relates to using a home automation system to control home automation activity based on user preferences. Example embodiments include receiving an input from a user including a set of preferences, generating a user profile using the set of preferences, receiving data indicating that a mobile device has moved from a first location to a second location, transmitting the user profile to the mobile device for application to the home automation system, receiving data indicating that the mobile device has been at the second location for a period of time, comparing the period of time to a predetermined threshold period of time, and applying the home automation settings associated with the second location to the home automation system.

18 Claims, 19 Drawing Sheets

(51) Int. Cl.
*H04L 29/06* (2006.01)
*H04L 12/28* (2006.01)
*H04N 21/41* (2011.01)
*H04N 21/4227* (2011.01)
*H04N 21/475* (2011.01)

(52) U.S. Cl.
CPC ......... *H04L 65/00* (2013.01); *H04N 21/4126* (2013.01); *H04N 21/4131* (2013.01); *H04N 21/4227* (2013.01); *H04N 21/4755* (2013.01); *G05B 2219/23238* (2013.01); *G05B 2219/2614* (2013.01); *G05B 2219/2642* (2013.01)

(56) References Cited

U.S. PATENT DOCUMENTS

| | | |
|---|---|---|
| 5,805,442 A | 9/1998 | Crater et al. |
| 5,822,012 A | 10/1998 | Jeon et al. |
| 5,886,638 A | 3/1999 | Tanguay |
| 5,894,331 A | 4/1999 | Yang |
| 5,926,090 A | 7/1999 | Taylor et al. |
| 5,970,030 A | 10/1999 | Dimitri et al. |
| 6,081,758 A | 6/2000 | Parvulescu |
| 6,104,334 A | 8/2000 | Allport |
| 6,107,918 A | 8/2000 | Klein et al. |
| 6,107,935 A | 8/2000 | Comerford et al. |
| 6,111,517 A | 8/2000 | Atick et al. |
| 6,119,088 A | 9/2000 | Ciluffo |
| 6,142,913 A | 11/2000 | Ewert |
| 6,182,094 B1 | 1/2001 | Humpleman et al. |
| 6,225,938 B1 | 5/2001 | Hayes et al. |
| 6,286,764 B1 | 9/2001 | Garvey et al. |
| 6,330,621 B1 | 12/2001 | Bakke et al. |
| 6,337,899 B1 | 1/2002 | Alcendor et al. |
| 6,377,858 B1 | 4/2002 | Koeppe |
| 6,405,284 B1 | 6/2002 | Bridge |
| 6,415,257 B1 | 7/2002 | Jungua et al. |
| 6,445,287 B1 | 9/2002 | Schofield et al. |
| 6,502,166 B1 | 12/2002 | Cassidy |
| 6,529,230 B1 | 3/2003 | Chong |
| 6,543,051 B1 | 4/2003 | Manson et al. |
| 6,553,375 B1 | 4/2003 | Huang et al. |
| 6,663,375 B1 | 8/2003 | Huang et al. |
| 6,646,676 B1 | 11/2003 | DaGraca et al. |
| 6,662,282 B2 | 12/2003 | Cochran |
| 6,744,771 B1 | 6/2004 | Barber et al. |
| 6,748,343 B2 | 6/2004 | Alexander et al. |
| 6,751,657 B1 | 6/2004 | Zothner |
| 6,756,998 B1 | 6/2004 | Bilger |
| 6,792,319 B1 | 9/2004 | Bilger |
| 6,876,889 B1 | 4/2005 | Lortz et al. |
| 6,891,838 B1 | 5/2005 | Petite et al. |
| 6,931,104 B1 | 8/2005 | Foster et al. |
| 6,976,187 B2 | 12/2005 | Arnott et al. |
| 6,989,731 B1 | 1/2006 | Kawai et al. |
| 7,009,528 B2 | 3/2006 | Griep |
| 7,010,332 B1 | 3/2006 | Irvin et al. |
| 7,081,830 B2 | 7/2006 | Shimba et al. |
| 7,082,359 B2 | 7/2006 | Breed |
| 7,088,238 B2 | 8/2006 | Karaoguz et al. |
| 7,103,545 B2 | 9/2006 | Furuta |
| 7,143,298 B2 | 11/2006 | Wells et al. |
| 7,216,002 B1 * | 5/2007 | Anderson ............... G05B 15/02 340/539.13 |
| 7,234,074 B2 | 6/2007 | Cohn et al. |
| 7,260,538 B2 | 8/2007 | Calderone et al. |
| 7,346,917 B2 | 3/2008 | Gatto et al. |
| 7,372,370 B2 | 5/2008 | Stults et al. |
| 7,386,666 B1 | 6/2008 | Beauchamp et al. |
| 7,391,319 B1 | 6/2008 | Walker |
| 7,395,369 B2 | 7/2008 | Sepez et al. |
| 7,395,546 B1 | 7/2008 | Asmussen |
| 7,529,677 B1 | 5/2009 | Wittenberg |
| 7,574,494 B1 | 8/2009 | Mayernick et al. |
| 7,579,945 B1 | 8/2009 | Richter et al. |
| 7,590,703 B2 | 9/2009 | Cashman et al. |
| 7,640,351 B2 | 12/2009 | Reckamp et al. |
| 7,659,814 B2 | 2/2010 | Chen et al. |
| 7,694,005 B2 | 4/2010 | Reckamp et al. |
| 7,739,718 B1 | 6/2010 | Young et al. |
| 7,861,034 B2 | 12/2010 | Yamamoto et al. |
| 7,870,232 B2 | 1/2011 | Reckamp et al. |
| 7,945,297 B2 | 5/2011 | Philipp |
| 7,969,318 B2 | 6/2011 | White et al. |
| 8,013,730 B2 | 9/2011 | Oh et al. |
| 8,042,048 B2 | 10/2011 | Wilson et al. |
| 8,086,757 B2 | 12/2011 | Chang |
| 8,106,768 B2 | 1/2012 | Neumann |
| 8,156,368 B2 | 4/2012 | Chambliss et al. |
| 8,171,148 B2 | 4/2012 | Lucas et al. |
| 8,179,248 B2 | 5/2012 | Eakle, Jr. |
| 8,180,735 B2 | 5/2012 | Ansari et al. |
| 8,201,261 B2 | 6/2012 | Barfield et al. |
| 8,221,290 B2 | 7/2012 | Vincent et al. |
| 8,275,143 B2 | 9/2012 | Johnson |
| 8,289,157 B2 | 10/2012 | Patenaude et al. |
| 8,290,545 B2 | 10/2012 | Terlizzi |
| 8,310,335 B2 | 11/2012 | Sivakkolundhu |
| 8,316,413 B2 | 11/2012 | Crabtree |
| 8,320,578 B2 | 11/2012 | Kahn et al. |
| 8,335,312 B2 | 12/2012 | Gerhardt et al. |
| 8,350,694 B1 | 1/2013 | Trundle et al. |
| 8,355,886 B2 | 1/2013 | Ollivier et al. |
| 8,413,204 B2 | 4/2013 | White et al. |
| 8,436,902 B2 | 5/2013 | Kuehnle |
| 8,498,572 B1 | 7/2013 | Schooley et al. |
| 8,516,087 B2 | 8/2013 | Wilson et al. |
| 8,533,144 B1 | 9/2013 | Reeser et al. |
| 8,539,567 B1 | 9/2013 | Logue et al. |
| 8,550,368 B2 | 10/2013 | Butler et al. |
| 8,619,136 B2 | 12/2013 | Howarter et al. |
| 8,620,841 B1 | 12/2013 | Filson et al. |
| 8,644,525 B2 | 2/2014 | Bathurst et al. |
| 8,645,327 B2 | 2/2014 | Falkenburg et al. |
| 8,667,529 B2 | 3/2014 | Taxier |
| 8,750,576 B2 | 6/2014 | Huang et al. |
| 8,780,201 B1 | 7/2014 | Scalisi et al. |
| 8,781,508 B1 | 7/2014 | Blakely |
| 8,786,698 B2 | 7/2014 | Chen et al. |
| 8,799,413 B2 | 8/2014 | Taylor et al. |
| 8,818,898 B2 | 8/2014 | Schlossberg et al. |
| 8,898,709 B2 | 11/2014 | Crabtree |
| 8,923,823 B1 | 12/2014 | Wilde |
| 8,930,700 B2 | 1/2015 | Wielopolski |
| 8,948,793 B1 | 2/2015 | Birkhold et al. |
| 8,965,170 B1 | 2/2015 | Benea et al. |
| 9,019,111 B1 | 4/2015 | Sloo et al. |
| 9,049,567 B2 | 6/2015 | Le Guen et al. |
| 9,191,804 B1 | 11/2015 | Paczkowski et al. |
| 9,237,141 B2 | 1/2016 | Logue et al. |
| 9,246,921 B1 | 1/2016 | Vlaminck et al. |
| 9,258,593 B1 | 2/2016 | Chen et al. |
| 9,286,482 B1 | 3/2016 | Dumont et al. |
| 9,338,054 B2 | 5/2016 | Russell |
| 9,347,242 B2 | 5/2016 | Cregg et al. |
| 9,353,500 B1 | 5/2016 | Andreski |
| 9,443,142 B2 | 9/2016 | Reynolds, Jr. |
| 9,462,041 B1 | 10/2016 | Hagins et al. |
| 9,495,860 B2 | 11/2016 | Lett |
| 9,511,259 B2 | 12/2016 | Mountain |
| 9,589,448 B1 | 3/2017 | Schneider et al. |
| 9,599,981 B2 | 3/2017 | Crabtree |
| 9,621,959 B2 | 4/2017 | Mountain |
| 9,628,286 B1 | 4/2017 | Nguyen et al. |
| 9,632,746 B2 | 4/2017 | Keipert et al. |
| 9,633,186 B2 | 4/2017 | Ingrassia, Jr. et al. |
| 9,729,989 B2 | 8/2017 | Marten |
| 9,769,522 B2 | 9/2017 | Richardson |
| 9,772,612 B2 | 9/2017 | McCarthy et al. |
| 9,798,309 B2 | 10/2017 | Tirpak |
| 9,824,578 B2 | 11/2017 | Burton et al. |
| 9,835,434 B1 | 12/2017 | Sloo et al. |
| 9,838,736 B2 | 12/2017 | Smith et al. |
| 9,882,736 B2 | 1/2018 | Lett |

(56) References Cited

U.S. PATENT DOCUMENTS

| | | |
|---|---|---|
| 9,888,129 B2 | 2/2018 | Russell |
| 9,900,177 B2 | 2/2018 | Holley |
| 9,912,492 B2 | 3/2018 | McCarthy et al. |
| 2001/0012998 A1 | 8/2001 | Jouet et al. |
| 2002/0003493 A1 | 1/2002 | Durst et al. |
| 2002/0019725 A1 | 2/2002 | Petite |
| 2002/0063633 A1 | 5/2002 | Park |
| 2002/0080238 A1 | 6/2002 | Ohmura |
| 2002/0193989 A1 | 12/2002 | Geilhufe et al. |
| 2003/0005431 A1 | 1/2003 | Shinohara |
| 2003/0052789 A1 | 3/2003 | Colmenarez et al. |
| 2003/0097452 A1 | 5/2003 | Kim et al. |
| 2003/0126593 A1 | 7/2003 | Mault |
| 2003/0133551 A1 | 7/2003 | Kahn |
| 2003/0140352 A1 | 7/2003 | Kim |
| 2003/0154242 A1 | 8/2003 | Hayes et al. |
| 2003/0192600 A1 | 10/2003 | Ford |
| 2003/0201900 A1 | 10/2003 | Bachinski et al. |
| 2004/0019489 A1 | 1/2004 | Funk et al. |
| 2004/0036579 A1 | 2/2004 | Megerle |
| 2004/0117038 A1 | 6/2004 | Karaoguz et al. |
| 2004/0117843 A1 | 6/2004 | Karaoguz et al. |
| 2004/0121725 A1 | 6/2004 | Matsui |
| 2004/0128034 A1 | 7/2004 | Lenker et al. |
| 2004/0143838 A1 | 7/2004 | Rose |
| 2004/0148419 A1 | 7/2004 | Chen et al. |
| 2004/0148632 A1 | 7/2004 | Park et al. |
| 2004/0260407 A1 | 12/2004 | Wimsatt |
| 2004/0266419 A1 | 12/2004 | Arling et al. |
| 2005/0038875 A1 | 2/2005 | Park |
| 2005/0049862 A1 | 3/2005 | Choi et al. |
| 2005/0106267 A1 | 5/2005 | Frykman et al. |
| 2005/0159823 A1 | 7/2005 | Hayes et al. |
| 2005/0188315 A1 | 8/2005 | Campbell et al. |
| 2005/0200478 A1 | 9/2005 | Koch et al. |
| 2005/0245292 A1 | 11/2005 | Bennett et al. |
| 2005/0252622 A1 | 11/2005 | Reid |
| 2005/0264698 A1 | 12/2005 | Eshleman |
| 2005/0289614 A1 | 12/2005 | Baek et al. |
| 2006/0011145 A1 | 1/2006 | Kates |
| 2006/0059977 A1 | 3/2006 | Kates |
| 2006/0087428 A1 | 4/2006 | Wolfe et al. |
| 2006/0115156 A1 | 6/2006 | Nakajima et al. |
| 2006/0136968 A1 | 6/2006 | Han et al. |
| 2006/0143679 A1 | 6/2006 | Yamada et al. |
| 2006/0155389 A1 | 7/2006 | Pessolano et al. |
| 2006/0186740 A1 | 8/2006 | Von Gunten |
| 2006/0192680 A1 | 8/2006 | Scuka et al. |
| 2006/0244624 A1 | 11/2006 | Wang et al. |
| 2006/0253894 A1 | 11/2006 | Bookman et al. |
| 2007/0044119 A1 | 2/2007 | Sullivan et al. |
| 2007/0078910 A1 | 4/2007 | Bopardikar |
| 2007/0129220 A1 | 6/2007 | Bardha |
| 2007/0135225 A1 | 6/2007 | Nieminen et al. |
| 2007/0142022 A1 | 6/2007 | Madonna et al. |
| 2007/0146545 A1 | 6/2007 | Iwahashi |
| 2007/0150460 A1 | 6/2007 | Evans |
| 2007/0157258 A1 | 7/2007 | Jung et al. |
| 2007/0192486 A1 | 8/2007 | Wilson et al. |
| 2007/0194922 A1 | 8/2007 | Nathan et al. |
| 2007/0256085 A1 | 11/2007 | Reckamp et al. |
| 2007/0271518 A1 | 11/2007 | Tischer et al. |
| 2007/0275670 A1 | 11/2007 | Chen et al. |
| 2007/0279244 A1 | 12/2007 | Haughawout et al. |
| 2007/0280504 A1 | 12/2007 | Badawy et al. |
| 2008/0019392 A1 | 1/2008 | Lee |
| 2008/0021971 A1 | 1/2008 | Halgas |
| 2008/0022322 A1 | 1/2008 | Grannan et al. |
| 2008/0046930 A1 | 2/2008 | Smith et al. |
| 2008/0062258 A1 | 3/2008 | Bentkovski et al. |
| 2008/0062965 A1 | 3/2008 | Silva et al. |
| 2008/0092199 A1 | 4/2008 | McCarthy et al. |
| 2008/0109095 A1 | 5/2008 | Braithwaite et al. |
| 2008/0114963 A1 | 5/2008 | Cannon et al. |
| 2008/0120639 A1 | 5/2008 | Walter et al. |
| 2008/0123825 A1 | 5/2008 | Abramson et al. |
| 2008/0140736 A1 | 6/2008 | Jarno |
| 2008/0144884 A1 | 6/2008 | Habibi |
| 2008/0163330 A1 | 7/2008 | Sparrell |
| 2008/0179053 A1 | 7/2008 | Kates |
| 2008/0236214 A1 | 10/2008 | Han |
| 2008/0278635 A1 | 11/2008 | Hardacker et al. |
| 2008/0284905 A1 | 11/2008 | Chuang |
| 2008/0288876 A1 | 11/2008 | Fleming |
| 2008/0297660 A1 | 12/2008 | Shioya |
| 2009/0023554 A1 | 1/2009 | Shim |
| 2009/0027225 A1 | 1/2009 | Farley |
| 2009/0033505 A1 | 2/2009 | Jones et al. |
| 2009/0040013 A1 | 2/2009 | Ebrom et al. |
| 2009/0066320 A1 | 3/2009 | Posey |
| 2009/0069038 A1 | 3/2009 | Olague et al. |
| 2009/0083374 A1 | 3/2009 | Saint Clair |
| 2009/0112541 A1 | 4/2009 | Anderson et al. |
| 2009/0138507 A1 | 5/2009 | Burckart et al. |
| 2009/0146834 A1 | 6/2009 | Huang |
| 2009/0165069 A1 | 6/2009 | Kirchner |
| 2009/0167555 A1 | 7/2009 | Kohanek |
| 2009/0190040 A1 | 7/2009 | Watanabe et al. |
| 2009/0235992 A1 | 9/2009 | Armstrong |
| 2009/0249428 A1 | 10/2009 | White et al. |
| 2009/0270065 A1 | 10/2009 | Hamada et al. |
| 2009/0271203 A1 | 10/2009 | Resch et al. |
| 2009/0286654 A1 | 11/2009 | Rice |
| 2009/0307715 A1 | 12/2009 | Santamaria et al. |
| 2010/0031286 A1 | 2/2010 | Gupta et al. |
| 2010/0045471 A1 | 2/2010 | Meyers |
| 2010/0046918 A1 | 2/2010 | Takao et al. |
| 2010/0066507 A1 | 3/2010 | Myllymaki |
| 2010/0083371 A1 | 4/2010 | Bennetts et al. |
| 2010/0097225 A1 | 4/2010 | Petricoin, Jr. |
| 2010/0102082 A1 | 4/2010 | Ebrom et al. |
| 2010/0122284 A1 | 5/2010 | Yoon et al. |
| 2010/0131280 A1 | 5/2010 | Bogineni |
| 2010/0138007 A1 | 6/2010 | Clark et al. |
| 2010/0138858 A1 | 6/2010 | Velazquez et al. |
| 2010/0146445 A1 | 6/2010 | Kraut |
| 2010/0161082 A1 | 6/2010 | Ebrom et al. |
| 2010/0164732 A1 | 7/2010 | Wedig et al. |
| 2010/0211546 A1 | 8/2010 | Grohman et al. |
| 2010/0277300 A1 | 11/2010 | Cohn et al. |
| 2010/0283579 A1 | 11/2010 | Kraus et al. |
| 2010/0309004 A1 | 12/2010 | Grundler et al. |
| 2010/0321151 A1 | 12/2010 | Matsuura et al. |
| 2011/0003665 A1 | 1/2011 | Burton et al. |
| 2011/0018693 A1 | 1/2011 | Lim et al. |
| 2011/0030016 A1 | 2/2011 | Pino et al. |
| 2011/0032423 A1 | 2/2011 | Jing et al. |
| 2011/0093126 A1 | 4/2011 | Toba et al. |
| 2011/0119325 A1 | 5/2011 | Paul et al. |
| 2011/0139076 A1 | 6/2011 | Pu et al. |
| 2011/0140832 A1 | 6/2011 | Vinkenvleugel et al. |
| 2011/0150432 A1 | 6/2011 | Paul et al. |
| 2011/0156862 A1 | 6/2011 | Langer |
| 2011/0157468 A1 | 6/2011 | Dai |
| 2011/0167250 A1 | 7/2011 | Dicks et al. |
| 2011/0187928 A1 | 8/2011 | Crabtree |
| 2011/0187930 A1 | 8/2011 | Crabtree |
| 2011/0187931 A1 | 8/2011 | Kim |
| 2011/0202956 A1 | 8/2011 | Connelly et al. |
| 2011/0267180 A1 | 11/2011 | Ferringo et al. |
| 2011/0270549 A1 | 11/2011 | Jeansonne et al. |
| 2011/0282837 A1 | 11/2011 | Gounares et al. |
| 2011/0283311 A1 | 11/2011 | Luong |
| 2011/0285528 A1 | 11/2011 | Weinstein et al. |
| 2011/0295396 A1 | 12/2011 | Chinen et al. |
| 2011/0296463 A1 | 12/2011 | Suslov |
| 2012/0019388 A1 | 1/2012 | Kates et al. |
| 2012/0047083 A1 | 2/2012 | Qiao et al. |
| 2012/0047532 A1 | 2/2012 | McCarthy |
| 2012/0059495 A1 | 3/2012 | Weiss et al. |
| 2012/0069246 A1 | 3/2012 | Thornberry et al. |
| 2012/0092183 A1 | 4/2012 | Corbett et al. |
| 2012/0094696 A1 | 4/2012 | Ahn et al. |
| 2012/0105724 A1 | 5/2012 | Candelore |

(56) References Cited

U.S. PATENT DOCUMENTS

| | | |
|---|---|---|
| 2012/0124245 A1 | 5/2012 | Reeves et al. |
| 2012/0124456 A1 | 5/2012 | Perez et al. |
| 2012/0154108 A1 | 6/2012 | Sugaya |
| 2012/0154138 A1 | 6/2012 | Cohn et al. |
| 2012/0164975 A1 | 6/2012 | Dodeja et al. |
| 2012/0167646 A1 | 7/2012 | Sharma et al. |
| 2012/0206269 A1 | 8/2012 | Wickman et al. |
| 2012/0226366 A1 | 9/2012 | Lee et al. |
| 2012/0226768 A1 | 9/2012 | Gaines et al. |
| 2012/0271472 A1 | 10/2012 | Brunner et al. |
| 2012/0271670 A1 | 10/2012 | Zaloom |
| 2012/0280802 A1 | 11/2012 | Yoshida et al. |
| 2012/0291068 A1 | 11/2012 | Khushoo et al. |
| 2012/0314713 A1 | 12/2012 | Singh et al. |
| 2012/0316876 A1 | 12/2012 | Jang et al. |
| 2012/0326835 A1 | 12/2012 | Cockrell et al. |
| 2013/0006400 A1 | 1/2013 | Caceres et al. |
| 2013/0013106 A1 | 1/2013 | Carelli et al. |
| 2013/0031037 A1 | 1/2013 | Brandt et al. |
| 2013/0046800 A1 | 2/2013 | Assi et al. |
| 2013/0049950 A1 | 2/2013 | Wohlert |
| 2013/0053063 A1 | 2/2013 | McSheffrey |
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |
| 2013/0120137 A1 | 5/2013 | Lehmann |
| 2013/0124192 A1 | 5/2013 | Lindmark et al. |
| 2013/0138757 A1 | 5/2013 | Ferron |
| 2013/0147604 A1 | 6/2013 | Jones et al. |
| 2013/0152139 A1 | 6/2013 | Davis et al. |
| 2013/0158717 A1 | 6/2013 | Zywicki et al. |
| 2013/0166073 A1 | 6/2013 | Pine et al. |
| 2013/0179926 A1 | 7/2013 | White et al. |
| 2013/0185750 A1 | 7/2013 | Ayoub |
| 2013/0204408 A1 | 8/2013 | Thiruvengada et al. |
| 2013/0219482 A1 | 8/2013 | Brandt |
| 2013/0238326 A1 | 9/2013 | Kim et al. |
| 2013/0242074 A1 | 9/2013 | Sekiguchi et al. |
| 2013/0247117 A1 | 9/2013 | Yamada et al. |
| 2013/0249688 A1 | 9/2013 | Nguyen et al. |
| 2013/0267383 A1 | 10/2013 | Watterson |
| 2013/0278828 A1 | 10/2013 | Todd |
| 2013/0289788 A1 | 10/2013 | Gupta et al. |
| 2013/0300576 A1 | 11/2013 | Sinsuan et al. |
| 2013/0318559 A1 | 11/2013 | Crabtree |
| 2013/0321637 A1 | 12/2013 | Frank et al. |
| 2013/0324247 A1 | 12/2013 | Esaki et al. |
| 2013/0325150 A1 | 12/2013 | Bury |
| 2014/0022051 A1 | 1/2014 | Levien et al. |
| 2014/0025798 A1 | 1/2014 | Apte et al. |
| 2014/0028546 A1 | 1/2014 | Jeon et al. |
| 2014/0070959 A1 | 3/2014 | Bhargava et al. |
| 2014/0089671 A1 | 3/2014 | Logue et al. |
| 2014/0095684 A1 | 4/2014 | Nonaka et al. |
| 2014/0101465 A1 | 4/2014 | Wang et al. |
| 2014/0129006 A1 | 5/2014 | Chen et al. |
| 2014/0135993 A1 | 5/2014 | Kang et al. |
| 2014/0140575 A1 | 5/2014 | Wolf |
| 2014/0142724 A1 | 5/2014 | Park et al. |
| 2014/0160360 A1 | 6/2014 | Hsu et al. |
| 2014/0167969 A1 | 6/2014 | Wedig et al. |
| 2014/0168277 A1 | 6/2014 | Ashley et al. |
| 2014/0192197 A1 | 7/2014 | Hanko et al. |
| 2014/0192997 A1 | 7/2014 | Niu et al. |
| 2014/0201315 A1 | 7/2014 | Jacob et al. |
| 2014/0215505 A1 | 7/2014 | Balasubramanian et al. |
| 2014/0217905 A1 | 8/2014 | Clayton et al. |
| 2014/0218517 A1 | 8/2014 | Kim et al. |
| 2014/0222634 A1 | 8/2014 | Gordon et al. |
| 2014/0223548 A1 | 8/2014 | Wassingbo |
| 2014/0266669 A1 | 9/2014 | Fadell et al. |
| 2014/0266684 A1 | 9/2014 | Poder et al. |
| 2014/0282653 A1 | 9/2014 | Ariantaj et al. |
| 2014/0297001 A1 | 10/2014 | Silverman |
| 2014/0306833 A1 | 10/2014 | Ricci |
| 2014/0310075 A1 | 10/2014 | Ricci |
| 2014/0313014 A1 | 10/2014 | Huh et al. |
| 2014/0313032 A1 | 10/2014 | Sager et al. |
| 2014/0333529 A1 | 11/2014 | Kim et al. |
| 2014/0351832 A1 | 11/2014 | Cho et al. |
| 2014/0362201 A1 | 12/2014 | Nguyen et al. |
| 2014/0373074 A1 | 12/2014 | Hwang et al. |
| 2015/0008846 A1 | 1/2015 | Chen et al. |
| 2015/0015401 A1 | 1/2015 | Wedig et al. |
| 2015/0029096 A1 | 1/2015 | Ishihara |
| 2015/0054910 A1 | 2/2015 | Offen et al. |
| 2015/0061859 A1 | 3/2015 | Matsuoka et al. |
| 2015/0062343 A1 | 3/2015 | Hwang et al. |
| 2015/0066173 A1 | 3/2015 | Ellis et al. |
| 2015/0074259 A1 | 3/2015 | Ansari et al. |
| 2015/0082225 A1 | 3/2015 | Shearer |
| 2015/0084770 A1 | 3/2015 | Xiao et al. |
| 2015/0085184 A1 | 3/2015 | Vidal et al. |
| 2015/0097689 A1 | 4/2015 | Logue et al. |
| 2015/0100167 A1* | 4/2015 | Sloo ................ G01N 27/02 700/278 |
| 2015/0105880 A1 | 4/2015 | Slupik et al. |
| 2015/0106866 A1 | 4/2015 | Fujita |
| 2015/0113571 A1 | 4/2015 | Cholas et al. |
| 2015/0116113 A1 | 4/2015 | Caine et al. |
| 2015/0127712 A1 | 5/2015 | Fadell et al. |
| 2015/0131500 A1 | 5/2015 | Xie et al. |
| 2015/0137967 A1 | 5/2015 | Wedig et al. |
| 2015/0142991 A1 | 5/2015 | Zaloom |
| 2015/0143406 A1 | 5/2015 | Cho et al. |
| 2015/0143408 A1 | 5/2015 | Sallas |
| 2015/0145643 A1 | 5/2015 | Fadell et al. |
| 2015/0154850 A1 | 6/2015 | Fadell et al. |
| 2015/0156030 A1 | 6/2015 | Fadell et al. |
| 2015/0156612 A1 | 6/2015 | Vemaulapalli |
| 2015/0159401 A1 | 6/2015 | Patrick et al. |
| 2015/0160623 A1 | 6/2015 | Holley |
| 2015/0160634 A1 | 6/2015 | Smith et al. |
| 2015/0160635 A1 | 6/2015 | Schofield et al. |
| 2015/0160636 A1 | 6/2015 | McCarthy et al. |
| 2015/0160663 A1 | 6/2015 | McCarthy et al. |
| 2015/0160935 A1 | 6/2015 | Nye |
| 2015/0161452 A1 | 6/2015 | McCarthy et al. |
| 2015/0161882 A1 | 6/2015 | Lett |
| 2015/0162006 A1 | 6/2015 | Kummer |
| 2015/0163411 A1 | 6/2015 | McCarthy, III et al. |
| 2015/0163412 A1 | 6/2015 | Holley et al. |
| 2015/0163535 A1 | 6/2015 | McCarthy et al. |
| 2015/0172742 A1 | 6/2015 | Richardson |
| 2015/0180708 A1 | 6/2015 | Jacob et al. |
| 2015/0192914 A1 | 7/2015 | Slupik |
| 2015/0198941 A1 | 7/2015 | Pederson |
| 2015/0241860 A1 | 8/2015 | Raid |
| 2015/0260424 A1 | 9/2015 | Fadell et al. |
| 2015/0281824 A1 | 10/2015 | Nguyen et al. |
| 2015/0304689 A1 | 10/2015 | Warren |
| 2015/0309487 A1 | 10/2015 | Lyman |
| 2015/0325096 A1 | 11/2015 | Hatch |
| 2015/0334069 A1 | 11/2015 | Winston et al. |
| 2015/0341599 A1 | 11/2015 | Carey |
| 2015/0347910 A1 | 12/2015 | Fadell et al. |
| 2015/0365787 A1* | 12/2015 | Farrell ................ H04W 4/02 455/456.1 |
| 2016/0029153 A1 | 1/2016 | Linn et al. |
| 2016/0041565 A1 | 2/2016 | Edwards |
| 2016/0047569 A1 | 2/2016 | Fadell et al. |
| 2016/0063854 A1 | 3/2016 | Burton et al. |
| 2016/0066046 A1 | 3/2016 | Mountain |
| 2016/0091471 A1 | 3/2016 | Benn |
| 2016/0098309 A1 | 4/2016 | Kim |
| 2016/0100696 A1 | 4/2016 | Palashewski et al. |
| 2016/0109864 A1 | 4/2016 | Lonn |
| 2016/0121161 A1 | 5/2016 | Mountain |
| 2016/0123741 A1 | 5/2016 | Mountain |
| 2016/0163168 A1 | 6/2016 | Brav et al. |
| 2016/0182249 A1 | 6/2016 | Lea |
| 2016/0189527 A1 | 6/2016 | Peterson et al. |
| 2016/0191912 A1 | 6/2016 | Lea et al. |

(56) References Cited

U.S. PATENT DOCUMENTS

| | | | |
|---|---|---|---|
| 2016/0191990 A1 | 6/2016 | McCarthy |
| 2016/0195856 A1 | 7/2016 | Spero |
| 2016/0196731 A1 | 7/2016 | Aich et al. |
| 2016/0203700 A1 | 7/2016 | Bruhn et al. |
| 2016/0234034 A1 | 8/2016 | Mahar et al. |
| 2016/0248598 A1 | 8/2016 | Lin et al. |
| 2016/0256485 A1 | 9/2016 | Wager et al. |
| 2016/0260135 A1 | 9/2016 | Zomet et al. |
| 2016/0285644 A1 | 9/2016 | Lu et al. |
| 2016/0286327 A1 | 9/2016 | Marten |
| 2016/0323548 A1 | 11/2016 | Khot et al. |
| 2016/0334811 A1 | 11/2016 | Marten |
| 2016/0335423 A1 | 11/2016 | Beals |
| 2016/0338179 A1 | 11/2016 | Aliakseyeu et al. |
| 2016/0342379 A1 | 11/2016 | Keipert et al. |
| 2016/0366746 A1 | 12/2016 | van de Ven et al. |
| 2017/0005822 A1 | 1/2017 | Gao |
| 2017/0065433 A1 | 1/2017 | Gould et al. |
| 2017/0041886 A1 | 2/2017 | Baker et al. |
| 2017/0048476 A1 | 2/2017 | Freiin von Kapri et al. |
| 2017/0051925 A1 | 2/2017 | Stefanski et al. |
| 2017/0054615 A1 | 2/2017 | Wilson |
| 2017/0082987 A1 | 3/2017 | Reddy et al. |
| 2017/0127124 A9 | 5/2017 | Wilson et al. |
| 2017/0146964 A1 | 5/2017 | Beals |
| 2017/0168469 A1 | 6/2017 | Marten et al. |
| 2017/0176961 A1 | 6/2017 | Tirpak |
| 2017/0187993 A1 | 6/2017 | Martch et al. |
| 2017/0191693 A1 | 7/2017 | Bruhn et al. |
| 2017/0195130 A1 | 7/2017 | Landow et al. |
| 2018/0027290 A1 | 1/2018 | Richardson |
| 2018/0038029 A1 | 2/2018 | Beals |
| 2018/0061158 A1 | 3/2018 | Greene |

FOREIGN PATENT DOCUMENTS

| | | | |
|---|---|---|---|
| CN | 105814555 A | 7/2016 |
| DE | 3707284 A1 | 9/1988 |
| DE | 4012253 C1 | 4/1991 |
| DE | 10 208 451 A1 | 9/2003 |
| DE | 10 2012 106 719 A1 | 1/2014 |
| EP | 720136 A2 | 7/1996 |
| EP | 743410 A2 | 11/1996 |
| EP | 2 736 027 A1 | 5/2014 |
| EP | 3 080 677 A1 | 10/2016 |
| EP | 3 080 710 A1 | 10/2016 |
| FR | 834856 A | 12/1938 |
| FR | 947943 A | 7/1949 |
| GB | 1445705 A | 8/1976 |
| GB | 2 304 952 A | 3/1997 |
| JP | 2008148016 A | 6/2008 |
| WO | 93/20544 A1 | 10/1993 |
| WO | 2004/068386 A1 | 8/2004 |
| WO | 2011/095567 A1 | 8/2011 |
| WO | 2011/149473 A1 | 12/2011 |
| WO | 2014/068556 A1 | 5/2014 |
| WO | 2015/179120 A1 | 11/2015 |
| WO | 2016/034880 A1 | 3/2016 |
| WO | 2016/066399 A1 | 5/2016 |
| WO | 2016/066442 A1 | 5/2016 |
| WO | 2016/182696 A1 | 11/2016 |
| WO | 2107/116533 A1 | 7/2017 |
| WO | 2018/039161 A1 | 3/2018 |

OTHER PUBLICATIONS

Author Unknown, "Voice Activated TV using the Amulet Remote for Media Center," AmuletDevices.com, accessed on Jul. 14, 2014, 1 page. Retrieved from http://www.amuletdevices.com/index.php/Features/television.html.

Author Unknown, "App for Samsung Smart TV®," Crestron Electronics, Inc., accessed on Jul. 14, 2014, 3 pages. Retrieved from http://www.crestron.com/products/smart tv television apps/.

Author Unknown, "AllJoyn Onboarding Service Frameworks," Qualcomm Connected Experiences, Inc., accessed on Jul. 15, 2014, 9 pages. Retrieved from https://www.alljoyn.org.

"Do you want to know how to find water leaks? Use a Bravedo Water Alert Flow Monitor to find out!", Bravedo.com, accessed Dec. 16, 2014, 10 pages. Retrieved from http://bravedo.com/.

"Flow Pulse®, Non-invasive clamp-on flow monitor for pipes," Pulsar Process Measurement Ltd, accessed on Dec. 16, 2014, 2 pages. Retrieved from http://www.pulsar-pm.com/product-types/flow/flow-pulse.aspx.

Fong A.C.M. et al, "Indoor air quality control for asthma patients using smart home technology," Consumer Electronics (ISCE), 2011 IEEE 15th International Symposium on, IEEE, Jun. 14, 2011, pp. 18-19, XP032007803, DOI: 10.1109/ISCE.2011.5973774, ISBN: 978-1-61284-843-3, Abstract and sections 3 and 4.

"International Building Code Excerpts, Updated with recent code changes that impact electromagnetic locks," Securitron, Assa Abloy, IBC/IFC 2007 Supplement and 2009, "Finally—some relief and clarification", 2 pages.Retrieved from: www.securitron.com/Other/.../New_IBC-IFC_Code_Language.pdf.

"Introduction to Ultrasonic Doppler Flowmeters," OMEGA Engineering inc., accessed on Dec. 16, 2014, 3 pages. Retrieved from http://www.omega.com/prodinfo/ultrasonicflowmeters.html.

Lamonica, M., "CES 2010 Preview: Green comes in many colors," retrieved from CNET.com (http://ces.cnet.com/8301-31045_1-10420381-269.html), Dec. 22, 2009, 2 pages.

Robbins, Gordon, Deputy Chief, "Addison Fire Department Access Control Installation," 2006 International Fire Code, Section 1008.1.3.4, 4 pages.

Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, ISSN: 1530-437X, Sections 2 and 3.

"Ultrasonic Flow Meters," RS Hydro Ltd, accessed on Dec. 16, 2014, 3 pages. Retrieved from http://www.rshydro.co.uk/ultrasonic-flowmeter.shtml.

Wang et al., "Mixed Sound Event Verification on Wireless Sensor Network for Home Automation," IEEE Transactions on Industrial Informatics, vol. 10, No. 1, Feb. 2014, 10 pages.

International Search Report and Written Opinion for PCT/EP2011/051608 dated May 30, 2011, 13 pages.

International Preliminary Report on Patentability for PCT/EP2011/051608 dated Aug. 16, 2012, 8 pages.

International Search Report and Written Opinion for PCT/US2014/053876 dated Nov. 26, 2014, 8 pages.

International Search Report and Written Opinion for PCT/US2014/055441 dated Dec. 4, 2014, 10 pages.

International Search Report and Written Opinion for PCT/US2014/055476 dated Dec. 30, 2014, 10 pages.

International Search Report and Written Opinion for PCT/EP2015/070286 dated Nov. 5, 2015, 13 pages.

International Search Report and Written Opinion for PCT/GB2015/052544 dated Nov. 6, 2015, 10 pages.

International Search Report and Written Opinion for PCT/GB2015/052457 dated Nov. 13, 2015, 11 pages.

International Search Report and Written Opinion for PCT/EP2015/073299 dated Jan. 4, 2016, 12 pages.

International Search Report and Written Opinion for PCT/EP2015/073936 dated Feb. 4, 2016, all pages.

Mexican Institute of Industrial Property Office Action dated Nov. 1, 2013, for Mex. Patent Appln No. MX/a/2012/008882 is not translated into English, 3 pages.

Mexican Institute of Industrial Property Notice of Allowance dated Feb. 10, 2014, for Mex. Patent Appln No. MX/a/2012/008882, 1 page.

U.S. Appl. No. 14/470,352, filed Aug. 27, 2014 Non Final Office Action dated Nov. 20, 2015, 28 pages.

U.S. Appl. No. 12/700,310, filed Feb. 4, 2010, Office Action dated May 4, 2012, 15 pages.

U.S. Appl. No. 12/700,310, filed Feb. 4, 2010, Final Office Action dated Oct. 10, 2012, 16 pages.

U.S. Appl. No. 12/700,310, filed Feb. 4, 2010 Non-Final Office Action dated Apr. 1, 2013, 16 pages.

(56) References Cited

OTHER PUBLICATIONS

U.S. Appl. No. 12/700,310, filed Feb. 4, 2010 Non-Final Office Action dated Oct. 15, 2013, 15 pages.
U.S. Appl. No. 12/700,310, filed Feb. 4, 2010 Final Office Action dated Feb. 28, 2014, 17 pages.
U.S. Appl. No. 12/700,310, filed Feb. 4, 2010 Non-Final Office Action dated Aug. 14, 2014, 18 pages.
U.S. Appl. No. 12/700,310, filed Feb. 4, 2010 Non-Final Office Action dated Mar. 11, 2015, 35 pages.
U.S. Appl. No. 12/700,310, filed Feb. 4, 2010 Final Office Action dated Oct. 26, 2015, 19 pages.
U.S. Appl. No. 12/700,408, filed Feb. 4, 2010, Notice of Allowance dated Jul. 28, 2012, 8 pages.
U.S. Appl. No. 13/680,934, filed Nov. 19, 2012, Non-Final Office Action dated Oct. 2, 2013, 7 pages.
U.S. Appl. No. 13/680,934, filed Nov. 19, 2012, Final Office Action dated Feb. 10, 2014, 13 pages.
U.S. Appl. No. 13/680,934, filed Nov. 19, 2012, Notice of Allowance dated Apr. 30, 2014, 9 pages.
U.S. Appl. No. 13/680,934, filed Nov. 19, 2012, Notice of Allowance dated Jul. 25, 2014, 12 pages.
U.S. Appl. No. 14/107,132, filed Dec. 16, 2013, Non Final Office Action dated May 27, 2015, 26 pages.
U.S. Appl. No. 14/107,132, filed Dec. 16, 2013, Final Rejection dated Dec. 16, 2015, 32 pages.
U.S. Appl. No. 14/485,188, filed Sep. 12, 2014, Pre-Interview First Office Action dated Jul. 29, 2015, 20 pages.
U.S. Appl. No. 14/485,188, filed Sep. 12, 2014, Pre-Interview First Office Action dated Oct. 1, 2015, 10 pages.
U.S. Appl. No. 14/485,188, filed Sep. 12, 2014, Final Rejection dated Feb. 23, 2016, 22 pages.
U.S. Appl. No. 14/567,348, filed Dec. 11, 2014, Preinterview first office action dated Jan. 20, 2016, 23 pages.
U.S. Appl. No. 14/470,352, filed Aug. 27, 2014 Final Office Action dated Mar. 17, 2016, all pages.
International Search Report and Written Opinion for PCT/US2016/028126 dated Jun. 3, 2016, all pages.
U.S. Appl. No. 12/700,310, filed Feb. 4, 2010 Non-Final Office Action dated Jun. 16, 2016, 30 pages.
U.S. Appl. No. 14/528,739, filed Oct. 30, 2014 Notice of Allowance dated Jun. 23, 2016, 34 pages.
U.S. Appl. No. 14/485,188, filed Sep. 12, 2014, Non-Final Rejection dated Jun. 17, 2016, 29 pages.
U.S. Appl. No. 14/710,331, filed May 12, 2015, Non-Final Rejection dated May 20, 2016, 42 pages.
International Preliminary Report on Patentability for PCT/US2014/055441 dated Jun. 14, 2016, 8 pages.
International Preliminary Report on Patentability for PCT/US2014/053876 dated Jun. 14, 2016, 7 pages.
U.S. Appl. No. 14/567,765, filed Dec. 11, 2014, Preinterview first office action dated Apr. 8, 2016, 30 pages.
U.S. Appl. No. 14/577,717, filed Dec. 19, 2014, Preinterview first office action dated Apr. 4, 2016, 29 pages.
U.S. Appl. No. 14/584,075, filed Dec. 29, 2014, Non-Final Rejection dated Apr. 1, 2016, 40 pages.
International Preliminary Report on Patentability for PCT/US2014/055476 dated Jun. 14, 2016, 9 pages.
U.S. Appl. No. 14/470,352, filed Aug. 27, 2014 Non Final Office Action dated Aug. 26, 2016, all pages.
U.S. Appl. No. 14/107,132, filed Dec. 16, 2013, Non Final Office Action dated Jul. 18, 2016, all pages.
U.S. Appl. No. 14/715,248, filed May 18, 2015, Non-Final Rejection dated Jul. 19, 2016, 34 pages.
U.S. Appl. No. 14/567,783, filed Dec. 11, 2014, Non Final Rejection dated Aug. 23, 2016, all pages.
U.S. Appl. No. 12/700,310, filed Feb. 4, 2010 Notice of Allowance dated Nov. 8, 2016, all pages.
U.S. Appl. No. 14/567,765, filed Dec. 11, 2014, First Action interview dated Oct. 18, 2016, all pages.
U.S. Appl. No. 14/584,075, filed Dec. 29, 2014, Final Rejection dated Oct. 6, 2016, all pages.
U.S. Appl. No. 14/566,977, filed Dec. 11, 2014, Non Final Rejection dated Oct. 3, 2016, all pages.
U.S. Appl. No. 14/567,754, filed Dec. 11, 2014, Non Final Rejection dated Nov. 4, 2016, all pages.
U.S. Appl. No. 14/567,770, filed Dec. 11, 2014, Non Final Rejection dated Nov. 4, 2016, all pages.
U.S. Appl. No. 14/671,299, filed Mar. 27, 2015, Non Final Rejection dated Oct. 28, 2016, all pages.
U.S. Appl. No. 14/476,377, filed Sep. 3, 2014, Non-Final Rejection dated Nov. 7, 2016, all pages.
Office Action for EP14868928.4 dated Sep. 23, 2016, all pages.
International Preliminary Report on Patentability for PCT/GB2015/052544 dated Mar. 7, 2017, all pages.
International Search Report and Written Opinion for PCT/US2016/057729 dated Mar. 28, 2017, all pages.
European Search Report for EP 16 20 0422 dated Jan. 13, 2017, all pages.
BDEJONG_CREE, "Cannot remove last user of a group even though members still exist," Microsoft Visual Studio forum site, Topic ID #58405, Response by Microsoft, Dec. 17, 2010) retrieved on Apr. 6, 2017 from: https://connect.microsoft.com/VisualStudio/feedback/details/580405/tfs-2010-cannot-remove-last-user-of-a-group-even-though-members-still-exists.
International Preliminary Report on Patentability for PCT/GB2015/052457 dated Feb. 28, 2017, all pages.
U.S. Appl. No. 14/485,188, filed Sep. 12, 2014, Non-Final Rejection dated Apr. 19, 2017, all pages.
U.S. Appl. No. 14/567,765, filed Dec. 11, 2014, Final Rejection dated Feb. 16, 2017, all pages.
U.S. Appl. No. 14/485,038, filed Sep. 12, 2014, Non Final Rejection dated Apr. 6, 2017, all pages.
U.S. Appl. No. 14/584,075, filed Dec. 29, 2014, Non-Final Rejection dated Mar. 10, 2017, all pages.
U.S. Appl. No. 14/710,331, filed May 12, 2015, Non-Final Rejection dated Mar. 10, 2017, all pages.
U.S. Appl. No. 14/566,977, filed Dec. 11, 2014, Final Rejection dated Feb. 10, 2017, all pages.
U.S. Appl. No. 14/671,299, filed Mar. 27, 2015, Notice of Allowance dated Apr. 17, 2017, all pages.
U.S. Appl. No. 14/565,853, filed Dec. 10, 2014, Non Final Rejection dated Mar. 10, 2017, all pages.
U.S. Appl. No. 15/075,412, filed Mar. 21, 2016, Final Rejection dated Apr. 17, 2017, all pages.
U.S. Appl. No. 14/497,130, filed Sep. 25, 2014, Non Final Rejection dated Feb. 8, 2017, all pages.
U.S. Appl. No. 14/528,402, filed Oct. 30, 2014, Non-Final Rejection dated Apr. 11, 2017, all pages.
U.S. Appl. No. 14/475,252, filed Sep. 2, 2014, Non-Final Rejection dated Apr. 12, 2017, all pages.
U.S. Appl. No. 14/832,821, filed Aug. 21, 2015, Non-Final Rejection dated Apr. 24, 2017, all pages.
U.S. Appl. No. 14/981,501, filed Dec. 28, 2015, Preinterview first office action dated Apr. 20, 2017, all pages.
U.S. Appl. No. 14/470,352, filed Aug. 27, 2014 Notice of Allowance dated Dec. 2, 2016, all pages.
U.S. Appl. No. 15/050,958, filed Feb. 23, 2016 Notice of Allowance dated Dec. 6, 2016, all pages.
U.S. Appl. No. 15/289,395, filed Oct. 10, 2016 Non-Final Rejection dated Dec. 2, 2016, all pages.
U.S. Appl. No. 14/107,132, filed Dec. 16, 2013, Notice of Allowance dated Jan. 18, 2017, all pages.
U.S. Appl. No. 14/485,188, filed Sep. 12, 2014, Final Rejection dated Nov. 25, 2016, 22 pages.
U.S. Appl. No. 14/577,717, filed Dec. 19, 2014, Final Office Action dated Dec. 19, 2016, all pages.
U.S. Appl. No. 14/567,783, filed Dec. 11, 2014, Final Rejection dated Dec. 20, 2016, all pages.
U.S. Appl. No. 15/075,412, filed Mar. 21, 2016, Non Final Rejection dated Dec. 21, 2016, all pages.
U.S. Appl. No. 15/289,395, filed Oct. 10, 2016 Non-Final Rejection dated Jun. 19, 2017, all pages.

(56) References Cited

OTHER PUBLICATIONS

U.S. Appl. No. 14/497,130, filed Sep. 25, 2014, Final Rejection dated Aug. 4, 2017, all pages.
U.S. Appl. No. 14/981,501, filed Dec. 28, 2015, First Action Interview—office action dated Jul. 19, 2017, all pages.
U.S. Appl. No. 14/567,502, filed Dec. 11, 2014, Final Rejection dated Aug. 7, 2017, all pages.
Notification of Publication of European Application No. 162004220 as EP 3166308 dated May 10, 2017, 2 pages.
U.S. Appl. No. 14/567,765, filed Dec. 11, 2014, Notice of Allowance dated May 24, 2017, all pages.
U.S. Appl. No. 14/567,754, filed Dec. 11, 2014, Final Rejection dated May 26, 2017, all pages.
U.S. Appl. No. 14/567,770, filed Dec. 11, 2014, Final Rejection dated Jun. 1, 2017, all pages.
U.S. Appl. No. 14/476,377, filed Sep. 3, 2014, Notice of Allowance dated May 19, 2017, all pages.
U.S. Appl. No. 14/709,791, filed May 12, 2015, Non Final Rejection dated May 31, 2017, all pages.
International Preliminary Report on Patentability for PCT/US2016/028126 dated Nov. 14, 2017, all pages.
International Search Report and Written Opinion for PCT/US2017/047900 dated Nov. 24, 2017.
Ravindran, et al., "Information-centric Networking based Homenet," 2013 IFIP/IEEE International Symposium on Integrated Network Management (IM 2013), Ghent, 2013, pp. 1102-1108.
Mantoro, et al., "Web-enabled Smart Home Using Wireless Node Infrastructure," Proceedings of the 9th International Conference on Advances in Mobile Computing and Multimedia. ACM, 2011, pp. 72-79.
Shariqsuhail, et al., "Multi-Functional Secured Smart Home," Advances in Computing, Communications and Informatics (ICACCI), 2016 International Conference on. IEEE, 2016, pp. 2629-2634.
U.S. Appl. No. 14/986,483, filed Dec. 31, 2015, Non-Final Rejection dated Dec. 1, 2017, all pages.
U.S. Appl. No. 14/584,075, filed Dec. 29, 2014, Notice of Allowance dated Dec. 26, 2017, all pages.
U.S. Appl. No. 14/710,331, filed May 12, 2015, Notice of Allowance dated Dec. 7, 2017, all pages.
U.S. Appl. No. 14/832,821, filed Aug. 21, 2015, Notice of Allowance dated Dec. 18, 2017, all pages.
Office Action CN Appln No. 201480067003.5 dated Jan. 19, 2018, all pages.
U.S. Appl. No. 14/952,580, filed Nov. 25, 2015, Notice of Allowance dated Feb. 12, 2018, all pages.
U.S. Appl. No. 14/528,402, filed Oct. 30, 2014, Notice of Allowance dated Jan. 29, 2018, all pages.
U.S. Appl. No. 14/970,235 Non Final Rejection dated Jan. 31, 2018, all pages.
Mark Edward Soper, "Absolute Beginner's Guide to Home Automation," 2005, Que Publishing, p. 57, 121.
U.S. Appl. No. 14/982,366, filed Dec. 29, 2015, Non-Final Rejection dated Nov. 1, 2017, all pages.
U.S. Appl. No. 15/246,079, filed Aug. 24, 2016, Non-Final Rejection dated Oct. 19, 2017, all pages.
U.S. Appl. No. 14/485,188, filed Sep. 12, 2014, Final Rejection dated Oct. 25, 2017, all pages.
U.S. Appl. No. 14/485,038, filed Sep. 12, 2014, Notice of Allowance dated Nov. 13, 2017, all pages.
U.S. Appl. No. 14/528,402, filed Oct. 30, 2014, Final Rejection dated Oct. 31, 2017, all pages.
U.S. Appl. No. 14/981,501, filed Dec. 28, 2015, Final Office Action dated Oct. 10, 2017, all pages.
U.S. Appl. No. 14/553,763, filed Nov. 25, 2014 Notice of Allowance dated Mar. 27, 2018, all pages.
U.S. Appl. No. 15/246,079, filed Aug. 24, 2016, Notice of Allowance dated Apr. 10, 2018, all pages.
Notification of Publication of European Application No. 15763643.2 as EP 3189511 dated Jul. 12, 2017, 1 page.
Notification of Publication of Brazilian Application No. BR 11 2016 0112032 dated Aug. 8, 2017, 2 pages.
Notification of Publication of Brazilian Application No. BR 11 2016 010376 9 dated Aug. 8, 2017, 1 page.
Supplementary European Search Report for EP 14868928 dated Jul. 7, 2017, 11 pages.
Supplementary European Search Report for EP 14870507 dated Jun. 28, 2017, all pages.
"Plug-In Carbon Monoxide & Natural Gas Alarm with Backup Battery Protection," Universal Security Instruments, Inc., 2011, 12 pages.
U.S. Appl. No. 14/584,075, filed Dec. 29, 2014, Final Rejection dated Sep. 9, 2017, all pages.
U.S. Appl. No. 14/952,580, filed Nov. 25, 2015, Non-Final Rejection dated Sep. 20, 2017, all pages.
U.S. Appl. No. 15/189,775, filed Jun. 22, 2016, Notice of Allowance dated Sep. 11, 2017, all pages.
U.S. Appl. No. 14/710,331, filed May 12, 2015, Final Rejection dated Aug. 16, 2017, all pages.
U.S. Appl. No. 14/553,763, filed Nov. 25, 2014 Preinterview first office action dated Oct. 6, 2017, all pages.

\* cited by examiner

900a

| Sensor | Location | Weight |
|---|---|---|
| Sensor 1 | Living Room | 0.15 (15%) |
| Sensor 2 | Dining Room | 0.10 (10%) |
| Sensor 3 | Bedroom Left | 0.40 (40%) |
| Sensor 4 | Bedroom Right | 0.35 (35%) |

| Sensor | Location | Ranking |
|---|---|---|
| Sensor 1 | Living Room | 3 |
| Sensor 2 | Dining Room | 4 |
| Sensor 3 | Bedroom Left | 1 |
| Sensor 4 | Bedroom Right | 2 |

| Sensor | Weight | BTU/h |
|---|---|---|
| Room 1 | 0.15 (15%) | 15,000 |
| Room 2 | 0.10 (10%) | 10,000 |
| Room 3 | 0.40 (40%) | 40,000 |
| Room 4 | 0.35 (35%) | 35,000 |

| Sensor | Weight | Max Needed | BTU/h |
|---|---|---|---|
| Room 1 | 0.15 (15%) | 10,000 | 10,000 |
| Room 2 | 0.10 (10%) | 5,000 | 5,000 |
| Room 3 | 0.40 (40%) | 55,000 | 55,000 |
| Room 4 | 0.35 (35%) | 45,000 | 30,000 |

FIG. 9D

| Sensor | Time(s) – Day 1 | Time(s) – Day 2 | Time(s) – Day 3 |
|---|---|---|---|
| Room 1 (living room) | 8am-4:30pm | 8:03am-4:48pm | 8:15am-12:10pm; 1:35pm-5:15pm |
| Room 2 (dining room) | 4:52pm-5:33pm | 5:05pm-6:39pm | 12:15pm-1:29pm; 5:24pm-7:10pm |
| Room 3 (bedroom) | 10:00pm-5:24am | 10:00pm-6:10am | 10:05pm-7:05pm |
| Room 4 (gym) | n/a | 6:12am-6:58am | n/a |

FIG. 12A

| Sensor | Day 3 Features | Day 4 Features | Day 5 Features |
|---|---|---|---|
| Room 1 (living room) | TV channel 5, light | TV channel 5, light | TV channel 5, no light |
| Room 2 (dining room) | Temperature 75 | Temperature 75 | Temperature 75 |
| Room 3 (bedroom) | Temperature 68 | Temperature 69 | Temperature 67 |
| Room 4 (gym) | TV channel 8 | TV channel 8 | TV channel 7 |

FIG. 12B

| Sensor | Distance | Past Threshold? | Time Beyond Threshold | Alarm on? |
|---|---|---|---|---|
| Sensor 1 (front door) | 2 feet | No | n/a | No |
| | 2 feet | No | n/a | No |
| | 5 feet | No | n/a | No |
| | 3.5 feet | No | n/a | No |
| | 10 feet | No | n/a | No |
| | 45 feet | Yes | 10 sec | No |
| | 48 feet | Yes | 20 sec | No |
| | 26 feet | No | n/a | No |
| | 36 feet | Yes | 10 sec | No |
| | 42 feet | Yes | 20 sec | No |
| | 40 feet | Yes | 30 sec | Yes |
| | 54 feet | Yes | 40 sec | Yes |
| Sensor 2 (back door) | 25 feet | No | n/a | No |
| | 25 feet | No | n/a | No |
| | 14 feet | No | n/a | No |
| | 18 feet | No | n/a | No |
| | 18 feet | No | n/a | No |

FIG. 14

METHODS AND SYSTEMS FOR CONTROL OF HOME AUTOMATION ACTIVITY BASED ON USER CHARACTERISTICS

TECHNICAL FIELD

The present technology relates to systems and methods for control of home automation activity based on user preferences. More specifically, the present technology relates to using a home automation system to control home automation activity based on user preferences.

BACKGROUND

Home automation systems provide a plethora of valuable benefits. From monitoring ongoing activities to securing the home, these systems can be configured to monitor many activities. However, valuable resources can be wasted based on home automation devices being used when they are not necessary. Furthermore, limited resources can be used inefficiently based on a lack of data being shared between network devices within the home automation system.

Thus, there is a need for improved methods and systems for control of home automation activity based on user preferences and other data. These and other needs are addressed by the present technology.

SUMMARY

Embodiments of the present technology are directed to a computer-implemented method. The method may include receiving, by a television receiver connected to a home automation system, an input from a user including a set of preferences associated with an HVAC system connected to the home automation system in a structure; assigning, by the television receiver, a weight to each of two or more HVAC sensors of the HVAC system using the received set of preferences, wherein the HVAC sensors are each distributed in different rooms of the structure; generating, by the television receiver, an HVAC profile using the set of preferences and the weights assigned to the HVAC sensors, wherein the HVAC profile includes settings associated with proportions of conditioned air to be distributed to a plurality of rooms of the structure; transmitting, by the television receiver, the HVAC profile to the HVAC system, wherein when the HVAC profile is received, the HVAC profile is used to run the HVAC system; receiving, at the television receiver, HVAC data recorded by the HVAC sensors, wherein the HVAC data includes temperature data recorded in the different rooms over a period of time; updating, by the television receiver, the HVAC profile using the received HVAC data and the set of preferences; and transmitting, by the television receiver, the updated HVAC profile, wherein when the updated HVAC profile is received, at least a portion of the updated HVAC profile is displayable on a television display device.

In alternative aspects, the method further comprises transmitting, by the television receiver, the updated HVAC profile to the HVAC system, wherein when the updated HVAC profile is received, the updated HVAC profile is used to run the HVAC system instead of the HVAC profile. In alternative aspects, transmitting the updated HVAC profile for display and transmitting the updated HVAC profile to the HVAC system are included in one transmission. In alternative aspects, the method further comprises transmitting, by the television receiver, the updated HVAC profile to a second television receiver, wherein the television receiver and second television receiver are connected to two different networks and are located in two different structures. In alternative aspects, upon transmitting the HVAC profile to the HVAC sensors, the HVAC profile causes the HVAC sensors to adjust based on the settings. In alternative aspects, the user inputs the preferences into a television receiver of a satellite television distribution system. In alternative aspects, the weight of the two or more HVAC sensors include at least one of a percentage and a ranking. In alternative aspects, the method further comprises determining a room of the structure where the user is located; and setting a temperature at a room HVAC sensor in the room using the HVAC profile. In alternative aspects, the method further comprises detecting, by the room HVAC sensor, a change in temperature in the room; detecting that the change in temperature is greater than a predetermined threshold change; and transmitting a communication to an HVAC device to adjust the temperature in the room.

Alternative embodiments of the present technology are directed to a television receiver, comprising one or more processors, a wireless transceiver communicatively coupled to the one or more processors, and a non-transitory computer readable storage medium communicatively coupled to the one or more processors, wherein the non-transitory computer readable storage medium includes instructions that, when executed by the one or more processors, cause the one or more processors to perform operations. The operations may include receiving, by a television receiver connected to a home automation system, an input from a user including a set of preferences associated with an HVAC system connected to the home automation system in a structure; assigning, by the television receiver, a weight to each of two or more HVAC sensors of the HVAC system using the received set of preferences, wherein the HVAC sensors are each distributed in different rooms of the structure; generating, by the television receiver, an HVAC profile using the set of preferences and the weights assigned to the HVAC sensors, wherein the HVAC profile includes settings associated with proportions of conditioned air to be distributed to a plurality of rooms of the structure; transmitting, by the television receiver, the HVAC profile to the HVAC system, wherein when the HVAC profile is received, the HVAC profile is used to run the HVAC system; receiving, at the television receiver, HVAC data recorded by the HVAC sensors, wherein the HVAC data includes temperature data recorded in the different rooms over a period of time; updating, by the television receiver, the HVAC profile using the received HVAC data and the set of preferences; and transmitting, by the television receiver, the updated HVAC profile, wherein when the updated HVAC profile is received, at least a portion of the updated HVAC profile is displayable on a television display device.

In alternative aspects, the operations further include transmitting, by the television receiver, the updated HVAC profile to the HVAC system, wherein when the updated HVAC profile is received, the updated HVAC profile is used to run the HVAC system instead of the HVAC profile. In alternative aspects, transmitting the updated HVAC profile for display and transmitting the updated HVAC profile to the HVAC system are included in one transmission. In alternative aspects, the operations further include transmitting, by the television receiver, the updated HVAC profile to a second television receiver, wherein the television receiver and second television receiver are connected to two different networks and are located in two different structures. In alternative aspects, upon transmitting the HVAC profile to the HVAC sensors, the HVAC profile causes the HVAC sensors to adjust based on the settings. In alternative aspects, the user inputs the preferences into a television receiver of a satellite television distribution system. In alternative aspects, the weight of the two or more HVAC sensors include at least one of a percentage and a ranking. In alternative aspects, the operations further include determining a room of the structure where the user is located; and setting a temperature at a room HVAC sensor in the room using the HVAC profile. In alternative aspects, the operations further include detecting, by the room HVAC sensor, a change in temperature in the room; detecting that the change in temperature is greater than a predetermined threshold change; and transmitting a communication to an HVAC device to adjust the temperature in the room.

Alternative embodiments of the present technology are directed to a non-transitory computer readable medium comprising instructions that, when executed by one or more processors, cause the one or more processors to perform operations. The operations may include receiving, by a television receiver connected to a home automation system, an input from a user including a set of preferences associated with an HVAC system connected to the home automation system in a structure; assigning, by the television receiver, a weight to each of two or more HVAC sensors of the HVAC system using the received set of preferences, wherein the HVAC sensors are each distributed in different rooms of the structure; generating, by the television receiver, an HVAC profile using the set of preferences and the weights assigned to the HVAC sensors, wherein the HVAC profile includes settings associated with proportions of conditioned air to be distributed to a plurality of rooms of the structure; transmitting, by the television receiver, the HVAC profile to the HVAC system, wherein when the HVAC profile is received, the HVAC profile is used to run the HVAC system; receiving, at the television receiver, HVAC data recorded by the HVAC sensors, wherein the HVAC data includes temperature data recorded in the different rooms over a period of time; updating, by the television receiver, the HVAC profile using the received HVAC data and the set of preferences; and transmitting, by the television receiver, the updated HVAC profile, wherein when the updated HVAC profile is received, at least a portion of the updated HVAC profile is displayable on a television display device.

In alternative aspects, the operations further include transmitting, by the television receiver, the updated HVAC profile to the HVAC system, wherein when the updated HVAC profile is received, the updated HVAC profile is used to run the HVAC system instead of the HVAC profile. In alternative aspects, transmitting the updated HVAC profile for display and transmitting the updated HVAC profile to the HVAC system are included in one transmission. In alternative aspects, the operations further include transmitting, by the television receiver, the updated HVAC profile to a second television receiver, wherein the television receiver and second television receiver are connected to two different networks and are located in two different structures. In alternative aspects, upon transmitting the HVAC profile to the HVAC sensors, the HVAC profile causes the HVAC sensors to adjust based on the settings. In alternative aspects, the user inputs the preferences into a television receiver of a satellite television distribution system. In alternative aspects, the weight of the two or more HVAC sensors include at least one of a percentage and a ranking. In alternative aspects, the operations further include determining a room of the structure where the user is located; and setting a temperature at a room HVAC sensor in the room using the HVAC profile. In alternative aspects, the operations further include detecting, by the room HVAC sensor, a change in temperature in the room; detecting that the change in temperature is greater than a predetermined threshold change; and transmitting a communication to an HVAC device to adjust the temperature in the room.

Embodiments of the present technology are directed to a computer-implemented method. The method may include receiving, at a television receiver of a satellite distribution system, an input from a user including a set of preferences associated with a home automation system connected to the satellite distribution system; generating, by the television receiver, a user profile using the set of preferences, wherein the user profile includes settings associated with a user and a set of characteristics of the home automation system, and wherein the profile includes home automation settings associated with a first location and home automation settings associated with a second location; receiving, at the television receiver, data indicating that the mobile device has moved from the first location to the second location; transmitting, by the television receiver, the user profile to a mobile device associated with the user, wherein when the user profile is received, the settings associated with the first location are applied to the home automation system; receiving, at the television receiver, data indicating that the mobile device has been at the second location for a period of time; comparing, by the television receiver, the period of time to a predetermined threshold period of time; and in response to determining that the period of time exceeds the threshold period of time, applying the home automation settings associated with the second location to the home automation system.

In alternative aspects, the method further comprises receiving, at the television receiver, data recorded by sensors in the home automation system; and updating the user profile based on the data recorded by sensors in the home automation system. In alternative aspects, the method further comprises receiving, at the television receiver, data recorded by sensors in the home automation system; and updating the threshold period of time based on the data. In alternative aspects, the data indicating that the mobile device has moved from the first location to the second location includes data corresponding to communications between the mobile device and a sensor at the first location and a sensor at the second location. In alternative aspects, the method further comprise transmitting, by the television receiver, the user profile to a second television receiver, wherein the television receiver and second television receiver are connected to two different networks and are located in two different structures. In alternative aspects, the method further comprises receiving updated data indicating one or more characteristics of the user; updating the user profile using the received updated data; and applying the settings of the updated user profile to the home automation system. In alternative aspects, the method further comprises identifying the user as one of a stored list of users associated with the home automation system; retrieving a stored user profile associated with the user; updating the stored user profile with the received stored user profile; and store the updated user profile. In alternative aspects, the method further comprises determining that the mobile device has moved from the first location to the second location using the data indicating that the mobile device has moved from the first location to the second location, wherein determining a location of the mobile device includes using one or more devices of the home automation system, wherein the one or more devices includes a video camera, a microphone, or a motion detector. In alternative aspects, the method further comprises receiving data associated with a home automation device in a room of a structure, wherein the home automation device is part of the home automation system and the home automation system is in the structure; determining that the data associated with a home automation device in the room is associated with the user; and determining a location of the user in the room using the data associated with a home automation device.

Alternative embodiments of the present technology are directed to a television receiver, comprising one or more processors, a wireless transceiver communicatively coupled to the one or more processors, and a non-transitory computer readable storage medium communicatively coupled to the one or more processors, wherein the non-transitory computer readable storage medium includes instructions that, when executed by the one or more processors, cause the one or more processors to perform operations. The operations may include receiving, at a television receiver of a satellite distribution system, an input from a user including a set of preferences associated with a home automation system connected to the satellite distribution system; generating, by the television receiver, a user profile using the set of preferences, wherein the user profile includes settings associated with a user and a set of characteristics of the home automation system, and wherein the profile includes home automation settings associated with a first location and home automation settings associated with a second location; receiving, at the television receiver, data indicating that the mobile device has moved from the first location to the second location; transmitting, by the television receiver, the user profile to a mobile device associated with the user, wherein when the user profile is received, the settings associated with the first location are applied to the home automation system; receiving, at the television receiver, data indicating that the mobile device has been at the second location for a period of time; comparing, by the television receiver, the period of time to a predetermined threshold period of time; and in response to determining that the period of time exceeds the threshold period of time, applying the home automation settings associated with the second location to the home automation system.

In alternative aspects, operations further include receiving, at the television receiver, data recorded by sensors in the home automation system; and updating the user profile based on the data recorded by sensors in the home automation system. In alternative aspects, operations further include receiving, at the television receiver, data recorded by sensors in the home automation system; and updating the threshold period of time based on the data. In alternative aspects, the data indicating that the mobile device has moved from the first location to the second location includes data corresponding to communications between the mobile device and a sensor at the first location and a sensor at the second location. In alternative aspects, operations further include transmitting, by the television receiver, the user profile to a second television receiver, wherein the television receiver and second television receiver are connected to two different networks and are located in two different structures. In alternative aspects, operations further include receiving updated data indicating one or more characteristics of the user; updating the user profile using the received updated data; and applying the settings of the updated user profile to the home automation system. In alternative aspects, operations further include identifying the user as one of a stored list of users associated with the home automation system; retrieving a stored user profile associated with the user; updating the stored user profile with the received stored user profile; and store the updated user profile. In alternative aspects, operations further include determining that the mobile device has moved from the first location to the second location using the data indicating that the mobile device has moved from the first location to the second location, wherein determining a location of the mobile device includes using one or more devices of the home automation system, wherein the one or more devices includes a video camera, a microphone, or a motion detector. In alternative aspects, operations further include receiving data associated with a home automation device in a room of a structure, wherein the home automation device is part of the home automation system and the home automation system is in the structure; determining that the data associated with a home automation device in the room is associated with the user; and determining a location of the user in the room using the data associated with a home automation device.

Alternative embodiments of the present technology are directed to a non-transitory computer readable medium comprising instructions that, when executed by one or more processors, cause the one or more processors to perform operations. The operations may include receiving, at a television receiver of a satellite distribution system, an input from a user including a set of preferences associated with a home automation system connected to the satellite distribution system; generating, by the television receiver, a user profile using the set of preferences, wherein the user profile includes settings associated with a user and a set of characteristics of the home automation system, and wherein the profile includes home automation settings associated with a first location and home automation settings associated with a second location; receiving, at the television receiver, data indicating that the mobile device has moved from the first location to the second location; transmitting, by the television receiver, the user profile to a mobile device associated with the user, wherein when the user profile is received, the settings associated with the first location are applied to the home automation system; receiving, at the television receiver, data indicating that the mobile device has been at the second location for a period of time; comparing, by the television receiver, the period of time to a predetermined threshold period of time; and in response to determining that the period of time exceeds the threshold period of time, applying the home automation settings associated with the second location to the home automation system.

In alternative aspects, operations further include receiving, at the television receiver, data recorded by sensors in the home automation system; and updating the user profile based on the data recorded by sensors in the home automation system. In alternative aspects, operations further include receiving, at the television receiver, data recorded by sensors in the home automation system; and updating the threshold period of time based on the data. In alternative aspects, the data indicating that the mobile device has moved from the first location to the second location includes data corresponding to communications between the mobile device and a sensor at the first location and a sensor at the second location. In alternative aspects, operations further include transmitting, by the television receiver, the user profile to a second television receiver, wherein the television receiver and second television receiver are connected to two different networks and are located in two different structures. In alternative aspects, operations further include receiving updated data indicating one or more characteristics of the user; updating the user profile using the received updated data; and applying the settings of the updated user profile to the home automation system. In alternative aspects, operations further include identifying the user as one of a stored list of users associated with the home automation system; retrieving a stored user profile associated with the user; updating the stored user profile with the received stored user profile; and store the updated user profile. In alternative aspects, operations further include determining that the mobile device has moved from the first location to the second location using the data indicating that the mobile device has moved from the first location to the second location, wherein determining a location of the mobile device includes using one or more devices of the home automation system, wherein the one or more devices includes a video camera, a microphone, or a motion detector. In alternative aspects, operations further include receiving data associated with a home automation device in a room of a structure, wherein the home automation device is part of the home automation system and the home automation system is in the structure; determining that the data associated with a home automation device in the room is associated with the user; and determining a location of the user in the room using the data associated with a home automation device.

Alternative embodiments of the present technology are directed to a computer-implemented method, a television receiver, comprising one or more processors, a wireless transceiver communicatively coupled to the one or more processors, and a non-transitory computer readable storage medium communicatively coupled to the one or more processors, wherein the non-transitory computer readable storage medium includes instructions that, when executed by the one or more processors, cause the one or more processors to perform operations, and/or a non-transitory computer readable medium comprising instructions that, when executed by one or more processors, cause the one or more processors to perform operations. The method and/or operations may include receiving data from a sensor in a home automation system, the data associated with a user; determining, using the data, a location of the user, the location including an indication of a distance between the user and a structure; comparing the distance with a predetermined threshold distance; determining an amount of time for which the user has crossed the threshold distance; comparing the amount of time to a threshold amount of time; and activating a change in a home security system associated with the home automation system based on the user crossing the threshold amount of time.

BRIEF DESCRIPTION OF THE DRAWINGS

A further understanding of the nature and advantages of the disclosed embodiments may be realized by reference to the remaining portions of the specification and the drawings.

FIGS. 9A and 9B show tables that include weight and ranking data associated with each of four sensors, each located in a different room of a dwelling, according to embodiments of the present technology.

FIGS. 9C and 9D show tables that include weight and energy data associated with each of four sensors, each located in a different room of a dwelling, according to embodiments of the present technology.

FIGS. 12A-12B illustrate tables including data collected by sensors and used within a home automation system, according to embodiments of the present technology.

FIG. 14 illustrates a table including example stored data used within a home automation system, according to embodiments of the present technology.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

A television receiver may serve as a host for a home automation system. By using a television receiver to host a home automation system, various advantages may be realized. Many of these advantages are discussed below with respect to FIGS. 1-18.

Figure 1:
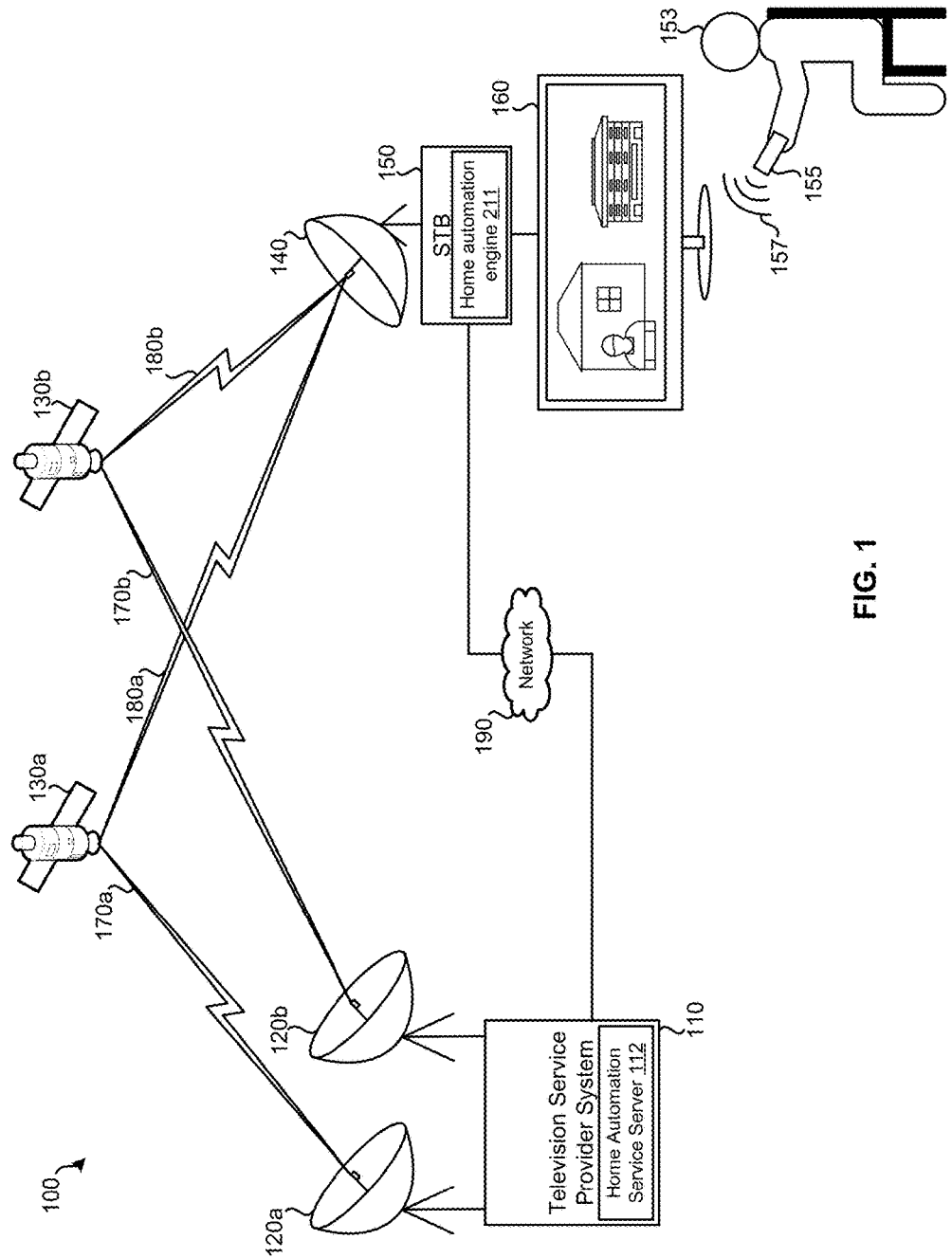
FIG. 1 shows a simplified media service system that may be used in accordance with embodiments of the present technology.

FIG. 1 illustrates an embodiment of a satellite television distribution system 100. While a home automation system may be incorporated with various types of television receivers, various embodiments may be part of a satellite-based television distribution system. Cable, IP-based, wireless, and broadcast focused systems are also possible. Satellite television distribution system 100 may include: television service provider system 110, satellite transmitter equipment 120, satellites 130, satellite dish 140, television receiver 150, home automation service server 112, and display device 160. The display device 160 can be controlled by a user 153 using a remote control device 155 that can send wired or wireless signals 157 to communicate with the STB 150 and/or display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions of) instances and types of user equipment may receive data and television signals from television service provider system 110 via satellites 130.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink signals 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed. Further, information used by television receiver 150 for home automation functions may also be relayed to a television receiver via one or more transponder streams.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130a. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

In communication with satellite dish 140 may be one or more television receivers.

Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. On-demand content, such as PPV content, may be stored to a computer-readable storage medium. A television receiver is defined to include set-top boxes (STBs), and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160. Television receiver 150 may include home automation engine 211, as detailed in relation to FIG. 2.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170a represents a signal between satellite transmitter equipment 120 and satellite 130a. Uplink signal 170b represents a signal between satellite transmitter equipment 120 and satellite 130b. Each of uplink signals 170 may contain streams of one or more different television channels. For example, uplink signal 170a may contain a first group of television channels, while uplink signal 170b contains a second group of television channels. Each of these television channels may be scrambled such that unauthorized persons are prevented from accessing the television channels.

Downlink signal 180a represents a signal between satellite 130a and satellite dish 140. Downlink signal 180b represents a signal between satellite 130b and satellite dish 140. Each of downlink signals 180 may contain one or more different television channels, which may be at least partially scrambled. A downlink signal may be in the form of a transponder stream. A single transponder stream may be tuned to at a given time by a tuner of a television receiver. For example, downlink signal 180a may be a first transponder stream containing a first group of television channels, while downlink signal 180b may be a second transponder stream containing a different group of television channels. In addition to or instead of containing television channels, a transponder stream can be used to transmit on-demand content to television receivers, including PPV content, which may be stored locally by the television receiver until output for presentation.

FIG. 1 illustrates downlink signal 180a and downlink signal 180b, being received by satellite dish 140 and distributed to television receiver 150. For a first group of television channels, satellite dish 140 may receive downlink signal 180a and for a second group of channels, downlink signal 180b may be received. Television receiver 150 may decode the received transponder streams. As such, depending on which television channels are desired to be presented or stored, various transponder streams from various satellites may be received, descrambled, and decoded by television receiver 150.

Network 190, which may include the Internet, may allow for bidirectional communication between television receiver 150 and television service provider system 110, such as for home automation related services provided by home automation service server 112. Although illustrated as part of the television service provider system, the home automation service server 112 may be provided by a third party in embodiments. In addition or in alternate to network 190, a telephone, e.g., landline, or cellular connection may be used to enable communication between television receiver 150 and television service provider system 110.

Figure 2:
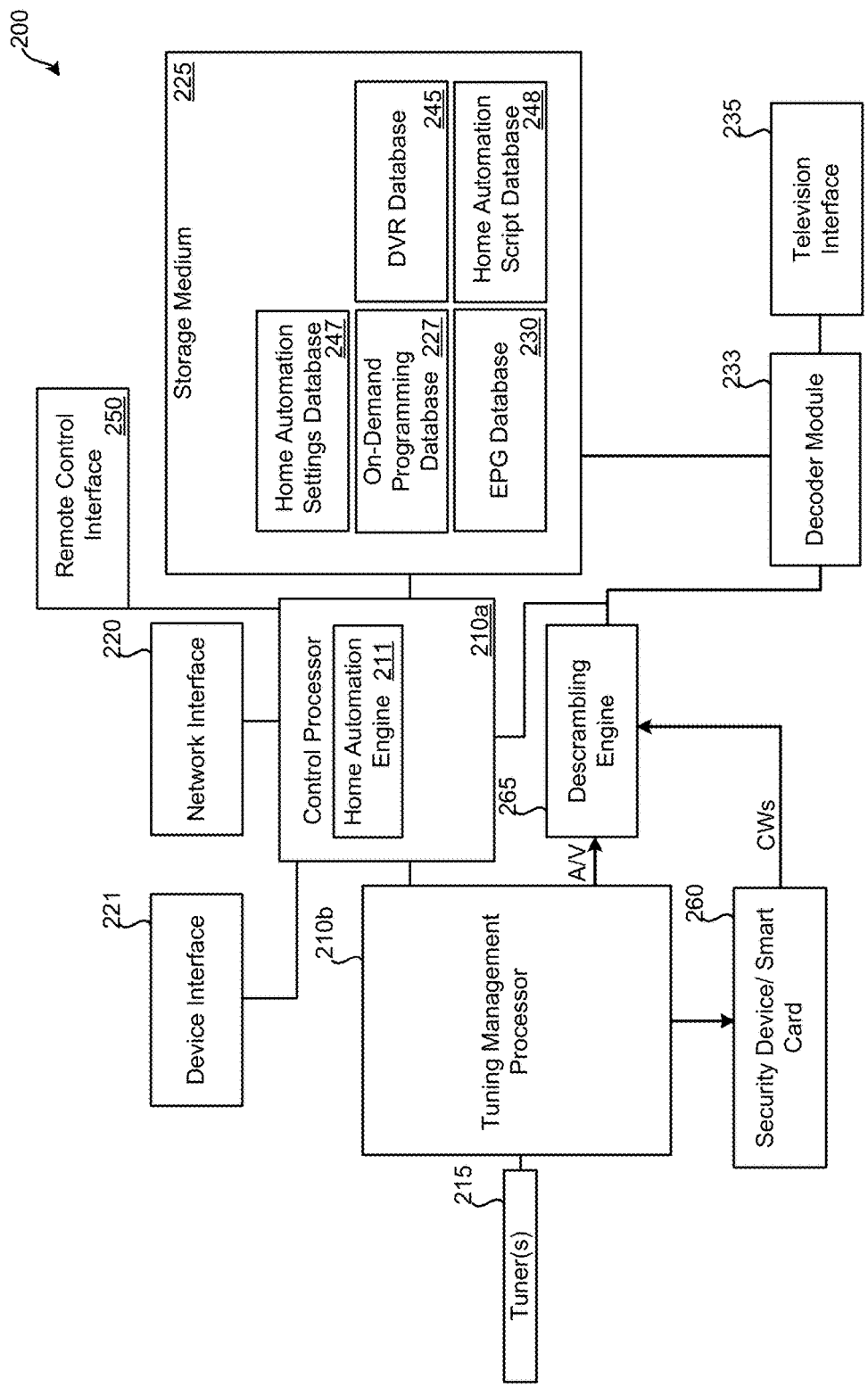
FIG. 2 illustrates an exemplary electronic device that may be used in accordance with embodiments of the present technology.

FIG. 2 illustrates an embodiment of a television receiver 200, which may represent television receiver 150 of FIG. 1. Television receiver 200 may be configured to function as a host for a home automation system either alone or in conjunction with a communication device. Television receiver 200 may be in the form of a separate device configured to be connected with a display device, such as a television. Embodiments of television receiver 200 can include set top boxes (STBs). In addition to being in the form of an STB, a television receiver may be incorporated as part of another device, such as a television, other form of display device, video game console, computer, mobile phone or tablet, or the like. For example, a television may have an integrated television receiver, which does not involve an external STB being coupled with the television.

Television receiver 200 may be incorporated as part of a television, such as display device 160 of FIG. 1. Television receiver 200 may include: processors 210, which may include control processor 210a, tuning management processor 210b, and possibly additional processors, tuners 215, network interface 220, non-transitory computer-readable storage medium 225, electronic programming guide (EPG) database 230, television interface 235, digital video recorder (DVR) database 245, which may include provider-managed television programming storage and/or user-defined television programming, on-demand programming database 227, home automation settings database 247, home automation script database 248, remote control interface 250, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210b. Further, functionality of components may be spread among additional components.

Processors 210 may include one or more specialized and/or general-purpose processors configured to perform processes such as tuning to a particular channel, accessing and displaying EPG information from EPG database 230, and/or receiving and processing input from a user. It should be understood that the functions performed by various modules of FIG. 2 may be performed using one or more processors. As such, for example, functions of descrambling engine 265 may be performed by control processor 210a.

Control processor 210a may communicate with tuning management processor 210b. Control processor 210a may control the recording of television channels based on timers stored in DVR database 245. Control processor 210a may also provide commands to tuning management processor 210b when recording of a television channel is to cease. In addition to providing commands relating to the recording of television channels, control processor 210a may provide commands to tuning management processor 210b that indicate television channels to be output to decoder module 233 for output to a display device. Control processor 210a may also communicate with network interface 220 and remote control interface 250. Control processor 210a may handle incoming data from network interface 220 and remote control interface 250. Additionally, control processor 210a may be configured to output data via network interface 220.

Control processor 210a may include home automation engine 211. Home automation engine 211 may permit television receiver and control processor 210a to provide home automation functionality. Home automation engine 211 may have a JSON (JavaScript Object Notation) command interpreter or some other form of command interpreter that is configured to communicate with wireless devices via network interface 220 and a message server, possibly via a message server client. Such a command interpreter of home automation engine 211 may also communicate via a local area network with devices without using the Internet. Home automation engine 211 may contain multiple controllers specific to different protocols; for instance, a ZigBee® controller, a Z-Wave® controller, and/or an IP camera controller, wireless LAN, 802.11, may be present. Home automation engine 211 may contain a media server configured to serve streaming audio and/or video to remote devices on a local area network or the Internet. Television receiver may be able to serve such devices with recorded content, live content, and/or content recorded using one or more home automation devices, such as cameras.

Tuners 215 may include one or more tuners used to tune to transponders that include broadcasts of one or more television channels. Such tuners may be used also to receive for storage on-demand content and/or addressable television commercials. In some embodiments, two, three, or more than three tuners may be present, such as four, six, or eight tuners. Each tuner contained in tuners 215 may be capable of receiving and processing a single transponder stream from a satellite transponder or from a cable network at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210b. Such commands may instruct tuners 215 to which frequencies are to be tuned.

Network interface 220 may be used to communicate via an alternate communication channel with a television service provider, if such communication channel is available. A communication channel may be via satellite, which may be unidirectional to television receiver 200, and the alternate communication channel, which may be bidirectional, may be via a network, such as the Internet. Data may be transmitted from television receiver 200 to a television service provider system and from the television service provider system to television receiver 200. Information may be transmitted and/or received via network interface 220. For instance, instructions from a television service provider may also be received via network interface 220, if connected with the Internet. Besides the primary communication channel being satellite, cable network, an IP-based network, or broadcast network may be used. Network interface 220 may permit wireless communication with one or more types of networks, including using home automation network protocols and wireless network protocols. Also, wired networks may be connected to and communicated with via network interface 220. Device interface 221 may represent a USB port or some other form of communication port that permits communication with a communication device as will be explained further below.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to on-demand programming database 227, EPG database 230, DVR database 245, home automation settings database 247, and/or home automation script database 248. Recorded television programs may be stored using storage medium 225 as part of DVR database 245. Storage medium 225 may be partitioned or otherwise divided, such as into folders, such that predefined amounts of storage medium 225 are devoted to storage of television programs recorded due to user-defined timers and stored television programs recorded due to provider-defined timers.

Home automation settings database 247 may allow configuration settings of home automation devices and user preferences to be stored. Home automation settings database 247 may store data related to various devices that have been set up to communicate with television receiver 200. For instance, home automation settings database 247 may be configured to store information on which types of events should be indicated to users, to which users, in what order, and what communication methods should be used. For instance, an event such as an open garage may only be notified to certain wireless devices, e.g., a cellular phone associated with a parent, not a child, notification may be by a third-party notification server, email, text message, and/or phone call. In some embodiments, a second notification method may only be used if a first fails. For instance, if a notification cannot be sent to the user via a third-party notification server, an email may be sent.

Home automation settings database 247 may store information that allows for the configuration and control of individual home automation devices which may operate using Z-wave and Zigbee-specific protocols. To do so, home automation engine 211 may create a proxy for each device that allows for settings for the device to be passed through a UI, e.g., presented on a television, to allow for settings to be solicited for and collected via a user interface presented by television receiver or overlay device. The received settings may then be handled by the proxy specific to the protocol, allowing for the settings to be passed on to the appropriate device. Such an arrangement may allow for settings to be collected and received via a UI of the television receiver or overlay device and passed to the appropriate home automation device and/or used for managing the appropriate home automation device. For example, a piece of exercise equipment that is enabled to interface with the home automation engine 211, such as via device interface 221, may be configured at the electronic device 211 in addition to on the piece of exercise equipment itself. Additionally, a mobile device or application residing on a mobile device and utilized with exercise equipment may be configured in such a fashion as well for displaying received fitness information on a coupled display device.

Home automation script database 248 may store scripts that detail how home automation devices are to function based on various events occurring. For instance, if stored content starts being played back by television receiver 200, lights in the vicinity of display device 160 may be dimmed and shades may be lowered by communicatively coupled and controlled shade controller. As another example, when a user shuts programming off late in the evening, there may be an assumption the user is going to bed. Therefore, the user may configure television receiver 200 to lock all doors via a lock controller, shut the garage door via garage controller, lower a heat setting of thermostat, shut off all lights via a light controller, and determine if any windows or doors are open via window sensors and door sensors, and, if so, alert the user. Such scripts or programs may be predefined by the home automation/television service provider and/or may be defined by a user.

In some embodiments, home automation script database 248 may allow for various music profiles to be implemented. For instance, based on home automation settings within a structure, appropriate music may be played. For instance, when a piece of exercise equipment is connected or is used, energizing music may be played. Conversely, based on the music being played, settings of home automation devices may be determined. If television programming, such as a movie, is output for playback by television receiver 150, a particular home automation script may be used to adjust home automation settings, e.g., lower lights, raise temperature, and lock doors.

EPG database 230 may store information related to television channels and the timing of programs appearing on such television channels. EPG database 230 may be stored using storage medium 225, which may be a hard drive or solid-state drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220, via satellite, or some other communication link with a television service provider, e.g., a cable network. Updates to EPG database 230 may be received periodically. EPG database 230 may serve as an interface for a user to control DVR functions of television receiver 200, and/or to enable viewing and/or recording of multiple television channels simultaneously. EPG database 240 may also contain information about on-demand content or any other form of accessible content.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265, simultaneously. For instance, decoders within decoder module 233 may be able to only decode a single television channel at a time. Decoder module 233 may have various numbers of decoders.

Television interface 235 may serve to output a signal to a television or another form of display device in a proper format for display of video and playback of audio. As such, television interface 235 may output one or more television channels, stored television programming from storage medium 225, e.g., television programs from DVR database 245, television programs from on-demand programming 230 and/or information from EPG database 230, to a television for presentation. Television interface 235 may also serve to output a customized video mosaic (CVM).

Digital Video Recorder (DVR) functionality may permit a television channel to be recorded for a period of time. DVR functionality of television receiver 200 may be managed by control processor 210a. Control processor 210a may coordinate the television channel, start time, and stop time of when recording of a television channel is to occur. DVR database 245 may store information related to the recording of television channels. DVR database 245 may store timers that are used by control processor 210a to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created; one for each television channel. Within each file, one or more television programs may be present. The service provider may define the television channels, the dates, and the time periods for which the television channels are recorded for the provider-defined timers. The provider-defined timers may be transmitted to television receiver 200 via the television provider's network. For example, in a satellite-based television service provider system, data necessary to create the provider-defined timers at television receiver 150 may be received via satellite.

On-demand programming database 227 may store additional television programming. On-demand programming database 227 may include television programming that was not recorded to storage medium 225 via a timer, either user- or provider-defined. Rather, on-demand programming may be programming provided to the television receiver directly for storage by the television receiver and for later presentation to one or more users. On-demand programming may not be user-selected. As such, the television programming stored to on-demand programming database 227 may be the same for each television receiver of a television service provider. On-demand programming database 227 may include pay-per-view (PPV) programming that a user must pay and/or use an amount of credits to view. For instance, on-demand programming database 227 may include movies that are not available for purchase or rental yet.

Referring back to tuners 215, television channels received via satellite or cable may contain at least some scrambled data. Packets of audio and video may be scrambled to prevent unauthorized users, e.g., nonsubscribers, from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which can be determined to be associated with a particular television channel. Particular data packets, referred to as entitlement control messages (ECMs), may be periodically transmitted. ECMs may be associated with another PID and may be encrypted; television receiver 200 may use decryption engine 261 of security device 260 to decrypt ECMs. Decryption of an ECM may only be possible if the user has authorization to access the particular television channel associated with the ECM. When an ECM is determined to correspond to a television channel being stored and/or displayed, the ECM may be provided to security device 260 for decryption.

When security device 260 receives an encrypted ECM, security device 260 may decrypt the ECM to obtain some number of control words. In some embodiments, from each ECM received by security device 260, two control words are obtained. In some embodiments, when security device 260 receives an ECM, it compares the ECM to the previously received ECM. If the two ECMs match, the second ECM is not decrypted because the same control words would be obtained. In other embodiments, each ECM received by security device 260 is decrypted; however, if a second ECM matches a first ECM, the outputted control words will match; thus, effectively, the second ECM does not affect the control words output by security device 260. Security device 260 may be permanently part of television receiver 200 or may be configured to be inserted and removed from television receiver 200, such as a smart card, cable card, or the like.

Tuning management processor 210b may be in communication with tuners 215 and control processor 210a. Tuning management processor 210b may be configured to receive commands from control processor 210a. Such commands may indicate when to start/stop receiving and/or recording of a television channel and/or when to start/stop causing a television channel to be output to a television. Tuning management processor 210b may control tuners 215. Tuning management processor 210b may provide commands to tuners 215 that instruct the tuners which satellite, transponder, and/or frequency to tune to. From tuners 215, tuning management processor 210b may receive transponder streams of packetized data.

Descrambling engine 265 may use the control words output by security device 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by security device 260 to be used for successful descrambling may be indicated by a scramble control identifier present within the data packet containing the scrambled video or audio. Descrambled video and/or audio may be output by descrambling engine 265 to storage medium 225 for storage, in DVR database 245, and/or to decoder module 233 for output to a television or other presentation equipment via television interface 235.

In some embodiments, the television receiver 200 may be configured to periodically reboot in order to install software updates downloaded over the network 190 or satellites 130. Such reboots may occur for example during the night when the users are likely asleep and not watching television. If the system utilizes a single processing module to provide television receiving and home automation functionality, then the security functions may be temporarily deactivated. In order to increase the security of the system, the television receiver 200 may be configured to reboot at random times during the night in order to allow for installation of updates. Thus, an intruder is less likely to guess the time when the system is rebooting. In some embodiments, the television receiver 200 may include multiple processing modules for providing different functionality, such as television receiving functionality and home automation, such that an update to one module does not necessitate reboot of the whole system. In other embodiments, multiple processing modules may be made available as a primary and a backup during any installation or update procedures.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components.

While the television receiver 200 has been illustrated as a satellite-based television receiver, it is to be appreciated that techniques below may be implemented in other types of television receiving devices, such a cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations. The home automation functions of television receiver 200 may be performed by an overlay device. If such an overlay device is used, television programming functions may still be provided by a television receiver that is not used to provide home automation functions.

Figure 3:
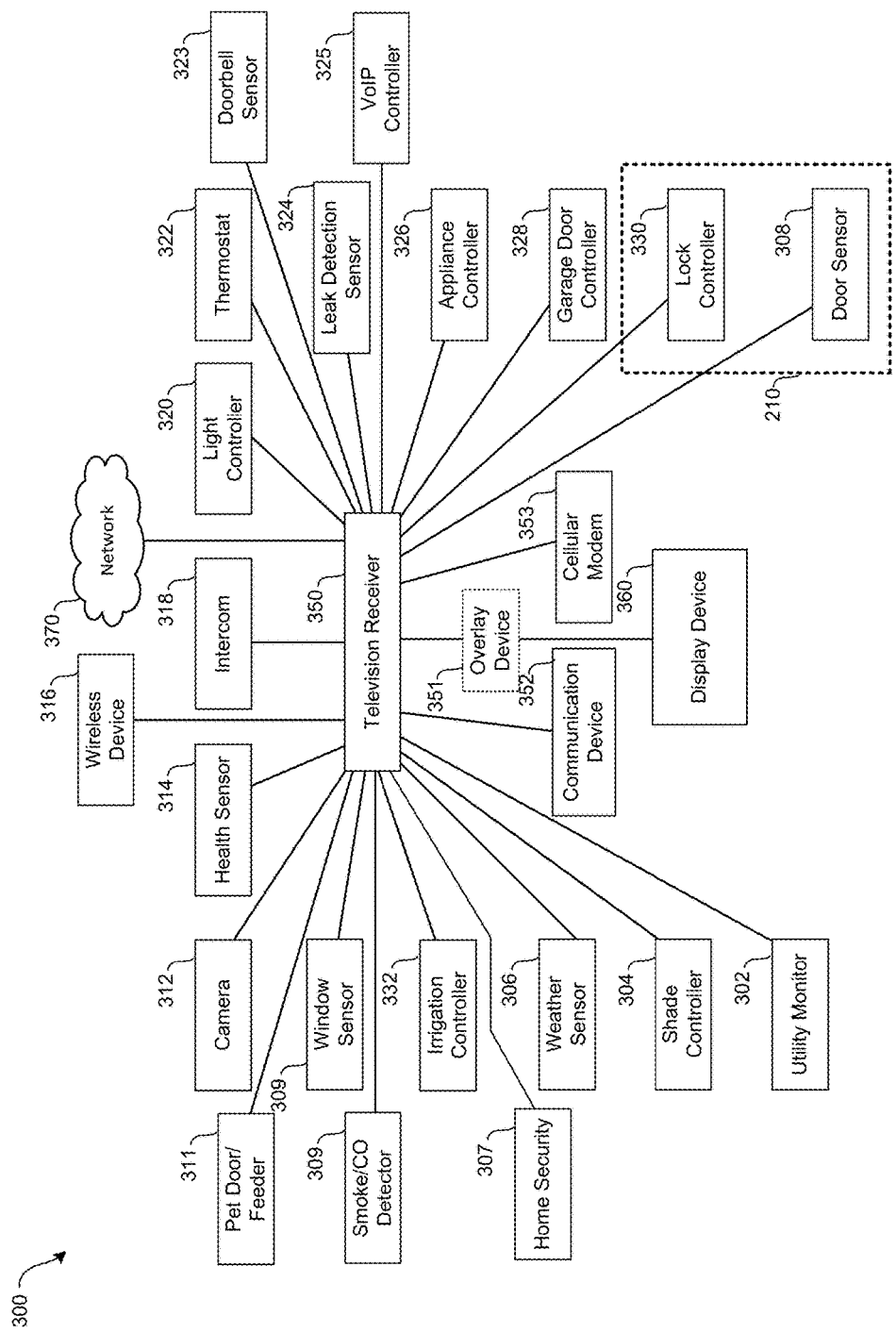
FIG. 3 illustrates an exemplary home automation system setup in accordance with embodiments of the present technology.

FIG. 3 illustrates an embodiment of a home automation system 300 hosted by a television receiver. Television receiver 350 may be configured to receive television programming from a satellite-based television service provider; in other embodiments other forms of television service provider networks may be used, such as an IP-based network (e.g., fiber network), a cable based network, a wireless broadcast-based network, etc.

Television receiver 350 may be configured to communicate with multiple in-home home automation devices. The devices with which television receiver 350 communicates may use different communication standards. For instance, one or more devices may use a ZigBee® communication protocol while one or more other devices communicate with the television receiver using a Z-Wave® communication protocol. Other forms of wireless communication may be used by devices and the television receiver. For instance, television receiver 350 and one or more devices may be configured to communicate using a wireless local area network, which may use a communication protocol such as IEEE 802.11.

In some embodiments, a separate device may be connected with television receiver 350 to enable communication with home automation devices. For instance, communication device 352 may be attached to television receiver 350. Communication device 352 may be in the form of a dongle. Communication device 352 may be configured to allow for Zigbee®, Z-Wave®, and/or other forms of wireless communication. The communication device may connect with television receiver 350 via a USB port or via some other type of (wired) communication port. Communication device 352 may be powered by the television receiver or may be separately coupled with a power source. In some embodiments, television receiver 350 may be enabled to communicate with a local wireless network and may use communication device 352 in order to communicate with devices that use a ZigBee® communication protocol, Z-Wave® communication protocol, and/or some other home wireless communication protocols.

Communication device 352 may also serve to allow additional components to be connected with television receiver 350. For instance, communication device 352 may include additional audio/video inputs (e.g., HDMI), a component, and/or a composite input to allow for additional devices (e.g., Blu-ray players) to be connected with television receiver 350. Such connection may allow video from such additional devices to be overlaid with home automation information. Whether home automation information is overlaid onto video may be triggered based on a user's press of a remote control button.

Regardless of whether television receiver 350 uses communication device 352 to communicate with home automation devices, television receiver 350 may be configured to output home automation information for presentation to a user via display device 360, which may be a television, monitor, or other form of device capable of presenting visual information. Such information may be presented simultaneously with television programming received by television receiver 350. Television receiver 350 may also, at a given time, output only television programming or only home automation information based on a user's preference. The user may be able to provide input to television receiver 350 to control the home automation system hosted by television receiver 350 or by overlay device 351, as detailed below.

In some embodiments, television receiver 350 may not be used as a host for a home automation system. Rather, a separate device may be coupled with television receiver 350 that allows for home automation information to be presented to a user via display device 360. This separate device may be coupled with television receiver 350. In some embodiments, the separate device is referred to as overlay device 351. Overlay device 351 may be configured to overlay information, such as home automation information, onto a signal to be visually presented via display device 360, such as a television. In some embodiments, overlay device 351 may be coupled between television receiver 350, which may be in the form of a set top box, and display device 360, which may be a television. In such embodiments, television receiver 350 may receive, decode, descramble, decrypt, store, and/or output television programming. Television receiver 350 may output a signal, such as in the form of an HDMI signal. Rather than be directly input to display device 360, the output of television receiver 350 may be input to overlay device 351. Overlay device 351 may receive the video and/or audio output from television receiver 350. Overlay device 351 may add additional information to the video and/or audio signal received from television receiver 350. The modified video and/or audio signal may be output to display device 360 for presentation. In some embodiments, overlay device 351 has an HDMI input and an HDMI output, with the HDMI output being connected to display device 360. To be clear, while FIG. 3 illustrates lines illustrating communication between television receiver 350 and various devices, it should be understood that such communication may exist, in addition or alternatively via communication device 352 and/or with overlay device 351.

In some embodiments, television receiver 350 may be used to provide home automation functionality but overlay device 351 may be used to present information via display device 360. It should be understood that the home automation functionality detailed herein in relation to a television receiver may alternatively be provided via overlay device 351. In some embodiments, overlay device 351 may provide home automation functionality and be used to present information via display device 360. Using overlay device 351 to present automation information via display device 360 may have additional benefits. For instance, multiple devices may provide input video to overlay device 351. For instance, television receiver 350 may provide television programming to overlay device 351, a DVD/Blu-Ray player may provide video overlay device 351, and a separate internet-TV device may stream other programming to overlay device 351. Regardless of the source of the video/audio, overlay device 351 may output video and/or audio that has been modified to include home automation information and output to display device 360. As such, in such embodiments, regardless of the source of video/audio, overlay device 351 may modify the audio/video to include home automation information and, possibly, solicit for user input. For instance, in some embodiments, overlay device 351 may have four video inputs (e.g., four HDMI inputs) and a single video output (e.g., an HDMI output). In other embodiments, such overlay functionality may be part of television receiver 350. As such, a separate device, such as a Blu-ray player, may be connected with a video input of television receiver 350, thus allowing television receiver 350 to overlay home automation information when content from the Blu-Ray player is being output to display device 360.

Regardless of whether television receiver 350 is itself configured to provide home automation functionality and output home automation input for display via display device 360 or such home automation functionality is provided via overlay device 351, home automation information may be presented by display device 360 while television programming is also being presented by display device 360. For instance, home automation information may be overlaid or may replace a portion of television programming (e.g., broadcast content, stored content, on-demand content, etc.) presented via display device 360.

Television receiver 350 or overlay device 351 may be configured to communicate with one or more wireless devices, such as wireless device 316. Wireless device 316 may represent a tablet computer, cellular phone, laptop computer, remote computer, or some other device through which a user may desire to control home automation settings and view home automation information. Such a device also need not be wireless, such as a desktop computer. Television receiver 350, communication device 352, or overlay device 351 may communicate directly with wireless device 316, or may use a local wireless network, such as network 370. Wireless device 316 may be remotely located and not connected with a same local wireless network. Via the internet, television receiver 350 or overlay device 351 may be configured to transmit a notification to wireless device 316 regarding home automation information. For instance, in some embodiments, a third-party notification server system, such as the notification server system operated by Apple®, may be used to send such notifications to wireless device 316.

In some embodiments, a location of wireless device 316 may be monitored. For instance, if wireless device 316 is a cellular phone, when its position indicates it has neared a door, the door may be unlocked. A user may be able to define which home automation functions are controlled based on a position of wireless device 316. Other functions could include opening and/or closing a garage door, adjusting temperature settings, turning on and/or off lights, opening and/or closing shades, etc. Such location-based control may also take into account the detection of motion via one or more motion sensors that are integrated into other home automation devices and/or stand-alone motion sensors in communication with television receiver 350.

In some embodiments, little to no setup of network 370 may be necessary to permit television receiver 350 to stream data out to the Internet. For instance, television receiver 350 and network 370 may be configured, via a service such as Sling® or other video streaming service, to allow for video to be streamed from television receiver 350 to devices accessible via the Internet. Such streaming capabilities may be "piggybacked" to allow for home automation data to be streamed to devices accessible via the Internet. For example, U.S. patent application Ser. No. 12/645,870, filed on Dec. 23, 2009, entitled "Systems and Methods for Remotely Controlling a Media Server via a Network", which is hereby incorporated by reference, describes one such system for allowing remote access and control of a local device. U.S. Pat. No. 8,171,148, filed Apr. 17, 2009, entitled "Systems and Methods for Establishing Connections Between Devices Communicating Over a Network", which is hereby incorporated by reference, describes a system for establishing connection between devices over a network. U.S. patent application Ser. No. 12/619,192, filed May 19, 2011, entitled "Systems and Methods for Delivering Messages Over a Network", which is hereby incorporated by reference, describes a message server that provides messages to clients located behind a firewall.

Wireless device 316 may serve as an input device for television receiver 350. For instance, wireless device 316 may be a tablet computer that allows text to be typed by a user and provided to television receiver 350. Such an arrangement may be useful for text messaging, group chat sessions, or any other form of text-based communication. Other types of input may be received for the television receiver from a tablet computer or other device, such as lighting commands, security alarm settings and door lock commands. While wireless device 316 may be used as the input device for typing text, television receiver 350 may output for display text to display device 360.

In some embodiments, a cellular modem 353 may be connected with either overlay device 351 or television receiver 350. Cellular modem 353 may be useful if a local wireless network is not available. For instance, cellular modem 353 may permit access to the internet and/or communication with a television service provider. Communication with a television service provider may also occur via a local wireless or wired network connected with the Internet. In some embodiments, information for home automation purposes may be transmitted by a television service provider system to television receiver 350 or overlay device 351 via the television service provider's distribution network.

Various home automation devices may be in communication with television receiver 350 or overlay device 351. Such home automation devices may use disparate communication protocols. Such home automation devices may communicate with television receiver 350 directly or via communication device 352. Such home automation devices may be controlled by a user and/or have a status viewed by a user via display device 360 and/or wireless device 316. Home automation devices may include: smoke/carbon monoxide detector, home security system 307, pet door/feeder 311, camera 312, window sensor 309, irrigation controller 332, weather sensor 306, shade controller 304, utility monitor 302, heath sensor 314, intercom 318, light controller 320, thermostat 322, leak detection sensor 324, appliance controller 326, garage door controller 328, doorbell sensor 323, and VoIP controller 325.

Door sensor 308 and lock controller 330 may be incorporated into a single device, such as a door lock or sensor unit, and may allow for a door's position (e.g., open or closed) to be determined and for a lock's state to be determined and changed. Door sensor 308 may transmit data to television receiver 350 (possibly via communication device 352) or overlay device 351 that indicates the status of a window or door, respectively. Such status may indicate open or closed. When a status change occurs, the user may be notified as such via wireless device 316 or display device 360. Further, a user may be able to view a status screen to view the status of one or more door sensors throughout the location. Window sensor 309 and/or door sensor 308 may have integrated glass break sensors to determine if glass has been broken. Lock controller 330 may permit a door to be locked and unlocked and/or monitored by a user via television receiver 350 or overlay device 351. A mechanical or electrical component may need to be integrated separately into a door or door frame to provide such functionality. Such a single device may have a single power source that allows for sensing of the lock position, sensing of the door position, and for engagement and disengagement of the lock.

Additional forms of sensors not illustrated in FIG. 3 may also be incorporated as part of a home automation system. For instance, a mailbox sensor may be attached to a mailbox to determine when mail is present and/or has been picked up. The ability to control one or more showers, baths, and/or faucets from television receiver 350 and/or wireless device 316 may also be possible. Pool and/or hot tub monitors may be incorporated into a home automation system. Such sensors may detect whether or not a pump is running, water temperature, pH level, a splash/whether something has fallen in, etc. Further, various characteristics of the pool and/or hot tub may be controlled via the home automation system. In some embodiments, a vehicle dashcam may upload or otherwise make video/audio available to television receiver 350 when within range. For instance, when a vehicle has been parked within range of a local wireless network with which television receiver 350 is connected, video and/or audio may be transmitted from the dashcam to the television receiver for storage and/or uploading to a remote server.

To be clear, the home automation functions detailed herein that are attributed to television receiver 350 may alternatively or additionally be incorporated into overlay device 351 or some separate computerized home automation host system.

Figure 4:
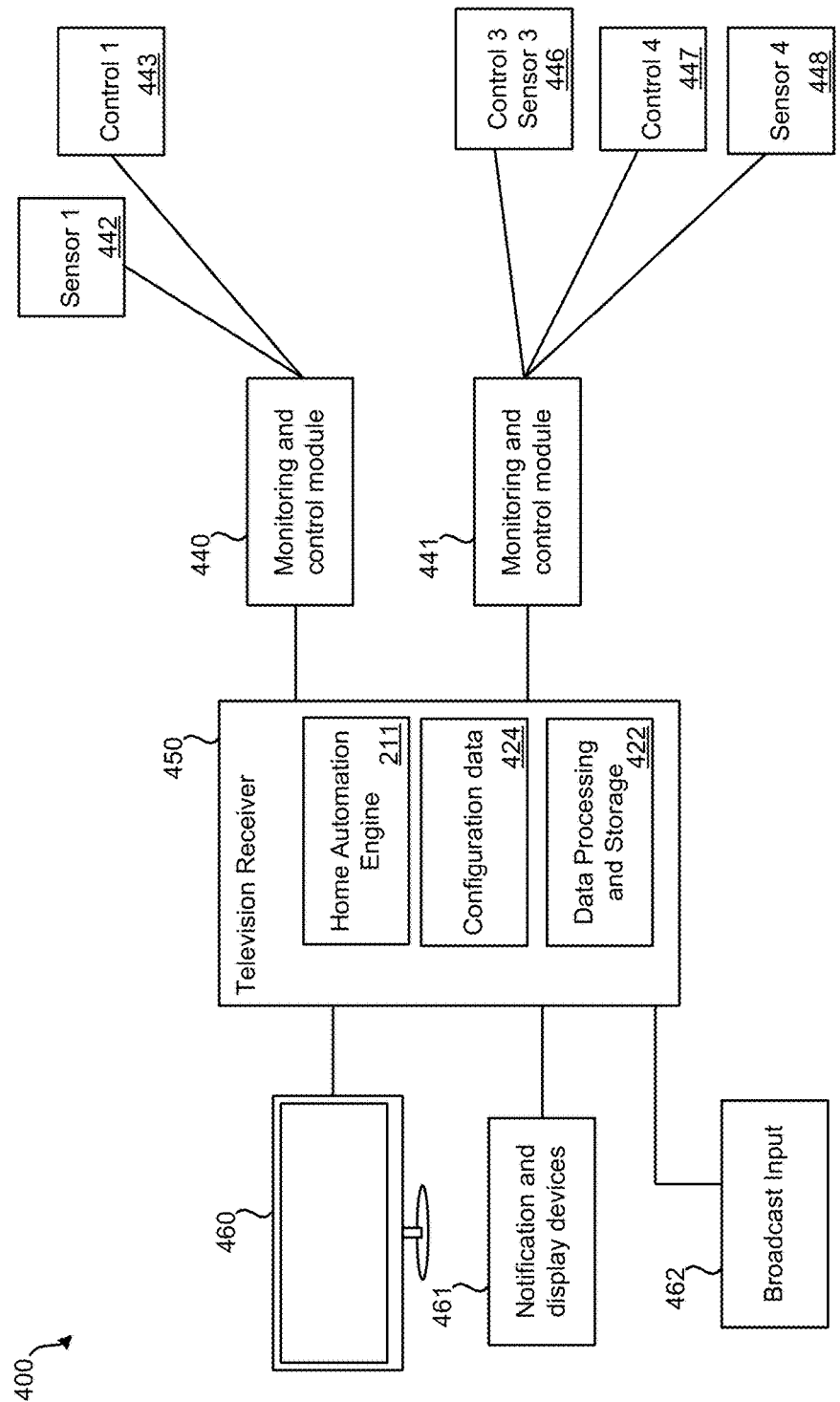
FIG. 4 illustrates an embodiment of a home automation system in accordance with embodiments of the present technology.

FIG. 4 shows an embodiment of a system for home monitoring and control that includes a television receiver 450. The system 400 may include a television receiver that is directly or indirectly coupled to one or more display devices 460 such as a television or a monitor. The television receiver may be communicatively coupled to other display and notification devices 461 such as stereo systems, speakers, lights, mobile phones, tablets, and the like. The television receiver may be configured to receive readings from one or more sensors 442, 448, or sensor systems 446 and may be configured to provide signals for controlling one or more control units 443, 447 or control systems 446.

In embodiments the television receiver may include a monitoring and control module 440, 441 and may be directly or indirectly connected or coupled to one or more sensors and/or control units. Sensors and control units may be wired or wirelessly coupled with the television receiver. The sensors and control units may be coupled and connected in a serial, parallel, star, hierarchical, and/or the like topologies and may communicate to the television receiver via one or more serial, bus, or wireless protocols and technologies which may include, for example, WiFi, CAN bus, Bluetooth, I2C bus, ZigBee, Z-Wave and/or the like.

The system may include one or more monitoring and control modules 440, 441 that are external to the television receiver 450. The television receiver may interface to sensors and control units via one or more of the monitoring and control modules. The external monitoring and control modules 440, 441 may be wired or wirelessly coupled with the television receiver. In some embodiments, the monitoring and control modules may connect to the television receiver via a communication port such as a USB port, serial port, and/or the like, or may connect to the television receiver via a wireless communication protocol such as Wi-Fi, Bluetooth, Z-Wave, ZigBee, and the like. The external monitoring and control modules may be a separate device that may be positioned near the television receiver or may be in a different location, remote from the television receiver.

In embodiments, the monitoring and control modules 440, 441 may provide protocol, communication, and interface support for each sensor and/or control unit of the system. The monitoring and control module may receive and transmit readings and provide a low level interface for controlling and/or monitoring the sensors and/or control units. The readings processed by the monitoring and control modules 440, 441 may be used by the other elements of the television receiver. For example, in some embodiments the readings from the monitoring and control modules may be logged and analyzed by the data processing and storage 422 module. The data processing and storage 422 module may analyze the received data and generate control signals, schedules, and/or sequences for controlling the control units. Additionally, the data processing and storage module 422 may utilize input data to generate additional outputs. For example, the module 422 may receive from a sensor 442 information from a communicatively coupled piece of equipment. The sensor may be a part of or attached to the equipment in various embodiments. The equipment may provide information regarding movements, alarms, or notifications associated with the home, and the data processing module 422 may use this data to generate relative distance information to be output to and displayed by display device 460. In some embodiments, the monitoring and control modules 440, 441 may be configured to receive and/or send digital signals and commands to the sensors and control units. The monitoring and control modules may be configured to receive and/or send analog signals and commands to the sensors and control units.

Sensors and control units may be wired or wirelessly coupled to the monitoring and control modules 440, 441 or directly or indirectly coupled with the receiver 450 itself. The sensors and control units may be coupled and connected in a serial, parallel, star, hierarchical, and/or the like topologies and may communicate to the monitoring and control modules via one or more serial, bus, or wireless protocols and technologies. The sensors may include any number of temperature, humidity, sound, proximity, field, electromagnetic, magnetic sensors, cameras, infrared detectors, motion sensors, pressure sensors, smoke sensors, fire sensors, water sensors, and/or the like. The sensors may also be part of or attached to other pieces of equipment, such as exercise equipment, doors or windows, or home appliances, or may be applications or other sensors as part of mobile devices.

The monitoring and control modules 440, 441 may be coupled with one or more control units. The control units may include any number of switches, solenoids, solid state devices and/or the like for making noise, turning on/off electronics, heating and cooling elements, controlling appliances, HVAC systems, lights, and/or the like. For example, a control unit may be a device that plugs into an electrical outlet of a home. Other devices, such as an appliance, may be plugged into the device. The device may be controlled remotely to enable or disable electricity to flow to the appliance. A control unit may also be part of an appliance, heating or cooling system, and/or other electric or electronic devices. In embodiments the control units of other system may be controlled via a communication or control interface of the system. For example, the water heater temperature setting may be configurable and/or controlled via a communication interface of the water heater or home furnace. Additionally, received telephone calls may be answered or pushed to voicemail in embodiments.

The controllers, e.g., controller 443, may include a remote control designed for association with the television receiver. For example, the receiver remote control device may be communicatively coupled with the television receiver, such as through interface 250, or one or more of the monitoring and control modules for providing control or instruction for operation of the various devices of the system. The control may be utilized to provide instructions to the receiver for providing various functions with the automation system including suspending alert notifications during an event. For example, a user may determine prior to or during an event that he wishes to suspend one or more types of notifications until the event has ended, and may so instruct the system with the controller.

Sensors may be part of other devices and/or systems. For example, sensors may be part of a mobile device such as a phone. The telemetry readings of the sensors may be accessed through a wireless communication interface such as a Bluetooth connection from the phone. As another example, temperature sensors may be part of a heating and ventilation system of a home. The readings of the sensors may be accessed via a communication interface of the heating and ventilation system. Sensors and/or control units may be combined into assemblies or units with multiple sensing capabilities and/or control capabilities. A single module may include, for example a temperature sensor and humidity sensor. Another module may include a light sensor and power or control unit and so on.

In embodiments, the sensors and control units may be configurable or adjustable. In some cases the sensors and control units may be configurable or adjustable for specific applications. The sensors and control units may be adjustable by mechanical or manual means. In some cases the sensors and control units may be electronically adjustable from commands or instructions sent to the sensors or control units. For example, the focal length of a camera may be configurable in some embodiments. The focal length of a camera may be dependent on the application of the camera. In some embodiments the focal length may be manually set or adjusted by moving or rotating a lens. In some embodiments the focal length may be adjusted via commands that cause an actuator to move one or more lenses to change the focal length. In other embodiments, the sensitivity, response, position, spectrum and/or like of the sensors may be adjustable.

During operation of the system 400, readings from the sensors may be collected, stored, and/or analyzed in the television receiver 450. In embodiments, analysis of the sensors and control of the control units may be determined by configuration data 424 stored in the television receiver 450. The configuration data may define how the sensor data is collected, how often, what periods of time, what accuracy is required, and other characteristics. The configuration data may specify specific sensor and/or control unit settings for a monitoring and/or control application. The configuration data may define how the sensor readings are processed and/or analyzed. For example, for some applications, sensor analysis may include collecting sensor readings and performing time based analysis to determine trends, such as temperature fluctuations in a typical day or energy usage. Such trending information may be developed by the receiver into charts or graphs for display to the user. For other applications, sensor analysis may include monitoring sensor readings to determine if a threshold value of one or more sensors has been reached.

The function of the system may be determined by loading and/or identifying configuration data for an application. In embodiments, the system 400 may be configured for more than one monitoring or control operation by selecting or loading the appropriate configuration data. In some embodiments the same sensors and/or control units may be used for multiple applications depending on the configuration data used to process and analyze sensor readings and/or activate the control units. Multiple monitoring and/or control applications may be active simultaneously or in a time multiplexed manner using the same or similar set of sensors and/or control units.

For example, the system 400 may be configured for both exercise monitoring and temperature monitoring applications using the same set of sensors. In embodiments, both monitoring applications may be active simultaneously or in a time multiplexed manner depending on which configuration data is loaded. In both monitoring applications the same sensors, such as proximity sensors, or cameras may be used. Using the same sensors, the system may be configured for space temperature monitoring. For temperature monitoring, the system may only monitor a specific subset of the sensors for activity. For temperature monitoring, sensor activity may not need to be saved or recorded. The sensor readings may be monitored for specific thresholds which may indicate a threshold temperature for adjusting the space temperature. In this example, the two different monitoring examples may be selected based on the active configuration data. When one configuration data is active, data from the sensors may be saved and analyzed. When the second configuration data is active, the system may monitor sensor readings for specific thresholds. Of course, multiple or alternative sensors may be used as well.

In embodiments, the results, status, analysis, and configuration data details for each application may be communicated to a user. In embodiments, auditory, visual, and tactile communication methods may be used. In some cases a display device such as a television may be used for display and audio purposes. The display device may show information related to the monitoring and control application. Statistics, status, configuration data, and other elements may be shown. Users may also save particular configuration data for devices, such as notification suspensions while the user is using the coupled display. A user may log in or be recognized by the system upon activation and the system may make adjustments based on predetermined or recorded configuration data. For example, a user may have instructed that when he is recognized by the system, either automatically or with provided login information, a notification suspension profile personal to the user be enacted. That profile may include that the user would like to continue to receive alarms, such as smoke, fire, or hazard alarms, but that received telephone call information is suspended. The user may access the profile and select to begin, the user may be recognized by the system, or a combination such as being recognized by the system such that the television operations are performed or are input by a remote control, while the user himself selects a particular activity to perform with the system.

Any number of additional adjustments or operations may be performed as well, as would be understood as encompassed by the present technology. For example, the space temperature may be monitored or adjusted as well. In one situation, after the user has been exercising for a period of time, generated heat may raise the space temperature above a threshold such that the home automation engine 211 additionally begins operation or adjustment of the HVAC system to cool the space. Additionally, configuration data for the user may include reducing the space temperature to a particular degree based on a preference of the user. Thus, when the user loads a profile or begins exercising, the home automation system may automatically begin adjusting the space temperature as well in anticipation of heat generation or user preferences.

In embodiments, the system may include additional notification and display devices 461 capable of notifying the user, showing the status, configuration data, and/or the like. The additional notification and display devices may be devices that are directly or indirectly connected with the television receiver. In some embodiments computers, mobile devices, phones, tablets, and the like may receive information, notifications, control signals, etc., from the television receiver. Data related to the monitoring and control applications and activity may be transmitted to remote devices and displayed to a user. Such display devices may be used for presenting to the user interfaces that may be used to further configure or change configuration data for each application. An interface may include one or more options, selection tools, navigation tools for modifying the configuration data which in turn may change monitoring and/or control activity of an application. Modification to a configuration may be used to adjust general parameters of a monitoring application to specific constraints or characteristics of a home, user's schedule, control units, and/or the like.

Display interfaces may be used to select and/or download new configurations for monitoring and/or control applications. A catalog of pre-defined configuration data definitions for monitoring and control applications may be available to a user. A user may select, load, and/or install the applications on the television receiver by making a selection using in part the display device. For example, a user may load a profile based on notification suspension preferences as discussed above. In embodiments, configuration data may be a separate executable application, code, package, and/or the like. In some cases, the configuration data may be a set of parameters that define computations, schedules, or options for other processor executable code or instructions. Configuration data may be a meta data, text data, binary file, and/or the like.

In embodiments, notification and display devices may be configured to receive periodic, scheduled, or continuous updates for one or more monitoring and control applications. The notifications may be configured to generate pop-up screens, notification banners, sounds, and/or other visual, auditory, and/or tactile alerts. In the case where the display device is a television, some notifications may be configured to cause a pop-up or banner to appear over the programming or content being displayed, such as when a proximity monitor has been triggered in the home. Such an alert may be presented in a centrally located box or in a position different from the fitness information to make it more recognizable. Additionally the program being watched can be paused automatically while such an alert is being presented, and may not be resumed unless receiving an input or acceptance from the user. Some notifications may be configured to cause the television to turn on if it is powered off or in stand-by mode and display relevant information for a user. In this way, users can be warned of activity occurring elsewhere in the system.

The television receiver may also be configured to receive broadcast or other input 462. Such input may include television channels or other information previously described that is used in conjunction with the monitoring system to produce customizable outputs. For example, a user may wish to watch a particular television channel while also receiving video information of activities occurring on the property. The television receiver may receive both the exterior camera information and television channel information to develop a modified output for display. The display may include a split screen in some way, a banner, an overlay, etc.

Figure 5:
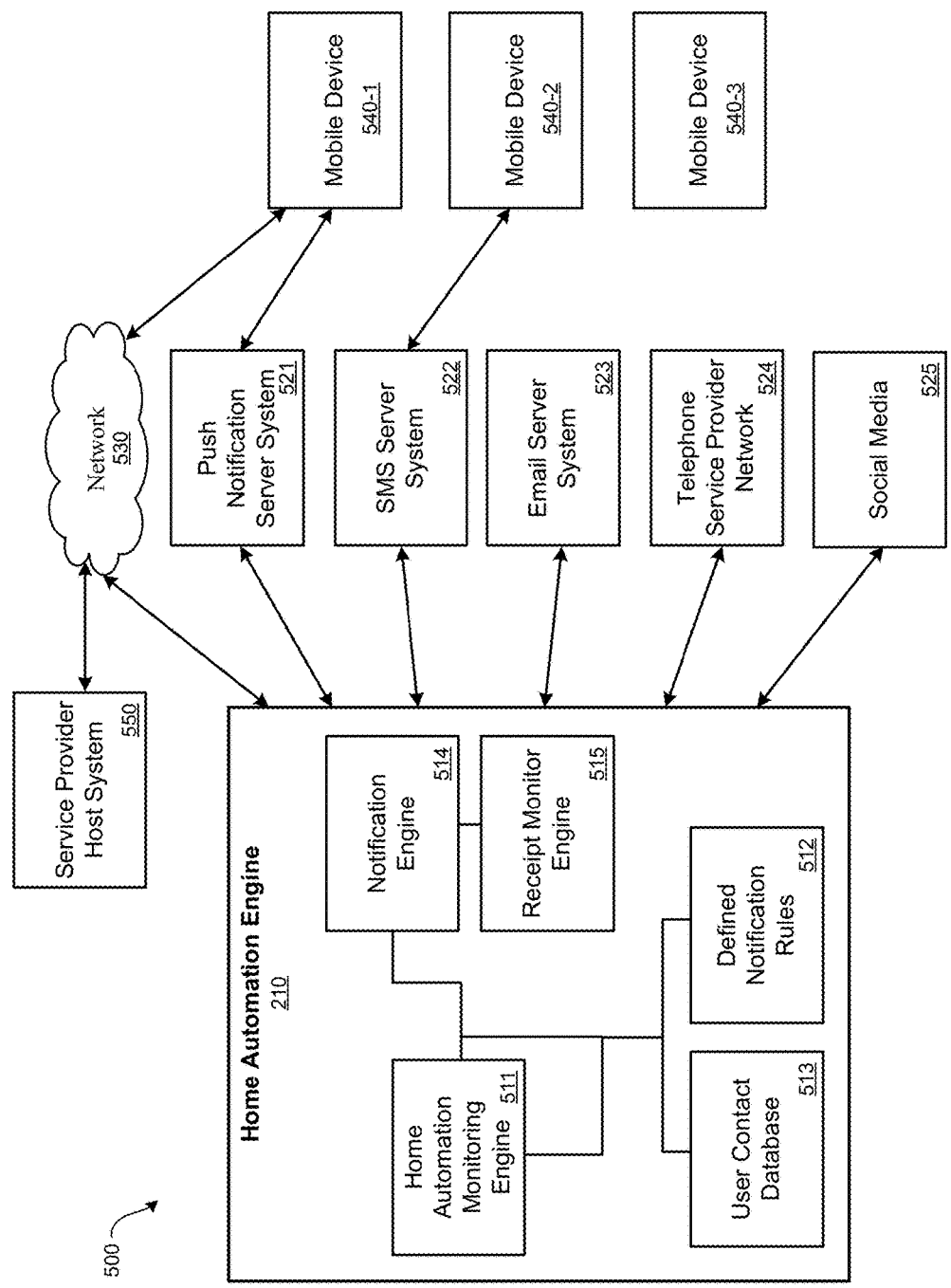
FIG. 5 illustrates an embodiment of a home automation engine using various communication paths to communicate with one or more mobile devices in accordance with embodiments of the present technology.

FIG. 5 illustrates an embodiment 500 of a home automation engine using various communication paths to communicate with one or more mobile devices. Embodiment 500 may include: home automation engine 210, push notification server system 521, SMS server system 522, email server system 523, telephone service provider network 524, social media 525, network 530, and mobile devices 540 (540-1, 540-2, 540-3).

Home automation engine 210 may represent hardware, firmware, and/or software that are incorporated as part of the home automation host system, such as television receiver 350, communication device 352, or overlay device 351 of FIG. 3. Home automation engine 210 may include multiple components, which may be implemented using hardware, firmware, and/or software executed by underlying computerized hardware. Home automation engine 210 may include: home automation monitoring engine 511, defined notification rules 512, user contact database 513, notification engine 514, and receipt monitor engine 515.

Home automation monitoring engine 511 may be configured to monitor various home automation devices for events, status updates, and/or other occurrences. Home automation monitoring engine 511 may monitor information that is pushed to home automation engine 210 from various home automation devices. Home automation monitoring engine 511 may additionally or alternatively query various home automation devices for information. Defined notification rules 512 may represent a storage arrangement of rules that were configured by a user. Such defined notification rules may indicate various states, events, and/or other occurrences on which the user desires notifications to be sent to one or more users. Defined notification rules 512, which may be stored using one or more non-transitory computer readable mediums, may allow a user to define or select a particular home automation device, an event or state of the device, a user or group of users, and/or classification of the home automation state or event. For example, Table 1 presents three examples of defined notification rules which may be stored as part of defined notification rules 512. In some embodiments, it may be possible that the service provider provides home automation engine 210 with one or more default defined home automation notification rules. A user may enable or disable such default defined notification rules and/or may be permitted to create customized notification rules for storage among defined notification rules 512. A user may be permitted to enable and disable such defined notification rules as desired.

TABLE 1

| Rule Name | Home Automation Device | Rule Trigger | Action | Classification | First group of users to notify | Second (fallback) group of users to notify |
|---|---|---|---|---|---|---|
| "Person at Door" | Doorbell Sensor | Doorbell actuation event | Send Notification [Text of Notification] [Coded Notification] | Class 1 | Defined community 1 | Default |
| "Window Open?" | Window Sensor | [Window state] = open | Send Notification [Text of Notification] [Coded Notification] | Class 2 | Custom: Thomas, Jeff, Jason, Andrew | None |
| "Door Left Ajar" | Door Sensor | [Door state] = open >30 seconds | Send Notification [Text of Notification] [Coded Notification] | Urgent | Defined communities 1 and 3 | Defined Community 4 |

In Table 1, a user (or service provider) has defined a rule name, the relevant home automation device, the trigger that causes the rule to be invoked, the action to be performed in response to the rule being triggered, the classification of the rule, a first group of users to send the notification, and a second group of users to notify if communication with the first group of users fails. To create a rule, home automation engine 210 may output a user interface that walks a user through creation of the rule such as by presenting the user with various selections. As an example, a user may first type in a name for rule. Next, the user may be presented with a list of home automation devices that are present in the home automation network with which home automation engine 210 is in communication. The user may then be permitted to select among triggers that are applicable to the selected home automation device, such as events and states that can occur at the selected home automation device. For instance, home automation devices such as a doorbell sensor may only have a single possible event: a doorbell actuation. However, in other home automation devices, such as garage door controller 128 may have multiple states, such as open, shut, and ajar. Another possible state or event may be a low battery state or event. Next, the user may select the action that the home automation engine is to perform in response to the trigger event for the home automation device occurring. For the three examples of Table 1, notifications are to be sent to various groups (called "communities") of users.

In some embodiments, a user may be permitted to select a classification for each rule. The classification may designate the urgency of the rule. Depending on the classification, the communication channels tried for communication with the user and/or the amount of time for which home automation engine 210 waits for a response before trying another communication channel may be controlled. The user may also define one or more groups of users that are to receive the notifications. The first group of users may include one or more users and may indicate which users are to initially receive a notification. The second group of users may remain undefined for a particular rule or may specify one or more users that are to receive the notification if the notification failed to be received by one, more than one, or all users indicated as part of the first group of users.

If a particular grouping of users is to collectively receive notifications, a user may be permitted to define a "community" rather than specifying each user individually. For instance, a user may select from among available users to create "defined community 1," which may include users such as: "Thomas," "Nick," and "Mary." By specifying "defined community 1" the user may not have to individually select these three users in association with the rule. Such a use of defined communities is exemplified in Table 1.

User contact database 513 may specify definitions of groups of users and orderings of communication paths for individual users and/or classifications. Table 2 presents an exemplary embodiment of an ordering of communication paths for particular user.

TABLE 2

| User Name | First Communication Path | Second Communication Path | Third Communication Path | Fourth Communication Path |
|---|---|---|---|---|
| Andrew | Push Notification | SMS Text Message | Email (Fail) | Social Media Post (Fail) |
| Jeff | SMS Text Message | Push Notification | Voice call | Email (fail) |
| Jason | Push Notification | SMS Text | Email (Fail) | — |
| Thomas | SMS Text | Voice Call | — | — |

For each user, one or more communication paths are defined. For example, for the user named Andrew, the first communication path is a push notification. His second communication Path is an SMS text message. The SMS text message may be used as the communication path if a receipt response is not received in response to transmission of a push notification within a defined period of time. Similarly, if the second communication path fails to yield a receipt being received by receipt monitor engine 515 after a predefined period of time, an email, which is Andrew's third communication path, may be used to send the notification. Entries in Table 2 labeled as "Fail" may be indicative of a communication path that may receive the notification but from which a receipt is not expected and is treated as a failed communication attempt. For instance, an email sent to an email address associated with Andrew may go through and may be accessible by Andrew the next time he accesses his email account; however, notification engine 514 may send the notification via the fourth communication path without waiting a defined period of time since a receipt is not expected to be received in response to the email. For different users, different communication paths may be ordered differently. For instance, an SMS text message is defined as Jeff's first communication path while an SMS text message is defined as Andrew's second communication path. Each user via an application on his or her mobile device, or by directly interacting with the home automation host system executing home automation engine 210, may customize which communication paths are used for their notifications and the ordering of such communication paths.

For each type of communication path, a default period of time to wait for a receipt response may be defined. For instance, for push notifications, a default wait period of time may be one minute, while the default wait period of time for an SMS text message may be two minutes. Such wait periods of time may be tied to the classification of the rule. For instance, a classification of urgent may cause the period of time to be halved. In some embodiments, a user can customize his wait periods of time. For users, various alternate orderings of communication paths may be created based on the classification of the rule and/or whether the user is part of the first group of users or the second, fallback group of users.

When home automation monitoring engine 511 determines that a rule of defined notification rules 512 has been triggered, notification engine 514, by accessing user contact database 513, may begin transmitting one or more notifications to one or more users using one or more communication paths. Notification engine 514 may be configured to try communicating with the user via a first communication path, then waiting a defined period of time to determine if a receipt is received in response notification. If not, notification engine 514 may use user contact database 513 to determine the next communication path for use in communicating with the user. Notification engine 514 may then use such a communication path to try to communicate with the user. Notification engine 514 may determine when communication with a particular user has failed and, if available, a second group of users, which can be referred to as a fallback group of users, should receive a notification instead. In such an instance, notification engine 514 may then use user contact database 513 in order to communicate with the second group of users via the ordering of defined communication paths.

While notification engine 514 may cause notifications to be transmitted to users via various communication paths, receipt monitor engine 515 may monitor for received receipts that are indicative of delivery of the notification. Receipt monitor engine 515 may inform notification engine 514 when a notification has been received and further notifications to that user are unnecessary. Receipt monitor engine 515 may cause information to be stored by home automation engine 210 indicative of the circumstances under which the notification was received. For instance, receipt monitor engine 515 may create a database entry that is indicative of the user, the time of receipt (or of viewing by the user), and the communication path that was successful in causing the notification to reach the user.

Illustrated in embodiment 500 are various communication paths that may be used by notification engine 514 for communicating with various users' mobile devices. These communication paths include: push notification server system 521, SMS server system 522, email server system 523, telephone service provider network 524, social media 525, and network 530. Push notification server system 521 may be a system that causes a mobile device to display a message such that the message must be actively dismissed by the user prior to or otherwise interacting with the mobile device. As such, a push notification has a high likelihood of being viewed by user since the user is required to dismiss the push notification before performing any other functions, home automation related or not, with the mobile device.

SMS server system 522 may cause text messages to be sent to mobile devices. Typically, a mobile device provides an alert, such as a sound of flashing light or vibration to user to indicate that a new text message has been received. However, it is possible for a user to interact with a mobile device that has received a new SMS text message without viewing or otherwise interacting with the text message. Other forms of messaging systems may additionally or alternatively be used, such as Apple's iMessage service. Email server system 523 may serve as an email service provider for user. An email transmitted to a user, that is sent to email server system 523 may be viewed by the user the next time the user accesses email server system 523. In some embodiments, emails are actively pushed by email server system 523 to an application being executed by a user's mobile device, thus increasing the likelihood that a user will look at the email shortly after it has been sent. In other embodiments, a user's mobile device may be required to be triggered by the user to retrieve emails from email server system 523, such as by executing an application associated with the email server system or by logging in to the user's email account via a web browser being executed by the mobile device.

Telephone service provider network 524 may permit voice calls to be performed to a mobile device. A user operating such a mobile device may answer a telephone call to hear a recorded message that is transmitted by notification engine 514 or, if the user does not answer, a voicemail may be left for the user using telephone service provider network 524. Social media 525 may represent various social media networks through which notification engine 514 can try to communicate with the user. Social media may for example include: Twitter®, Facebook®, Tumblr®, LinkedIn®, and/or various other social networking websites. Notification engine 514 may directly transmit a message to a user via social media 525 (e.g., Facebook® Messenger) or may create a post to one or more social media websites via a shared or dedicated social media account that could be viewed by the user. For example, notification engine 514 may have login credentials to a Twitter® account that can be used to post a message indicative of the home automation notification. If the user is following the Twitter® account associated with the notification engine, the notification would be listed in the user's Twitter® feed. If such posts are public (that is, available to be viewed by members of the public, such as on Twitter®), the social media post may be "coded" such that it would only make sense to the user. A user, by configuring an alternate notification text at home automation engine 210 (as indicated in Table 1) may assign coded words or phrases to various home automation events that would be posted to public social media. For instance the door being left ajar may be assigned: "The cat is out of the bag" is a coded message to be posted to social media, while a direct message (e.g., SMS text message) would not be coded, such as: "Your home's front door is ajar." While to a member of the public, a coded notification may be nonsensical, to the user who configured the notification, the coded notification may be quickly interpreted as meaning his home's front door has been left ajar.

Network 530 may represent one or more public and/or private networks through which notification engine 514 and receipt monitor engine 515 may communicate with a mobile device. For instance network 530 may represent a home wireless network, such as network 170, and/or the Internet. For instance, if notification engine 514 has an IP address of mobile device 540-1, it may be possible for notification engine 514 to directly transmit a notification via network 530 to mobile device 540-1. Additionally or alternatively, mobile device 540-1 may be executing an application that can communicate directly with home automation engine 210 via network 530. Home automation engine 210 and a mobile device may alternatively or additionally communicate with service provider host system 550, which is accessible via network 530, and serves as an intermediary for communications between home automation engine 210 and mobile device. For instance, a message to be transmitted from mobile device 540-1 to home automation engine 210 may be transmitted by mobile device 540-1 to service provider host system 550 via network 530. Home automation engine 210 may periodically query service provider host system 550 via network 530 to determine if any messages are pending for home automation engine 210. In response to such a query, the message transmitted by mobile device 540-1 destined for home automation engine 210 may be retrieved by home automation engine 210.

Three mobile devices are illustrated in embodiment 500. Each of such mobile devices may be associated with a different user. In embodiment 500, such mobile devices are shown as only being available via specific communication paths. This is for example purposes only. For instance, mobile device 540-1 can communicate with home automation engine 210 via push notification server system 521 (which may be unidirectional to mobile device 540-1), and network 530 (such as via communications coordinated by service provider host system 550). Mobile device 540-2 may, for some reason, be unable to receive push notifications sent via push notification server system 521 but may be able to send and receive SMS texts via SMS server system 522. Mobile device 540-3 may be currently unavailable via any of the illustrated communication paths. For example, based on where mobile device 540-3 is located, it may be unable to communicate with a wireless network that enables access to one or more of the communication paths illustrated in FIG. 5 or the mobile device may be turned off.

It should be understood that the communication paths, components of home automation engine 210, and the number of mobile devices 540 are intended to represent examples. For instance, notifications may be sent to types of devices other than mobile devices. For instance, for a user, while the first notification may be sent to the user's mobile device, a second communication path may communicate with the user's desktop computer. Further various components of home automation engine 210 may be divided out into a greater number of components or may be combined into fewer components.

Figure 6:
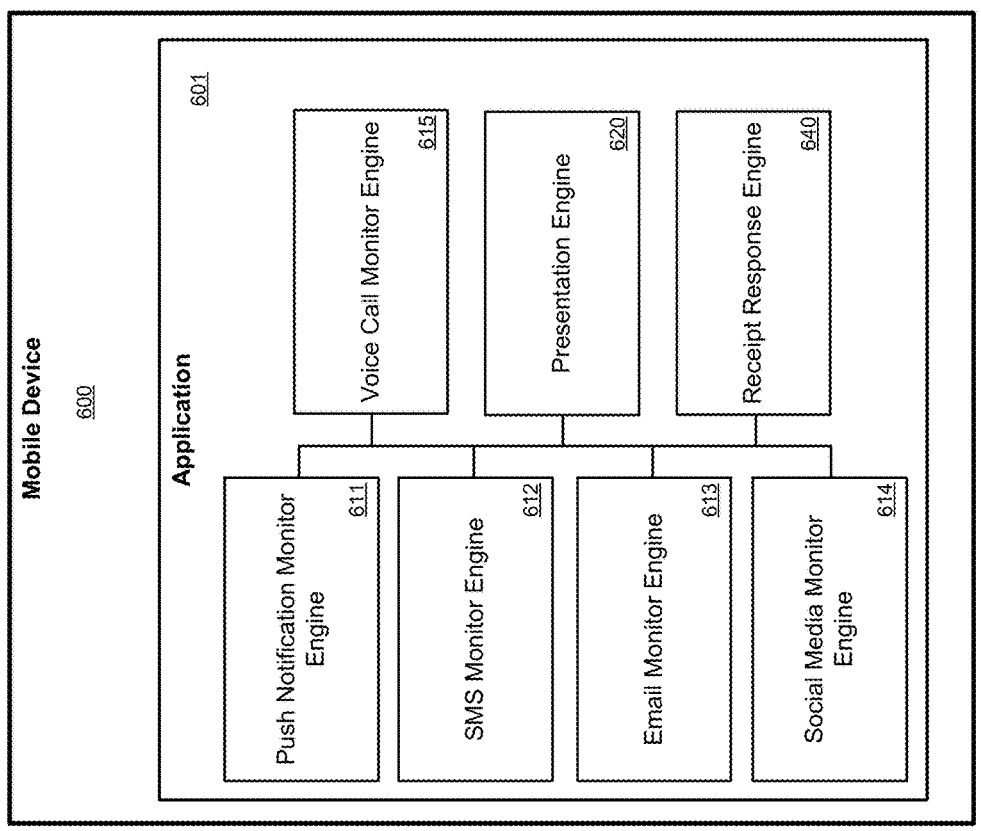
FIG. 6 illustrates an embodiment of a mobile device executing an application that monitors various communication paths in accordance with embodiments of the present technology.

FIG. 6 illustrates an embodiment of a mobile device 600 executing an application that monitors various communication paths. Mobile device 600 may represent each of mobile devices 540 or some other form of mobile device that is receiving notifications from a home automation engine via various possible communication paths. Mobile device 600, which may be a cellular phone, smart phone, smart television, smart watch, smart glasses, table computer, laptop, in-dash network-enabled navigation system, or other form of a wireless and/or mobile computerized device, may execute application 601. Application 601 may be executed in the background such that when a user is not interacting with application 601, a process of application 601 can monitor various communication paths of mobile device 600. A user may also bring application 601 to the foreground, such that the user can view a user interface of application 601 and generally interact with application 601. Application 601 may include: push notification monitor engine 611, SMS monitor engine 612, email monitor engine 613, social media monitor engine 614, voice call monitor engine 615, presentation engine 620, and receipt response engine 640. Such modules may be implemented using software that is executed on underlying hardware.

Push notification monitor engine 611 may monitor for when a push notification is received by mobile device 600 that includes a notification from notification engine 514 of home automation engine 210. The operating system of mobile device 600 may cause the push notification to be presented by a display of mobile device 600 such that a user is required to view and dismiss the push notification before performing any other function on mobile device 600. The push notification, when displayed, may present text of the push notification indicative of the home automation event. For instance, returning to Table 1 for the "Person at Door" event, the corresponding [Text of Notification] from the event may be presented as part of the push notification. Additional information may include the time at which the event occurred and a location of the home automation engine (which may be useful if the user has home automation systems installed at multiple locations, such as a primary home, office building, and vacation home). Push notification monitor engine 611 may determine 1) that the push notification has been received by mobile device 600; and 2) if the user has dismissed the push notification.

SMS monitor engine 612 may monitor for when a text message is received by mobile device 600 that includes a notification from notification engine 514 of home automation engine 210. SMS monitor engine 612 may monitor for a particular string of characters that is indicative of the home automation engine 210 or the source number from which the SMS text message may be indicative of the home automation engine. The operating system of mobile device 600 may cause the text message to be stored and may cause the mobile device 600 to output vibration, sound, and/or light indicative of the received text message. The user may need to select the text message for presentation or the text message may be automatically displayed by mobile device 600. The text of the SMS message may present text indicative of the home automation event. For instance, as with the push message, returning to Table 1 for the "Person at Door" event, the corresponding [Text of Notification] from the event may be presented as part of the SMS message. Additional information may include the time at which the event occurred and a location of the home automation engine. SMS monitor engine 612 may determine 1) that the SMS message containing the notification has been received by mobile device 600; and 2) if the user has viewed the SMS text containing the notification.

Email monitor engine 613 may monitor for when an email is received by mobile device 600 that includes a notification from notification engine 514 of home automation engine 210. Email monitor engine 613 may monitor for a particular string of characters in either the body or subject line of the email that is indicative of the home automation engine 210 or the sender from which the email was received may be indicative of the home automation engine. The email may be added to an inbox of mobile device 600 and an operating system of mobile device 600 may cause vibration, sound, and/or light to be output that is indicative of the received email. The user may need to select an email application and the email for the email to be presented by mobile device 600. The text of the email may present text indicative of the home automation event. For instance, as with the push message and the SMS text message, returning to Table 1 for the "Person at Door" event, the corresponding [Text of Notification] from the event may be presented as part of the SMS message. Additional information may include the time at which the event occurred and a location of the home automation engine. Since an email can contain significantly more information than an SMS text or push notification, more details regarding the home automation event and system may be presented as part of the email. Email monitor engine 613 may determine 1) that the email message containing the notification has been received by mobile device 600; and 2) if the user has opened the email containing the notification.

Social media monitor engine 614 may monitor for when a social media post is made by home automation engine 210 that is indicative of a notification. As such, social media monitor engine 614 may periodically check one or more social media feeds for posts either privately sent to a user of mobile device 600 or publically posted. Social media monitor engine 614 may monitor for a particular string of characters that is indicative of the home automation engine 210 or the username or account from which the post was made which is indicative of the home automation engine. The text of the social media post may present text indicative of the home automation event. For instance, as with the push message, returning to Table 1 for the "Person at Door" event, the corresponding [Text of Notification] from the event may be presented as part of the social media post. If the post is made publically, a code message may be posted instead of the [Text of Notification]. For instance, referring to Table 1, [Coded Notification] may be publically posted instead of [Text of Notification]. Additional information posted may include the time at which the event occurred and a location of the home automation engine. Social media monitor engine 614 may determine 1) mobile device 600 has received the social media post (e.g., in an updated Twitter® feed); and 2) if the user has viewed the social media message containing the notification or the social media feed containing the notification.

Voice call monitor engine 615 may monitor for when a voice call or voicemail is received by mobile device 600 that includes a notification from notification engine 514 of home automation engine 210. Voice call monitor engine 615 may monitor for a particular phone number from which the call is originating to determine that a notification from the home automation engine has been received. The operating system of mobile device 600 may cause an indication of the voice message to be presented via output vibration, sound, and/or light. The user may need to answer the call or listen to the voicemail in order to receive the notification. Voice call monitor engine 615 may determine 1) whether the notification has been received; and 2) if the user has listened to the voicemail or answered the call. The voice call or voicemail may include synthesized voice that reads the notification for the home automation event. Additional information may include the time at which the event occurred and a location of the home automation engine.

In some embodiments, it may not be possible to monitor various communication paths. For instance, a user may have his email only accessible via a specialized application (e.g., Google's® Gmail™ application). As such, the user may receive the email; however, email monitor engine 613 may not be able to determine that the email has been received. During an initial configuration, home automation engine 210 may test communication paths with application 601 when it is known or expected that such communication paths are functional. Such a test may determine which communication paths of application 601 will be able to acknowledge receipt of notifications. When a notification cannot be acknowledged, notification engine 514 may still use such a communication path to send a notification but may assume transmission has failed and/or may only use such a communication path as a final attempt. For instance, such communication paths are noted in Table 2 with the "(fail)" designation.

A user may view the push notifications, SMS texts, emails, social media posts and/or messages, and (listen to) voice calls directly. Additionally, when one of the monitor engines (611-615) notes that a notification has been received, presentation engine 620 may be triggered to present an additional or alternate indication of the notification. For instance, if the user launches application 601 (such that it is displayed and no longer only executed in the background of mobile device 600), presentation engine 620 may cause information regarding the notification to be presented in a user friendly format and may allow the user to perform various actions in response to the notification. For instance, if the notification is "Door left ajar," the user may have the ability to select from "View security camera feed," "Call at-home User" (which may determine, such as based on geo-positioning, a user who is within the home) and "Call 911."

Receipt response engine 640 may receive information from engines 611-615 that is indicative of a notification being received and/or of the notification being viewed, dismissed, or heard by the user. Receipt response engine 640 may generate and cause a response to be transmitted by mobile device 600 to receipt monitor engine 515 of home automation engine 210. The receipt response may indicate the time at which the notification was received and/or viewed/heard by the user.

Figure 7:
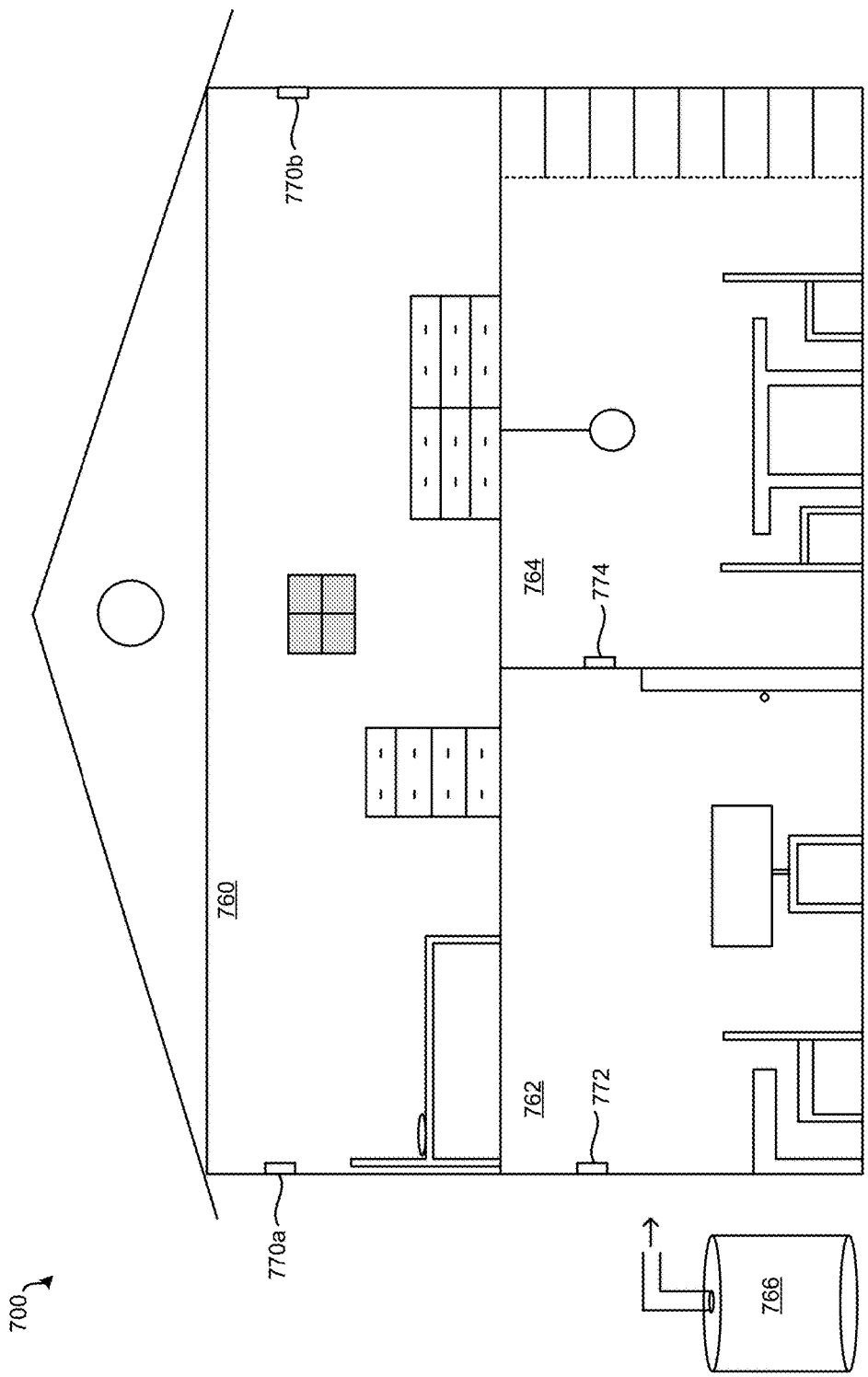
FIG. 7 illustrates a structure that includes a dwelling and an HVAC system connected to the dwelling, according to embodiments of the present technology.

FIG. 7 illustrates a structure 700 that includes a dwelling and an HVAC system connected to the dwelling, according to embodiments of the present technology. The structure 700 includes three different rooms 760, 762 and 764. As shown in FIG. 7, room 760 is a bedroom, room 762 is a living room, and room 764 is a dining room. The structure is connected to an HVAC system that includes HVAC unit 766. HVAC unit 766 is configured to deliver heating, ventilation, and air conditioning to structure 700. The physical connection between HVAC unit 766 and structure 700 is not shown in FIG. 7. However, HVAC unit 766, along with venting and/or other devices, may deliver heating, ventilation, and air conditioning to a specific one or more than one room within structure 700. For example, the HVAC system may deliver heating, ventilation, or air conditioning to room 764 and not deliver to rooms 762 or 760 (or leaving the temperature and environment in those rooms the same). Such HVAC devices may include one or more of the following: fans, heating, cooling, window coverings, vent coverings (e.g. smart vent coverings), space heater, among others.

As noted with respect to previous figures herein, an HVAC system may be incorporated into a home automation system within a structure, such as structure 700. The home automation system may include various sensors that may be distributed around the structure, such as sensors 770a, 770b, 772, and 774. Sensors 770a, 770b, 772, and 774 may be, for example, temperature sensors that record temperature readings of the current temperature of the room that the sensor is located in. Sensors 770a, 770b, 772, and 774 may compile recordings of temperature, or of other types of data, over a period of time. The recordings may be stored locally at each sensor, or may be transmitted from the different sensors to a central location, such as to a television receiver or other home automation processing unit for storage.

An HVAC system typically includes one or two thermostats, and includes only one or two sensors that detect the current temperature inside the structure. The HVAC system may use temperature readings from those sensors to detect whether the HVAC system needs to adjust the temperature inside the structure. For example, if a sensor records a temperature of 65 degrees, and the HVAC system is set to keep the temperature inside the structure at 70 degrees, then the sensor reading may trigger the HVAC system to turn on or turn up the heat. Furthermore, temperature across different parts of the inside of a structure (e.g. different rooms, different floors, etc.) may vary greatly. For example, the temperature in a basement may vary greatly from the temperature in an upstairs bedroom at the same time. In another example, the temperature next to a window in a room may be different than the temperature on the other side of that same room. Since the inside of a structure may only include one or two sensors to detect the temperature of the rooms inside the structure, the sensors may record temperatures that are not representative of the actual temperature in certain areas of the structure. Adding additional sensors around the house (e.g. one in each room) may allow for more accurate temperature readings of the temperature in each room. Using the home automation system and television receiver, a user may be able to control, based on user initiated settings, how the temperature recordings are used to customize the HVAC system to the user.

Figure 8:
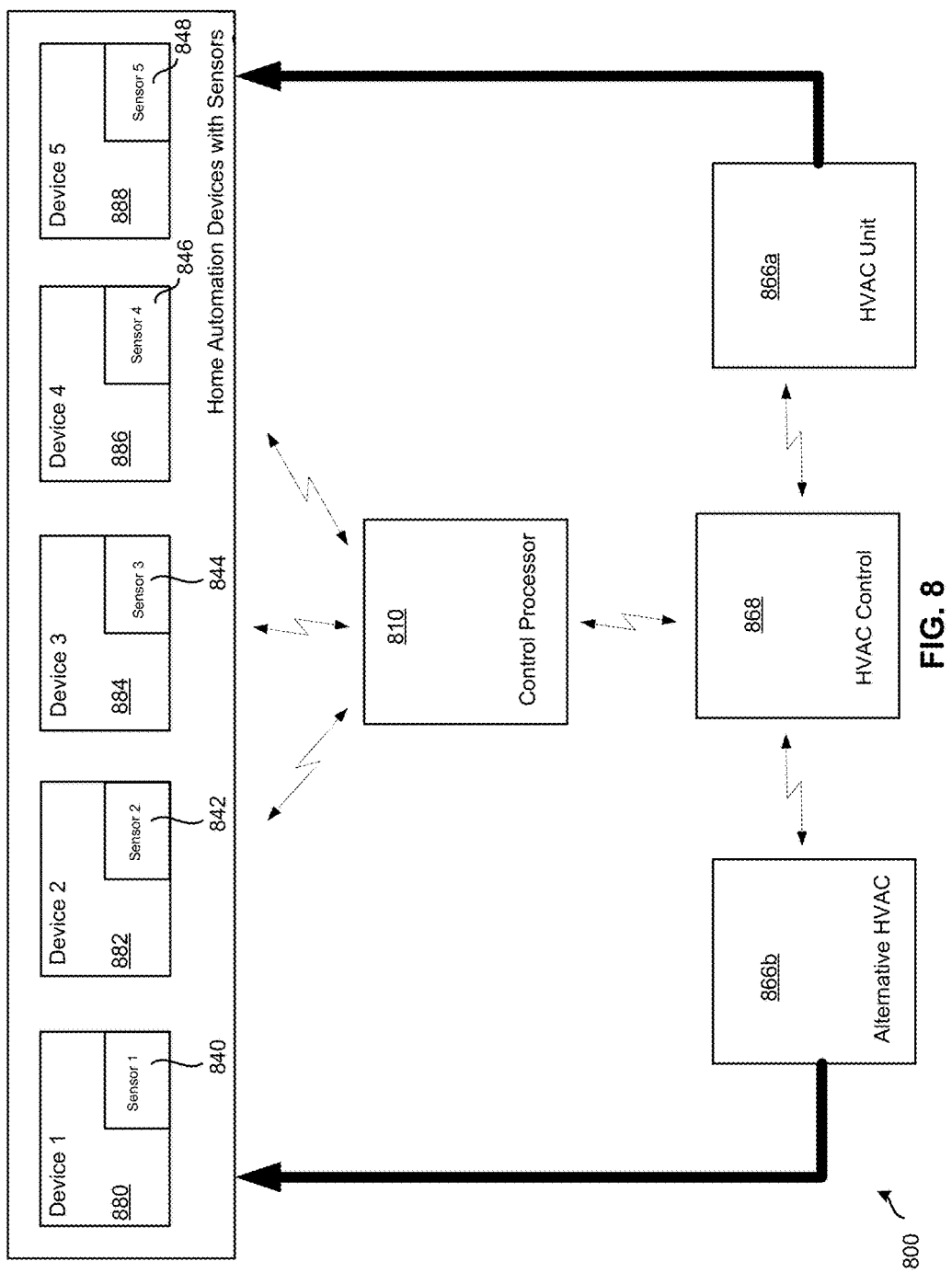
FIG. 8 illustrates a block diagram of a system that includes an HVAC system integrated into a home automation network, according to embodiments of the present technology.

FIG. 8 illustrates a block diagram of a system that includes an HVAC system integrated into a home automation network, according to embodiments of the present technology. As shown in FIG. 8, the home automation system may include various sensors, such as sensors 840, 842, 844, 846 and 848. These sensors may be a part of or connected to home automation devices, or network devices, as shown in FIG. 8. For example, such devices may include garage door opener, heating and/or air conditioning, thermostat, lights, window or door sensors, motion detectors, video cameras, among others. However, sensors may also be stand-alone devices that are not a part of home automation devices. Sensors 840-848 may record and collect data associated with the environment that the sensors are in, for example data associated with the device that the sensor is a part of. For example, sensor 840 may collect temperature data (e.g. the temperature of the room that the sensor is in) if device 880 is a thermostat.

Various types of data may be collected at each sensor, depending on the type of sensor. For example, for a temperature sensor, data may be collected regarding temperature in the room over a period of time, when the air conditioning and/or heat went on or off, the rate at which temperature dropped or rose, among other types of data. In another example, for a video camera, data may be collected regarding when motion was detected, for how long the motion persisted, who or what caused the motion (e.g. using facial recognition), when the video camera was turned on or off, among others. Data from sensors 840-848 may be transmitted to control processor 810. Similar to processor 210a, the control processor 810 may include a home automation engine that may permit a television receiver to provide home automation functionality. For example, control processor 810 may use the data it receives from sensors 840-848 to control the HVAC system connected to it. Control processor 810 may be, or may be a part of, a television receiver, such as a STB. For example, control processor 810 may be included as part of a STB, allowing for the received data to be used as part of the satellite television distribution system, such as satellite television distribution system 100.

Control processor 810 may generate a profile based on the data it receives from the home automation devices. For example, the home automation profile may be the result of analysis done on the data regarding characteristics of one or more devices in the home automation system. For example, if a home automation device detects data in a certain pattern, or detects data that is representative of a certain characteristic associated with the device, the profile may reflect such a pattern or characteristic. For example, if device 882 is a motion detector in a basement, and sensor 842 in device 882 detects motion in the basement every day between 8:10 AM and 8:20 AM, then the home automation profile may include such a pattern. These patterns and/or characteristics may allow the home automation system to give advance warning of an upcoming action to a user, or may allow the home automation system to take an action automatically based on the event that it assumes will take place at a given time. In another example, if device 884 is a remote control associated with a television receiver, sensor 884 may collect data to control processor 810 that shows that a user of the remote control device turns on the television receiver every evening at 9:30 PM. Such a characteristic may allow the home automation system to transmit a query to a user, for example via the user's mobile device, asking whether the user would like the home automation system to turn on the television receiver at 9:30 PM on a certain night. This data may also be used as part of a user profile since the data is reflective of a user's preferences and a user's interactions with the home automation system.

In addition to data automatically detected and collected by the home automation sensors, a user profile may also include information inputted by the user. For example, a user may input preferences into a user interface directed to preferences about how the user would like the home automation system, specific home automation devices, or the HVAC system to function. In one example, a user may enter an input into a television receiver via a remote control device regarding the temperature that the user would like in a certain room in the user's home.

As shown in FIG. 8, control processor 810 may be connected to, or communicate with, an HVAC system. For example, control processor 810 may transmit data it receives and/or generates to HVAC control 868. Furthermore, control processor 810 may transmit instructions to HVAC control 868 that include the results of analysis or profile generation at control processor 810. HVAC control 868 may be configured to control HVAC unit 866a and alternative HVAC 866b, and therefore may use the data, profiles, etc. received from control processor 810 (e.g. from a television receiver and/or STB) to adjust how the HVAC system is working. As shown in FIG. 8, HVAC unit 866a and alternative HVAC 866b may be configured to send cool air or hot air to certain rooms in a structure based on instructions received from HVAC control 868. For example, HVAC unit 866a may transmit cold air to the room that device 888 is located in because sensor 848 detected that the room was too warm based on a user profile generated by control processor 810.

As noted, a user profile may include information inputted by the user. For example, a user may input information related to home automation devices into a remote control associated with the television receiver, into a mobile device, or other user interface such that the information inputted by the user is received by control processor 810 for processing. Also as noted, an HVAC system may include sensors in multiple rooms or areas within a structure that are configured to record data corresponding to the environment in which the sensors are in. A user may assign a priority/ranking, or weight, to each sensor in the HVAC and home automation system so that certain sensors in certain areas of the structure have a higher priority than others. For example, a priority or weight may be given to a sensor in a room that is important to the user, or for which accuracy of a given characteristic (e.g. temperature) is especially important. In a more specific example, if a user spends a significant amount of time during the day in the user's office, and device 886 with sensor 846 is located in the user's office, then the user may assign a high weight or priority to sensor 846.

FIGS. 9A-D illustrate tables including data collected by, for example control processor 810 (e.g. within a television receiver of a satellite television distribution system), according to embodiments of the present technology. Data tables may be stored at each respective sensor at which the data is collected, at the sensor's associated device, or at a central location, such as at a television receiver. FIG. 9A shows a table 900a that includes weight data associated with each of four sensors, each located in a different room of a dwelling. The weight and/or rankings data may be inputted by a user as user preferences, for example by typing the weights into a remote control or other mobile device, upon the prompting of a user interface on a display.

Table 900a shows that the user has assigned a weight of 0.15 (or 15%) to sensor 1 in the living room, a weight of 0.10 (or 10%) to sensor 2, a weight of 0.40 (or 40%) to sensor 3, and a weight of 0.35 (or 35%) to sensor 4. Similarly, Table 900b in FIG. 9B assigned a ranking of "3" to sensor 1 in the living room, a ranking of "4" to sensor 2, a ranking of "1" to sensor 3, and ranking of "2" to sensor 4. There are a variety of reasons why a user may have assigned these example weights to the different sensors. For example, sensor 3 may be the most important sensor of the user. In another example, sensor 3 may be a part of or connected to a device that is most important to the user. In another example, sensor 3 may be located in a room where the user spends the most of the user's time as compared to the other rooms in the home. After such weights have been inputted and assigned by the user, the television receiver (or other central processing device) may assign the given weights to the respective sensors. For example, the television receiver may store the assigned weights, and may create instructions or a user profile based on the assigned weights.

Weights or rankings may also be generated or adjusted automatically by the home automation system. For example, the sensors in the home automation system may detect a level of importance, or another characteristic, of the different sensors based on the data it collects. For example, the television receiver may detect that a user is located in a room with sensor 3 about 40% of the time that the user is in the dwelling, and therefore may assign the 0.40 (or 40%) weight to sensor 3. The home automation system may also make this determination based on a variety of other characteristics or factors. For example, a sensor may be given a higher weight based on the type of device it is connected to, or how much the room is used during certain designated or predetermined important times of day, days of the week, times of year, etc., among others. A user may be able to choose which characteristics or factors that the home automation system uses to automatically determine weights for the different sensors. Such a choice may be provided via a display device instead of, or in addition to, the user selecting or inputting the actual weights for each sensor.

The weights assigned to the different sensors in the home automation system may be used to determine which room the user wants to prioritize for use of the user's HVAC system. For example, the user may designate sensor 3 with the highest priority or weight because the user wants to make sure that the temperature in the left side of the bedroom is most accurate, even at the fault or risk of inaccuracy of other rooms in the home. This may provide both a more efficient HVAC and home automation system where energy is not being used in certain rooms that are less important to the user, and also tailored to the user's specific needs or desires.

FIG. 9C shows a table 900c that includes weight and energy (for example, in BTU/h) data associated with each of four sensors, each located in a different room of a dwelling. The weight and/or energy data may be inputted by a user as user preferences, for example by typing the weights into a remote control or other mobile device, upon the prompting of a user interface on a display. In another example, the data may be generated automatically by the home automation system and/or HVAC system based on historical data collected by the sensors or a control processor or other central processing engine.

Table 900c shows that the user (or the system) has assigned a weight of 0.15 (or 15%) to sensor 1 and an energy level of 15,000 BTU/h, a weight of 0.10 (or 10%) to sensor 2 and an energy level of 10,000 BTU/h, a weight of 0.40 (or 40%) to sensor 3 and an energy level of 40,000 BTU/h, and a weight of 0.35 (or 35%) to sensor 4 and an energy level of 35,000 BTU/h. Table 900c is similar to tables 900a and 900b except table 900c includes a listing of amounts of energy assigned to the sensors in each of the four rooms listed in the table. In the case of table 900c, the amount of energy for each sensor corresponds to the weight that each sensor is assigned based on a total energy output of 100,000 BTU/h. For example, room 1 sensor was assigned an energy of 15,000 BTU/h based on an 0.15 (15% weight), room 2 sensor was assigned an energy of 10,000 BTU/h based on an 0.10 (10% weight), room 3 sensor was assigned an energy of 40,000 BTU/h based on an 0.40 (40% weight), and room 4 sensor was assigned an energy of 35,000 BTU/h based on an 0.35 (35% weight). The amount of weight assigned to each sensor may be chosen directly by a user, or may be automatically chosen or updated based on the weight assigned to each sensor. The amount of energy assigned to each sensor may correspond to a certain metric assigned to each sensor. For example, the amount of energy assigned to each sensor may be a target amount of energy that the user (or the system) wants to use for the HVAC system to send cooling or heating, for example, to the room that the corresponding sensor is in. In another example, the amount of energy assigned to each sensor may be a maximum (or minimum) amount of energy to be used for that sensor's corresponding room. In another example, the amount of energy assigned to each sensor/room may be the average amount of energy selected to be used for that sensor's corresponding room over a certain period of time.

FIG. 9D shows a table 900d that includes weight and energy (for example, in BTU/h) data associated with each of four sensors, each located in a different room of a dwelling, similar to table 900c. Table 900d also includes a column of energy data that shows the maximum amount of energy needed at a particular point in time. The weight and energy data may be inputted by a user as user preferences, for example by typing the weights into a remote control or other mobile device, upon the prompting of a user interface on a display. In another example, the data may be generated automatically by the home automation system and/or HVAC system based on historical data collected by the sensors or a control processor or other central processing engine.

Table 900d shows that the user or the home automation system has assigned a weight of 0.10 (or 10%) to sensor 1 and an energy level of 10,000 BTU/h, a weight of 0.05 (or 5%) to sensor 2 and an energy level of 5,000 BTU/h, a weight of 0.55 (or 55%) to sensor 3 and an energy level of 55,000 BTU/h, and a weight of 0.35 (or 35%) to sensor 4 and an energy level of 30,000 BTU/h. Unlike in table 900c, table 900d shows that a room with the lowest priority (or one or more rooms with lower priority than others) may not receive their maximum needed energy from the HVAC system because the rooms with a higher priority used all of the available energy. For example, although the maximum needed energy for room 4 to be at its assigned temperature is 45,000 BTU/h. However, since rooms 1, 2 and 3 used a total of 70,000 BTU/h of the available 100,000 BTU/h (for example) energy, only 30,000 BTU/h was available for room 4.

Although tables 900a-900d in FIGS. 9A-9D show data associated with an HVAC system, including energy targets and maximum needed energy, for example, similar tables may be generated by the home automation system or other systems with data associated with sensors other than those used in such an HVAC system. For example, weights and/or rankings (and other data) may be inputted, generated and/or compiled for video cameras, motion sensors, gas distribution system sensors, electricity sensors, water sensors, among others.

Furthermore, although embodiments described herein with respect to FIGS. 6-9D are described with respect to different sensors being located in different rooms of a structure, the embodiments and technology described herein may be applied to different sensors in different parts of the same room. For example, for a large room, one sensor may be located at one end of the room, and a second sensor may be located at the opposite end of the room. Such an example set of sensors may vary inaccuracy with respect to the readings/recordings they take when collecting data, and therefore different weights may be given to the different sensors in the same room. For example, if one sensor is close to a window and another is not close to a window, the readings taken by the sensor that is close to a window may be affected by drafts from the window.

Weights, rankings, or other priority systems between different sensors and/or different rooms in a structure may change throughout different times of the day, different times or days of the week, different times of year, around holidays, etc. For example, as noted, the home automation may recognize or record data and analyze that data for patterns in user or home automation system behaviors. For example, while changes in day-to-day use of the home automation system and systems connected to the home automation system may be useful for one or more users who live in the structure, different changes may be more applicable to generate profiles for other types of users. For example, a different user may only stay in the house one time every three months. However, the home automation system may still be able to detect that user's preferences over a period of time (e.g. 1 year, 2 years, 5 years, 10 years, etc.) and make changes to the home automation system based on those patterns and generated user profiles.

In one embodiment, certain sensors may be grouped together. For example, a group may be generated by the home automation system, or by a user, if the system or user believes that certain sensors should have similar characteristics and/or perform actions in a similar or same way. For example, if two rooms are situated in a similar place in a house and have similar properties (e.g. temperature, etc.), then the two sensors may be grouped together. Such a grouping may cause the sensors in that group to have the same priority, for example. Such a grouping may cause settings or characteristics to change on one sensor if they are changed on another sensor in that group.

A user may create rules that apply to one or more sensors, or to one or more groups of sensors. For example embodiment, a rule may be created in a home automation system connected to an HVAC system that the user would like every sensor in the home to read at a temperature of between 70 and 72 degrees.

As noted, the home automation system and/or systems connected to the home automation system (e.g. HVAC) may be connected to, or be a part of, a satellite television distribution system. Integrating such systems may not only be convenient for users so that such systems may be controllable from one place or one display, but combining such systems may also cause the systems themselves to be more efficient. For example, if the home automation system integrated into a television receiver detects that the television has been left on for a certain period of time that is more than a threshold period of time, where the threshold period of time is more than the user usually leaves the television on for on an average night, then the home automation system may be able to automatically turn off the television, or at least put the television into energy saver or similar mode. In other words, the technology described herein may allow for the processors and computers used to control these systems, and communicate within each system and between systems, to be more efficient and more cost effective.

Figure 10:
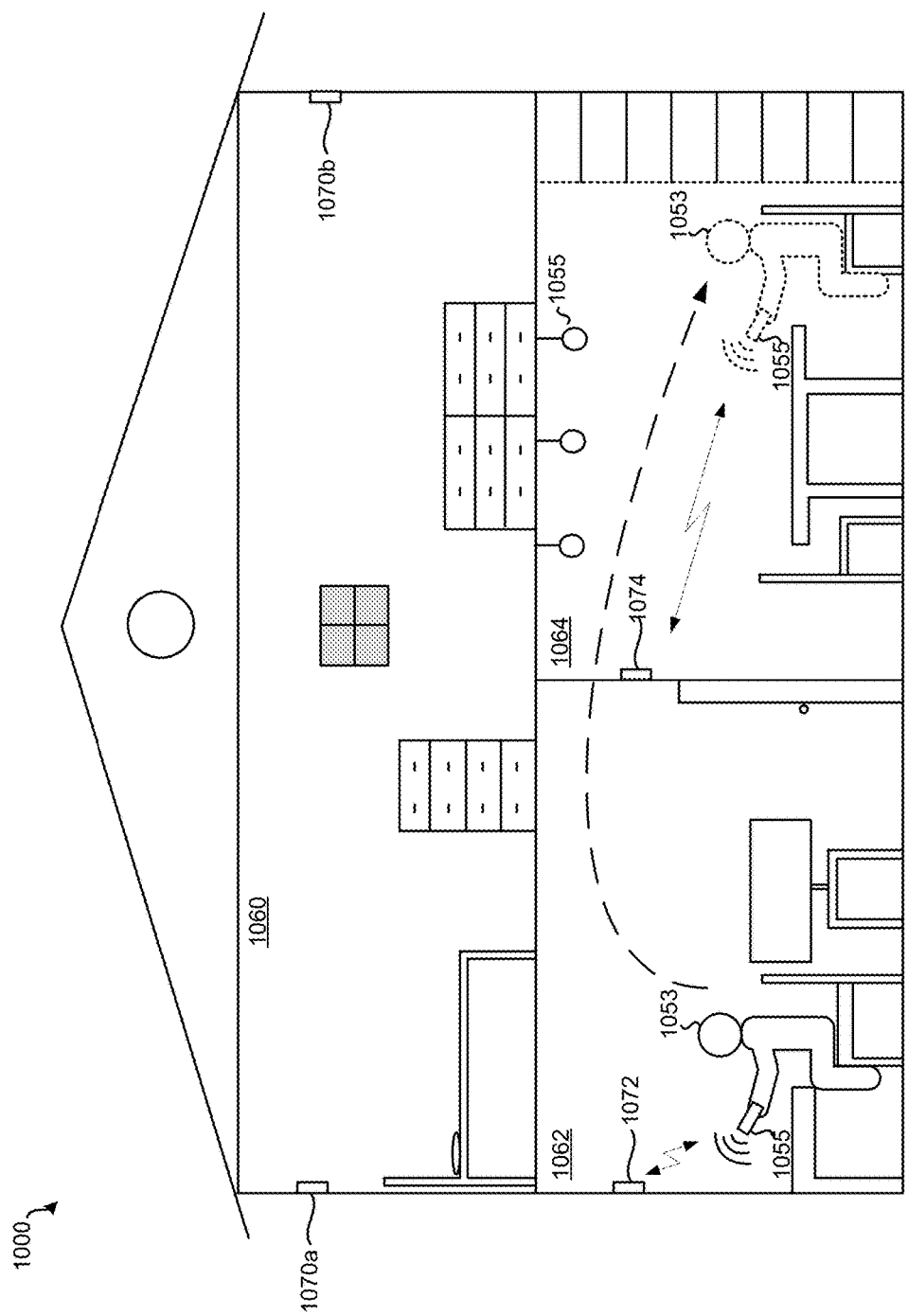
FIG. 10 illustrates a structure that includes a dwelling, according to embodiments of the present technology.

FIG. 10 illustrates a structure 1000 that includes a dwelling, according to embodiments of the present technology. The structure 1000 includes three different rooms 1060, 1062 and 1064. As shown in FIG. 10, room 1060 is a bedroom on the second floor of the dwelling, room 1062 is a living room on the first floor of the dwelling, and room 1064 is a dining room on the first floor of the dwelling. As noted, various features, such as an HVAC system, a home security or surveillance system, a satellite or cable television system, among others, may be incorporated into a home automation system within a structure, such as structure 1000. The home automation system may include various sensors that may be distributed around the structure, such as sensors 1070a, 1070b, 1072, and 1074. Sensors 1070a, 1070b, 1072, and 1074 may record readings of certain characteristics of the sensors' environments in the rooms that the sensors are located in. Sensors 1070a, 1070b, 1072, and 1074 may compile recordings of data over a period of time. The recordings may be stored locally at each sensor, or may be transmitted from the different sensors to a central location, such as to a television receiver or other home automation processing unit for storage.

FIG. 10 illustrates the transition over time of a user 1053 between room 1062 and room 1064. As shown in FIG. 10, user 1053 is initially located in room 1062. User 1053 is holding a network device 1055, such as a mobile device, that may be connected to a wireless or wired network, such a as a local area network (LAN). The sensors 1060, 1062 and/or 1064 may also be connected to the same network. Since user 1053 is located in room 1062, the mobile device 1055 that the user is holding may communicate with sensor 1072, which is also in room 1062. Mobile device 1055 may initiate a communication with sensor 1072, or sensor 1072 may initiate a communication with mobile device 1055. However, either way, the communication between mobile device 1055 and sensor 1072 may be due to the fact that both mobile device 1055 and sensor 1072 are in the same room, or are otherwise within a certain (e.g. close) proximity to each other. The mobile device 1055 and sensor 1072 may communicate with each other via one or more of a variety of communication protocols, such as WiFi, Bluetooth, ZigBee, Z-Wave and/or the like. The mobile device and sensor may communicate on a continuous basis, on a periodic basis (e.g. communicate once every certain amount of time), on a random basis, on an as-needed basis (as determined by either the sensor or mobile device or both), or on a different schedule, predetermined or otherwise.

Since, as described herein, sensor 1072 collects data regarding its environment (e.g. whatever data the sensor is configured to record and collect), sensor 1072 may be configured to record data corresponding to the mobile device 1055 (and, in turn, user 1053). For example, sensor 1072 may be configured to collect data directed to when mobile device 1055 is in room 1062, or within a certain distance of sensor 1072 (e.g. if sensor 1072 is a motion detector). In another example, if sensor 1072 is a video camera with face recognition capabilities, sensor 1072 may be configured to recognize which user from a list of users is user 1053, and present in room 1062 (and, for example, where the user is located in room 1062.

As shown in FIG. 10, user 1053 may then physically move from room 1062 to room 1064, and may transport mobile device 1055 from room 1062 to room 1064 with the user. In such a situation, mobile device 1055 may cease communicating with sensor 1072 because mobile device 1055 is not within a certain proximity or range of sensor 1072 (e.g. mobile device 1055 is not in room 1062, the same room as sensor 1072 any longer). Instead, mobile device 1055 may begin communicating with sensor 1074, which is located in room 1064, because mobile device 1055 is located in room 1064, and/or because mobile device 1055 is within a certain proximity or distance range of sensor 1074. Mobile device 1055 may communicate in the same or similar way, or otherwise have the same or similar relationship, with sensor 1074 as it did with sensor 1072. For example, sensor 1074 may collect data regarding its environment, and may be configured to record data corresponding to the mobile device 1055 (and, in turn, user 1053). For example, sensor 1074 may be configured to collect data directed to when mobile device 1055 is in room 1064, or within a certain distance of sensor 1074.

The relationship between mobile device 1055 and the one or more sensors it communicates with within structure 1000, such as which sensor(s) the mobile device may or should communicate with, may be determined based on the location of mobile device 1055 relative to the one or more sensors. The location of mobile device 1055 may be determined in a variety of ways. For example, the location of the mobile device 1055 may be determined using a global positioning system (GPS) located within the mobile device. In another example, the location of the mobile device 1055 may be determined using communications with the sensors themselves. Data may be collected by the sensors regarding the location of the mobile device (e.g. how long a message from the sensor to the mobile device takes to be returned to the sensor, using timestamps sent with communications sent by the mobile device, etc.), and the sensor(s) or a device in communication with the sensor(s) may determine where the mobile device is located relative to the one or more sensors using that data (e.g. using triangulation). In another example, the location of the mobile device 1055 may be determined using capabilities of certain sensors within the home automation system. For example, a video camera may recognize the mobile device and be able to determine the distance the mobile device is away from the camera based on that recognition.

The location of the mobile device 1055, and in some example instances a user carrying the mobile device, may be used to make changes or otherwise use the home automation system in a way that is beneficial to the user. For example, as noted, a security system within structure 1000 may be connected to or a part of a home automation system. More specifically, changes may be made to a home security system based on changes detected around the home by the home security system, such as, for example, where a user is located around a home.

In one example embodiment, a user of a home automation system may want to activate an associated alarm system when the user is not close enough to the main doors, windows, or other openings to monitor them. In a situation where a user within a structure is near to, for example, the main door of the structure, it may be considered unlikely for someone to break into that door to the user's proximity to that door and the user's ability to stop the break-in or to alert the authorities of such a break-in. On the other hand, in a situation where a user within a structure is far away from the main door of the structure (e.g. on a different floor and/or on the opposite end of the structure, outside the structure, etc.), it may be considered difficult for that user to be alerted by someone entering the main door due to the user's far proximity away from that door. Therefore, it may be beneficial for an alarm system to activate when a user is determined to be more than a certain predetermined distance away from the door so that the user can be alerted to activity at or near the door. These and other related embodiments are discussed further with respect to FIGS. 13-14.

Figure 11:
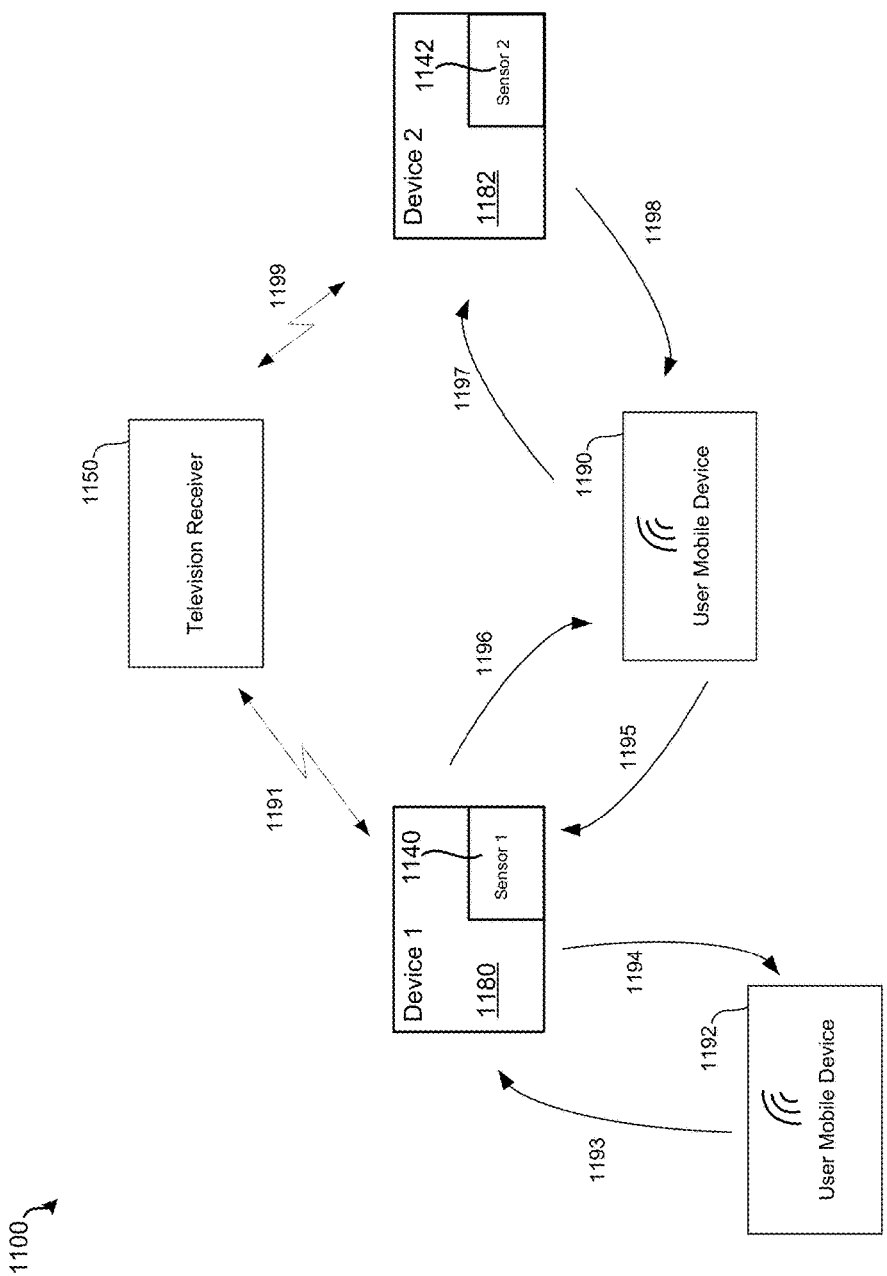
FIG. 11 illustrates a block diagram of a system that includes a home automation network of home automation devices and sensors, according to embodiments of the present technology.

FIG. 11 illustrates a block diagram 1100 of a system that includes a home automation network of home automation devices and sensors, according to embodiments of the present technology. As shown in FIG. 11, the home automation system may include various sensors, such as sensors 1140 and 1142. These sensors may be a part of or connected to home automation devices, or network devices, such as devices 1180 and 1182 as shown in FIG. 11. For example, such devices may include garage door opener, heating and/or air conditioning, thermostat, lights, window or door sensors, motion detectors, video cameras, among others. However, sensors may also be stand-alone devices that are not a part of home automation devices. Sensors 1140 and 1142 may record and collect data associated with the environment that the sensors are in, for example data associated with the device that the sensor is a part of.

Various types of data may be collected at each sensor, depending on the type of sensor, as described with respect to FIG. 8. Data from sensors 1140 and 1142 may be transmitted to television receiver 1150, either directly (for example, via communication paths 1191 and/or 1199) or via one or more mobile devices 1190 and 1192. Similar to processor 210a in FIG. 2 and control processor 810 in FIG. 8, the television receiver 1050 may include a home automation engine that may provide home automation functionality. For example, television receiver 1050 may use the data it receives from sensors 1140 and 1142 to control devices 1180 and 1182, sensors 1140 and 1142, or other devices and/or systems connected to the home automation network. The system may include a separate control processor (not shown) that is separate from television receiver 1150. However, such a control processor may be included as part of a STB, allowing for the received data to be used as part of the satellite television distribution system, such as satellite television distribution system 100 shown in FIG. 1. Television receiver 1150 may generate a profile based on the data it receives from the home automation devices, as described herein with respect to FIG. 8.

As shown in FIG. 11, devices 1180 and 1182 and/or sensors 1140 and 1142 may communicate with mobile devices 1190 and 1192 via any of a variety of communication paths, such as communication path 1193, 1194, 1195, 1196, 1197 and/or 1198. For example, devices 1180 and 1182 and/or sensors 1140 and 1142 may communicate with mobile devices 1190 and 1192 in order for the home automation system, and devices 1180 and 1182 in particular, to record when a user, via a user mobile device (e.g. user mobile device 1190 and/or 1192) are in the same room, or within a certain distance from, the devices. Since the home automation network of devices may be spread out across a room or structure, the proximity of a mobile device from one or more sensors a part of or connected to a home automation device may allow the home automation network to determine where a user, that may control the mobile device, is located within the room or structure. As noted, device 1180, device 1182, or any other device in the home automation network, may transmit the data it collects, directed to the relative location of a mobile device or otherwise, to television receiver 1150. Television receiver 1150 may use the data collected by devices 1180 and 1182 to adjust the home automation settings, or settings directed to other systems connected to or controlled by the home automation system, based on a user's inputs or other needs.

Television receiver 1150 may also communicate directly with mobile devices 1190 and/or 1192. For example, television receiver 1150 may, upon determining a change that it intends to make within the home automation system or to one or more devices within the home automation system, transmit a query to one or more mobile devices asking whether the home automation system should make the change. For example, the television receiver may transmit a query to user mobile device 1190 to ask a certain user whether to make the change or not. The home automation system may determine which mobile device or user to transmit the query based on which user it detected in a room, or based on predetermined communication settings set by the one or more users. For example, the system may be set to always transmit queries related to changes in the home automation system or a system connected to the home automation system (e.g. HVAC) to one particular user.

FIGS. 12A-12B illustrate tables including data collected by sensors and used within a home automation system, according to embodiments of the present technology. FIG. 12A shows a table 1200a of time data associated with sensors in each of four rooms (living room, dining room, bedroom, and gym). For example, the times and/or time ranges in table 1200a may be raw data collected by sensors for when a user (e.g. associated with a mobile device) is present in a certain room. For example, table 1200a may indicate that a user was present in room 2 on day 1 between 4:52 pm and 5:33 pm.

However, table 1200a may also include data that represents results of analysis performed on raw data compiled by sensors or data otherwise generated from the raw data. For example, the data in table 1200a may include average data compiled over a historical period of time that represents the average times that a user is present in the rooms. In another example, the data may include data that represents a pattern (e.g. the least common denominator of a set of data) of actions taken by a user.

The timing data shown in table 1200a may be used to make changes, via the home automation system, to certain devices within a structure. For example, if a user is detected as being located in a certain room, for example room 3 (bedroom), at a certain time, then the home automation system may make changes to devices in the bedroom, or to devices in other parts of the house that may have an effect on the bedroom, based on that collected data. For example, if a user is detected as being located in the bedroom, the home automation system may change the settings on the HVAC system so that the bedroom is set to a temperature that the user has selected as the user's preferred temperature. In another example, the home automation system may change the settings of one or more lights in the bedroom so that the lights are set to the user's specifications (e.g. which lights are turned on, how much the lights are dimmed, etc.).

The sensors may also detect not only the presence of a user, but also which user in particular is located in a certain room or in proximity of the sensor. Such information may be detected using the communications with the one or more mobile devices known to the sensor or to the home automation system. For example, if a certain mobile device is known by the home automation system as being associated with a certain user, then the home automation system may use settings associated with that user when a sensor detects or communicates with the mobile device associated with that user. Examples of such settings are shown in table 1200b in FIG. 12B. Furthermore, the home automation system may change the settings when a second user has entered the room. If the first user has left the room, the home automation system may use the settings associated with the second user. If the first user has not left the room, then the home automation system may use a hybrid of the settings associated with the two users based on certain rules set by the user(s), or may use the settings associated with one of the users based on a predetermined prioritization of users within the home. For example, if a sensor in room 4 (gym) detects that a first user has entered the room, and the first user likes the lights to be turned "off" when that user is working out, then the home automation system may turn (or leave) the lights off when that user enters the gym. If a second user enters the gym, and the second user's settings indicate that the second user likes the lights on while working out, then the home automation system may make a determination, based on the settings and rules within the home automation system, which settings to follow while both users are in the room. For example, a priority of users may be set by the users such that the second user is prioritized over the first user (e.g. if the second user is a parent of the first user, and the second user set the home automation system to prioritize the second user over the first user). In such a case, the home automation system would turn the lights on. The rules with the home automation system may also be tailored to the set of users on a room-by-room basis, or even on the basis of a portion of a room to a portion of a room. For example, if two sensors are located in the gym, the sensors may be able to detect the exact or close to exact location of each user in the gym. Therefore, if the first user is using a treadmill in one portion of the room, and the second user is using a treadmill in a second portion of the room as detected by the sensors, then the home automation system may turn off the lights located above or near the first user, but turn the lights on located above or near the second user. The home automation system may also make other changes in the room to account for both users being in the same room. In the above example, the home automation system may automatically lower a barricade (e.g. a moving wall or door) to separate the two users in the gym so as to block light from the second user's lights from reaching the first user's lights to allow both users to enjoy their chosen settings. After one of the users leaves the gym, the settings in the gym may be adjusted to tailor the gym to the environment and settings that the user remaining in the gym would want. Furthermore, the settings for the user who left the gym may "follow" the leaving user to the next room or location within the structure and be applied to the next room or location that that user is located in. The settings used in that room or location may be the same or similar settings as those used in the gym (e.g. light dimness), or may be applied to devices (e.g. lights) that are of the same or similar type as those in the gym, or the settings/devices may be completely different.

In another example, if a particular user (as determined, for example, by a video camera and facial recognition software) watches the same television channel at the same day and time of the week every week, then the home automation system may determine this pattern or routine and associate that pattern with that user. The home automation system may also make home automation decisions and make changes to certain devices based on these patterns. For example, one or more rules may be set so that the television receiver is set to take certain actions based on the detected patterns. More specifically, for example, the television receiver may turn on the television display (and, for example, the STB) at the day and time that the user watches that television program, and even tune the STB to the station that the television show is on. Alternatively, the television receiver may transmit a query to the user to ask the user whether the user plans to watch that television show at that day and time so that the television receiver may turn on the television display only if it is sure, based on the user's response, that the user will watch that television show at that day and time. The home automation system may also make other changes to the home automation devices in the room where the television is located that also fit within the user's settings profile. For example, the home automation system may turn the lights to a certain dimness level, may set the HVAC to a certain temperature, among other changes.

The settings associated with a certain user may be generated by the home automation system (e.g. television receiver or other processing device) or may be set by the users themselves. For example, the home automation system may determine which settings should apply to which users, at which times and at which locations based on previous actions of the users. Alternatively, users may engage with the television receiver (e.g. via a television display, remote control, mobile device, etc.) to input choices for such settings, either by selecting from a list of predetermined settings or by manually entering in values for those settings.

FIG. 12B shows a table 1200b of other data associated with sensors in each of the four rooms. The data included in table 1200b includes features that may be determined by the home automation system after receiving and analyzing data associated with one or more users over a period of time. For example, the home automation system may have determined, based on data collected by the sensors, that a certain user (or set of users) set the temperature for room 3 at 68 degrees, 69 degrees, and 67 degrees on 3 consecutive days (these temperatures may have been set during the times listed in FIG. 12A associated with room 3, or not). In another example, the home automation system may have determined, based on data collected by the sensors, that a certain user (or set of users) turned the TV on and set it at channel 5 every day in room 1, but turned the light off while in room 1 on day 5. The fact that the lights were turned off may be explained by a different user in room 1 than on days 3 and 4, or by another characteristic or action taken by one or more users. The home automation system, for example a television receiver of a satellite distribution system a part of or connected to the home automation system, may use some or all of the data it has collected about one or more of the users to determine patterns in the users' behavior, associate settings with those behaviors over time, and adjust those associations over time as new data is received and analyzed.

As noted, the home automation system may make changes to devices in the home automation system (e.g. HVAC temperature, lights, satellite television system, etc.) based on one or more sensors in the home automation system detecting that a mobile device (e.g. and a user holding the mobile device) has moved from one location in a structure to a second location. However, a problem may exist if the devices or settings on the devices are changed multiple times over a short period of time. For example, settings on a device may be changed multiple times in a short period of time if a mobile device is detected as entering a room (e.g. in the proximity of one sensor) and leaving the room shortly thereafter (outside the proximity of the one sensor, and may be in the proximity of another sensor). For example, if the device being changed is a set of lights, then the lights may be switched on and off multiple times in just a period of time of just a few seconds. Such an occurrence may cause discomfort or displeasure to one or more users. For example, the rapid switching of lights on and off may scare a user.

Although the home automation system may use the location of a mobile device, and communication with that mobile device, to determine the location of a user, such a process may be inaccurate since the user may not be in the same place as the mobile device at all times. For example, the user may leave the mobile device on its charger or by itself in a room. Therefore, the home automation system may use data from a different sensor of set of sensors to determine the location of a user. For example, the home automation system may use data compiled from motion detectors, video cameras (and, for example, facial or other recognition software), the television receiver itself, among other types of sensors. In another example, the home automation system may use a variety of different sensors, including a combination of sensors, to determine the location of a user. For example, the home automation system may use any interaction between the user and any home automation device as an indication that the user is in a certain location, and may use the user's mobile device or other personal device as a back-up to the network of home automation devices.

Therefore, the home automation system may be configured to cause a delay in making changes to devices in the home automation system where the changes are due to, for example, a detected change in location of a user. In other words, using such a delay, the home automation system can confirm that the change in location, or other change in status (e.g. change in characteristic(s)) causing the change in setting of the network device, will remain for at least a certain predetermined period of time. For example, if a user moves from a first room to a second room of a dwelling, as shown in FIG. 10, the home automation may ordinarily make an immediate change in settings within the second room, such as room 1064. For example, the home automation system may make a change in the dimming of lights 1055 within room 1064 when user 1053 enters room 1064 due to sensor 1074 detecting the presence of user 1053 or mobile device 1055. Instead, the television receiver of the home automation system, such as television receiver 1050, may delay making any changes to settings of home automation devices in room 1064, or other devices that may have an effect on the user in room 1064, by a period of time to confirm that the user will remain in room 1064 for enough time to make the home automation system sure that it is worth changing the settings in room 1064 for the user's period of presence in the room.

After the home automation system has detected that a status change (e.g. change in location of the user) has occurred that may invoke a change in home automation device (e.g. turning the lights on), the home automation system may wait a certain predetermined period of time before invoking that change in the home automation device. During that period of time, the home automation system may do nothing. In other words, the home automation system may ignore the device or the status change that invoked the device setting change, until the predetermined period of time for delay has lapsed. In another example, the home automation system may continuously or periodically monitor the status of the user to determine if the status has changed again since the original change in status. For example, if the status change has reverted back to its original status (e.g. the user has moved back to its original location before the change in location) at any time during the predetermined delay period, then the home automation system may prevent the change in setting from occurring in the home automation devices in the new location (because, for example, the changes being made for the user are moot because the user is no longer at that location). If the status change reverts back temporarily, but then re-changes after the revert, then the home automation system may either proceed with the changes as scheduled, may re-start the predetermined period of time delay, among other options.

It may be appropriate for the delay period of time to be different depending on the home automation device being changed, the setting being changed, the action performed by the user to cause the change, or other factors. For example, if the action performed by the user to cause the change is that the user walked from one room to another, it may be appropriate for the delay to be longer (e.g. 5-10 seconds) because the action of walking into a room is highly variable and there is a relatively high probability that the user may walk out of the new room within a short period of time after walking in. However, on the other hand, if the action performed by the user to cause the change is that the user turns on the television, it may be appropriate for the delay to be shorter (e.g. 1-2 seconds) because the action of turning on the television is not as variable. In other words, there may be a higher probability that a user will stay in a location after turning the television on (such that a change in settings based on the user's preferences is appropriate) than if the user just walks into the room. An event that may cause an even further reduction in the necessary delay time period is if the user turns on the television, and turns on a specific television show that the home automation system knows is a favorite television show of the user. To go even further, an even further reduction in the necessary delay time period may be appropriate if the home automation system, over time, has detected a pattern of the user watching television (or even that specific television show) at approximately the current day of the week and time of night. In another example, the television receiver may not turn the television on, but may change the channel to the correct channel for the user to watch the user's television show. In another example, the television receiver may begin playing a television show stored on the receiver's DVR feature, and then pause the show so that the show will be ready for the user to watch (just by pressing "play", for example) once the user turns the television on. Various other data collected by the home automation network that is associated with user actions around the structure and/or interacting with the home automation system may be used to assign the delay period of time. As noted, a change in settings based on the user's preferences may be deemed more or less "appropriate" to occur if it is determined that the settings will be kept, due to the user staying at that location or within a proximity of that location, for a certain predetermined amount of time.

Any of the changes in settings or actions taken by the home automation system in response to a trigger may also be presented, either individually or in groups (e.g. drop down menu), to the user for selection. As noted, a query may be transmitted from the television receiver (or another central processing device for the home automation system, if not the television receiver) to a mobile device of the user requesting user input. In another example, such a query may be displayed on a television display device for the user to view if/when the user watches television.

The predetermined amount of time, or delay, for which the home automation system waits to implement a change in device setting may be changed over time. In one example, the delay period of time may be automatically adaptable based on data collected by the sensors in the home automation system from events that may occur, or data or events detected by other systems such as a satellite television distribution system. For example, the home automation system may use data associated with a user or with a home automation device to adjust the delay periods of time. For example, if a user walks into a room, and the home automation system determines that it should turn the dimmer of the lights in that room down due to the user's preferences, a delay may be set at 5 seconds to confirm that the user will remain in the room for enough time such that lowering the dimmer of the lights is appropriate. However, if the sensor in that room compiles data associated with the user such that the home automation system may determine that there is a high probability (e.g. 75% of the time) that the user will stay in the room for an extended period of time, then the home automation system may reduce the 5 second delay time period to a lower amount of time. To determine whether there is a high enough probability that the user will remain in the room for a certain amount of time, either or both of the probability and the amount of time may be compared to thresholds, predetermined or variable. Such thresholds may be adjusted based on the specific situation including the user, the room, the home automation system, the device at issue, among others.

The amount of the delay, whether the delay is lengthened or shortened, and whether the settings are changed based on a user action as a whole may also be adjusted in real time as the action is taking place. For example, if a room includes a video camera with facial or other types of recognition associated with it, the video camera may identify certain actions or sub-actions by the user that result in recorded data that may affect (e.g. immediately) the delay time period or other aspects of the home automation adjustments. Referring back to a more specific example, the video camera may identify that the user, after walking into a room, never sits down or never stops moving throughout the room. Such an action by the user may be used to indicate to the home automation system that the user does not plan to remain in the room for very long, which may cause the home automation system to increase the delay time period. On the other hand, if the user walks into the room and immediately sits down on a couch or lies down on a bed, then the home automation system may use data indicating that those actions took place to reduce the delay before making appropriate adjustments to the home automation devices in that room based on the user's preferences. In another example, if a user walks into a garage, the home automation system may be set to open the garage door so that the user may remove their car from the garage. However, if a sensor in the garage collects data that indicates that the user, after walking into the garage, walked towards a separate part of the garage than from where the car is located, the home automation system may determine that there is a low probability (e.g. lower than 50%, or lower than a threshold, among other reasons) that the user will remove the car from the garage and use this data to increase the delay time.

Any settings or actions taken by the home automation system at a structure, such as structures 700 and 1000 shown in FIGS. 7 and 10, respectively, may be transmitted to one or more other home automation systems remote from that structure. For example, if a user has a second home and a second home automation system exists in that home, the home automation system in the user's dwelling may, via the internet or via the satellite television distribution system, transmit data, settings, or other aspects of the technology described herein either collected or generated, to the second home automation system for use. Such data or settings may allow the second home automation system to be more efficient, and reduce the time it takes to develop profiles for the home automation devices and/or the users who occupy both structures at different times. For example, if the second home automation system knows that one or more users use the second home every weekend and arrive at the second home (with the second home automation system) at, on average, 8:30 PM every or most Friday nights, then the second home automation system may download or receive updated settings and use those settings to tailor the home for the user(s) in advance in preparation for the users' arrival. If the satellite distribution system is used, the internet may not even be necessary for the home automation systems to communicate with one another, as described further with respect to FIG. 1 herein. The home automation system may also transmit such data or settings to one or more vehicles of the user. For example, temperature settings for each user may be transmitted to the users' cars such that different temperature zones in those cars may be adapted to the user's preferences (for example, which may have been entered by the user in the home automation system in the structure, such as via the television receiver and television display device). Such settings may be used any time the user gets into the user's car, or into any car used by the group of users that are known by the home automation system.

Figure 13:
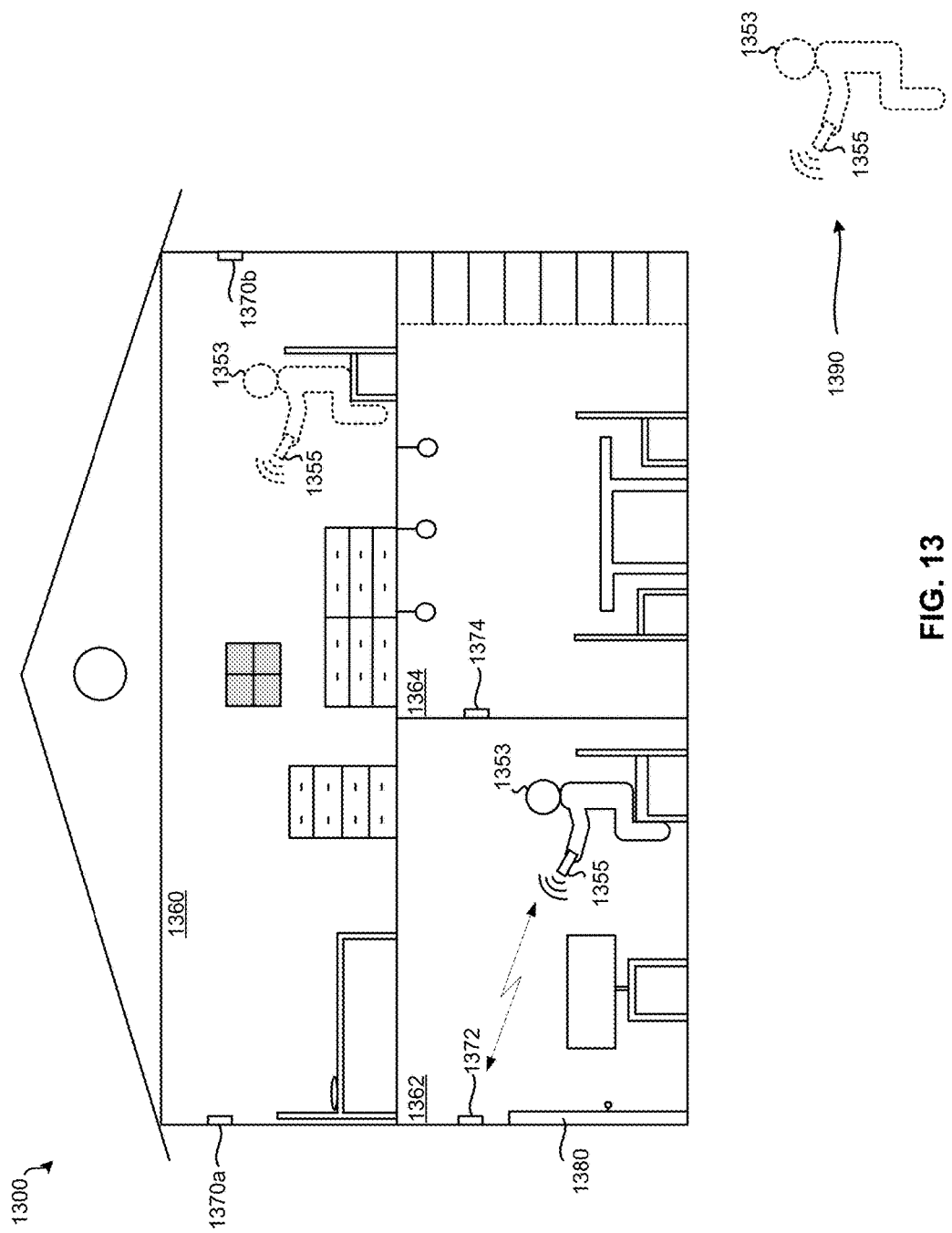
FIG. 13 illustrates a structure that includes a dwelling with a home automation system, according to embodiments of the present technology.

FIG. 13 illustrates a structure 1300 that includes a dwelling, according to embodiments of the present technology. The structure 1300 includes three different rooms 1360, 1362 and 1364. As shown in FIG. 13, room 1360 is on the second floor of the dwelling and room 1362 and 1364 are on the first floor of the dwelling. As noted, various features, such as an HVAC system, a home security or surveillance system, a satellite or cable television system, among others, may be incorporated into a home automation system within a structure, such as structure 1300. The home automation system may include various sensors that may be distributed around the structure, such as sensors 1370*a*, 1370*b*, 1372, and 1374. Similar to as described with respect to FIGS. 7 and 10, sensors 1370*a*, 1370*b*, 1372, and 1374 may record readings of certain characteristics of the sensors' environments in the rooms that the sensors are located in. Sensors 1370*a*, 1370*b*, 1372, and 1374 may compile recordings of data over a period of time.

FIG. 13 illustrates the transition over time of a user 1353 between rooms 1362 and room 1360 and outside of structure 1300. As shown in FIG. 13, user 1353 may initially be located in room 1362, for example near door 1380. User 1353 is holding a network device 1355, such as a mobile device, that may be connected to a wireless or wired network. The sensors 1360, 1362 and/or 1364 may also be connected to the same network. Since user 1353 is located in room 1362, the mobile device 1355 that the user is holding may communicate with sensor 1372, which is also in room 1362. However, user 1352 may move to room 1360, or to a location 1390 that is outside of structure 1300 altogether.

As noted, in one example embodiment, a user of a home automation system may want to activate an associated alarm system when the user is not close enough to an opening in the structure, such as door 1380. For example, in a situation where a user within a structure is far away from the main door of the structure, such as in room 1360 on the second floor or outside the structure completely, it may be difficult for that user to be alerted by someone entering the main door due to the user's far proximity away from that door. Therefore, it may be beneficial for an alarm system to activate when a user is determined to be more than a certain predetermined distance away from the door so that the user can be alerted to activity at or near the door. In addition to activating the security system, other changes may be made to the security system. For example, only a part of the security system may be activated (such as, for example, only the door/window sensors, and not the motion detectors, or other combinations). In another example, a setting may be changed on the security system when the home automation system determines that a user has walked away from the door beyond a certain distance. Such settings may include the volume of the alarm when it rings, the type of alarm that rings, under what circumstances the alarm goes off, among other settings.

The threshold for determining when a change should be made to the security system may be in a variety of different forms. As noted, a change may be automatically made to the security system upon a user moving to a location that is beyond a certain threshold distance away from a structure, a door of the structure, a home automation sensor, etc. In another example, a change may be made to the security system upon a user moving to a location that is beyond a certain threshold distance away from a structure and stays at least that far away for a predetermined amount of time. In another example, a change may be made to the security system upon a mobile device associated with a user moving beyond a certain threshold distance away from a structure (e.g. for a certain amount of time). In another example, a change may be made to the security system if a user walks into a certain room in the house (e.g. the basement) that is in a certain location far away from, for example, the front door of the house. In another example, a change may be made to the security system upon a user staying in the same position for a predetermined amount of time (e.g. if the user fell asleep).

As noted, in an example, a change may be made to the security system upon a user moving to a location that is beyond a certain threshold distance away from a structure and stays at least that far away for a predetermined amount of time. In other words, as described in more detail with respect to FIGS. 12A-12B, the home automation system may be configured to cause a delay in making changes to devices in the home automation system where the changes are due to, for example, a detected change in location of a user. In other words, using such a delay, the home automation system can confirm that the change in location, or other change in status (e.g. change in characteristic(s)) causing the change in setting of the network device, will remain for at least a certain predetermined period of time. An example of such a situation is also described further with respect to FIG. 14 herein.

The threshold used to determine if a change is to be made to the home security system, which as noted may include a threshold distance, time, among others, or a combination of multiple thresholds, may also be generated or adjusted automatically by the home automation system. For example, the sensors in the home automation system may detect a level of importance, or another characteristic, of the different sensors based on the data it collects. The home automation system may also make this determination based on a variety of other characteristics or factors. For example, a threshold may be increased or decreased based on various factors, including important times of day, days of the week, times of year, etc. or data collected about the user that has moved the certain distance away from the structure for a certain amount of time, among others. In another example, the thresholds may be determined or adjusted based on specific information collected about a user. For example, if a user walks away from the structure at a certain time every day, and the user returns to the structure within 5 minutes each time, then the home automation system may determine that making changes to the home security system due to that user leaving at that time may not be necessary. On the other hand, the user may indicate to the home automation system that the user wants the structure to be extremely secure, which may prompt the home automation system to automatically make changes to the home security system at that time every day since it may predict that the user will walk away from the structure at that time. In other words, the home automation system may learn certain patterns or characteristics of a user or set of users, and may tailor the home automation system or related systems (e.g. home security system, HVAC, etc.) based on those patterns and/or characteristics.

A user may be able to choose which characteristics or factors that the home automation system uses to automatically determine the thresholds, or may be able to manually select the thresholds. Such a choice may made via a television system, such as a satellite television system, including a television receiver or may be provided via a display device on a television or a mobile device, among others.

FIG. 14 illustrates a table 1400 including example stored data used within a home automation system, according to embodiments of the present technology. More specifically, table 1400 includes data associated with two sensors in a structure that shows a user's location and associated home automation and home security system actions taken due to the user's location. For the example data shown in table 1400, it can be assumed that the distance threshold is approximately 30 feet, or at least somewhere between 26 and 36 feet. As shown in table 1400, the user has not reached or passed the threshold at a determined/recorded distance away (e.g. away from a door, sensor, etc. of the structure) of 2 feet, 5 feet, 3.5 feet, and 10 feet. However, when the user has reached 45 feet, the user has crossed the threshold.

As noted, a change may be made to the security system upon a user moving to a location that is beyond a certain threshold distance away from a structure for a predetermined amount of time. Therefore, even though the user reached the threshold at 45 feet distance away, the alarm is not turned on (the example "change" to the home security system in this example) because the user has only been beyond the threshold for 10 seconds at that distance. The alarm system is not turned on at a distance of 48 fee either since the user has only been beyond the threshold for 20 seconds, and thereafter the user moves back within a distance range such that the user has not crossed the threshold any longer. However, at 36 feet, the user has crossed the threshold, and the user stays across the threshold for a longer period of time. More specifically, the user crosses the threshold and stays across for at least 40 seconds as shown in FIG. 14. In this case, the threshold (either set by the user or automatically determined by the home automation system) is 30 seconds, since the alarm turns on as soon as the user has been across the 30 foot threshold for 30 seconds.

As further shown in table 1400, the sensor never reaches the distance threshold (and therefore never reaches the time threshold) with regard to sensor 2 (the back door of the structure). Therefore, the user's distance away from the back door never activates a change in the security system.

Figure 15:
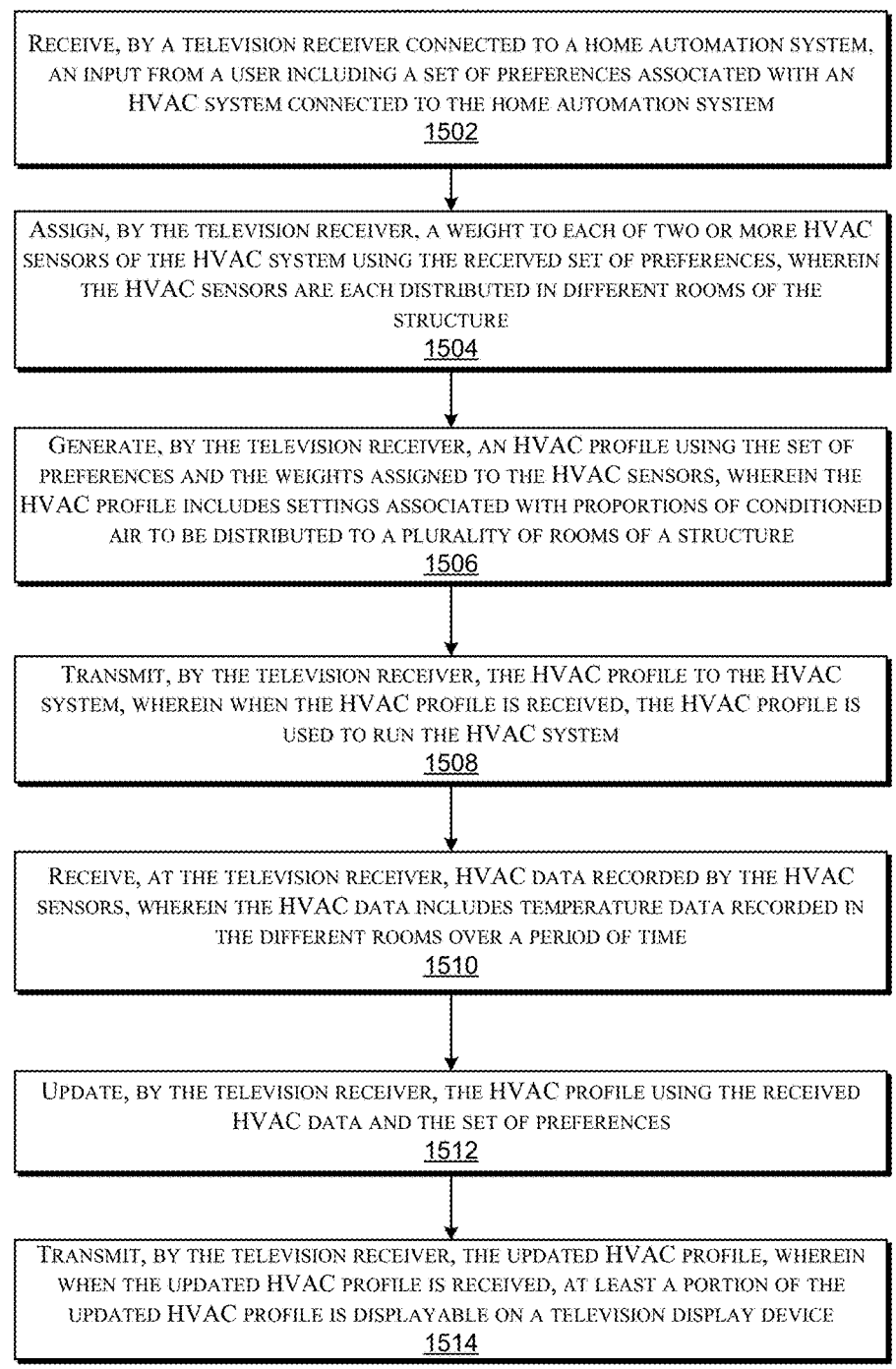
FIG. 15 is a flow chart of an example process used to control a home automation system based on a user's location, according to embodiments of the present technology.

FIG. 15 is a flow chart of an example process used to control a home automation system based on a user's location, according to embodiments of the present technology. Step 1502 includes receiving, by a television receiver connected to a home automation system, an input from a user including a set of preferences associated with an HVAC system connected to the home automation system in a structure. Step 1504 includes assigning, by the television receiver, a weight to each of two or more HVAC sensors of the HVAC system using the received set of preferences, wherein the HVAC sensors are each distributed in different rooms of the structure. Step 1506 includes generating, by the television receiver, an HVAC profile using the set of preferences and the weights assigned to the HVAC sensors, wherein the HVAC profile includes settings associated with proportions of conditioned air to be distributed to a plurality of rooms of the structure. Step 1508 includes transmitting, by the television receiver, the HVAC profile to the HVAC system, wherein when the HVAC profile is received, the HVAC profile is used to run the HVAC system. Step 1510 includes receiving, at the television receiver, HVAC data recorded by the HVAC sensors, wherein the HVAC data includes temperature data recorded in the different rooms over a period of time. Step 1512 includes updating, by the television receiver, the HVAC profile using the received HVAC data and the set of preferences. Step 1514 includes transmitting, by the television receiver, the updated HVAC profile, wherein when the updated HVAC profile is received, at least a portion of the updated HVAC profile is displayable on a television display device.

Figure 16:
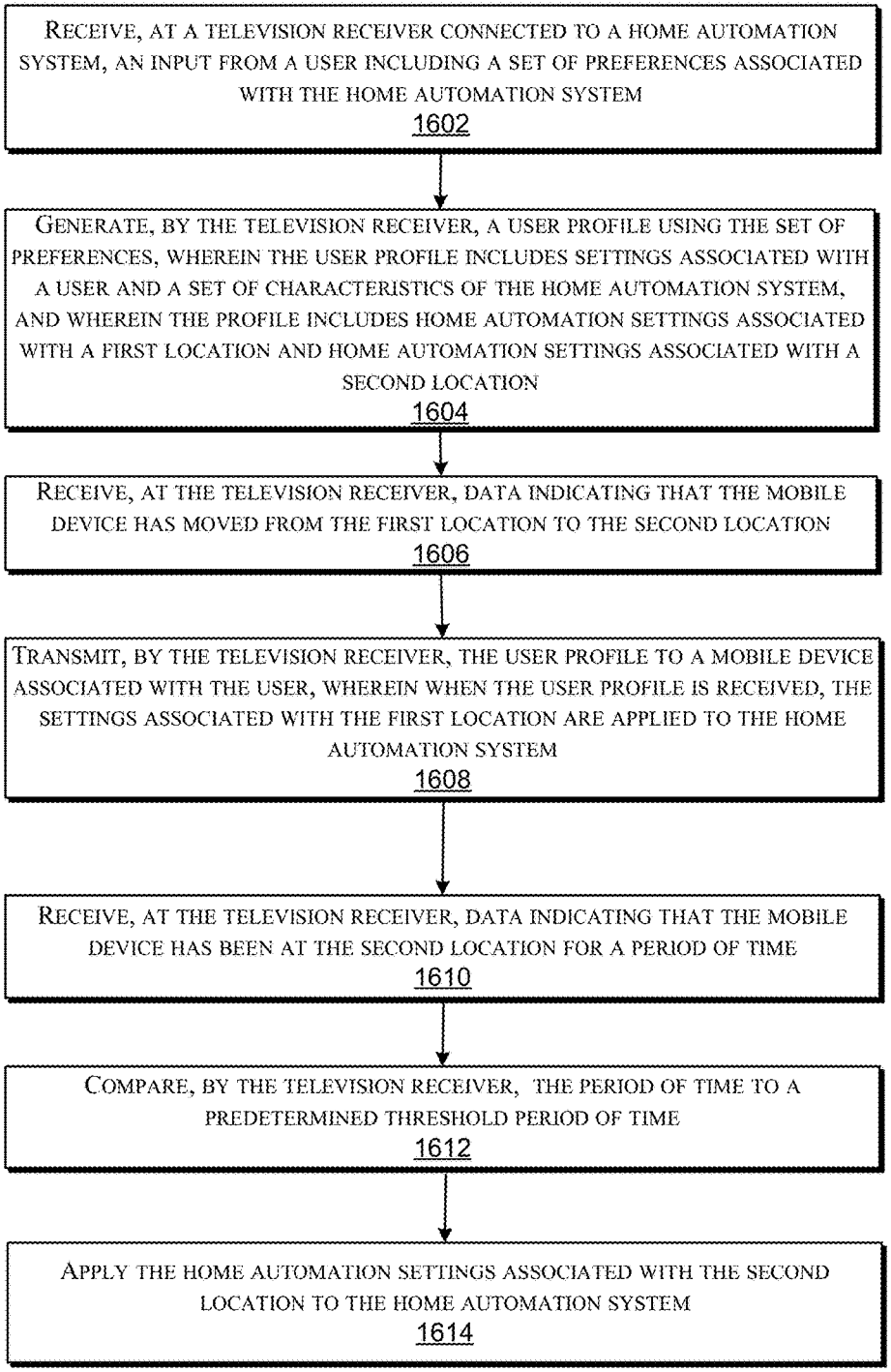
FIG. 16 is a flow chart of another example process used to control a home automation system based on a user's location, according to embodiments of the present technology.

FIG. 16 is a flow chart of another example process used to control a home automation system based on a user's location, according to embodiments of the present technology. Step 1502 includes receiving, at a television receiver of a satellite distribution system, an input from a user including a set of preferences associated with a home automation system connected to the satellite distribution system. Step 1504 includes generating, by the television receiver, a user profile using the set of preferences, wherein the user profile includes settings associated with a user and a set of characteristics of the home automation system, and wherein the profile includes home automation settings associated with a first location and home automation settings associated with a second location. Step 1506 includes receiving, at the television receiver, data indicating that the mobile device has moved from the first location to the second location. Step 1508 includes transmitting, by the television receiver, the user profile to a mobile device associated with the user, wherein when the user profile is received, the settings associated with the first location are applied to the home automation system. Step 1510 includes receiving, at the television receiver, data indicating that the mobile device has been at the second location for a period of time Step 1512 includes comparing, by the television receiver, the period of time to a predetermined threshold period of time. Step 1514 includes, in response to determining that the period of time exceeds the threshold period of time, applying the home automation settings associated with the second location to the home automation system.

Figure 17:
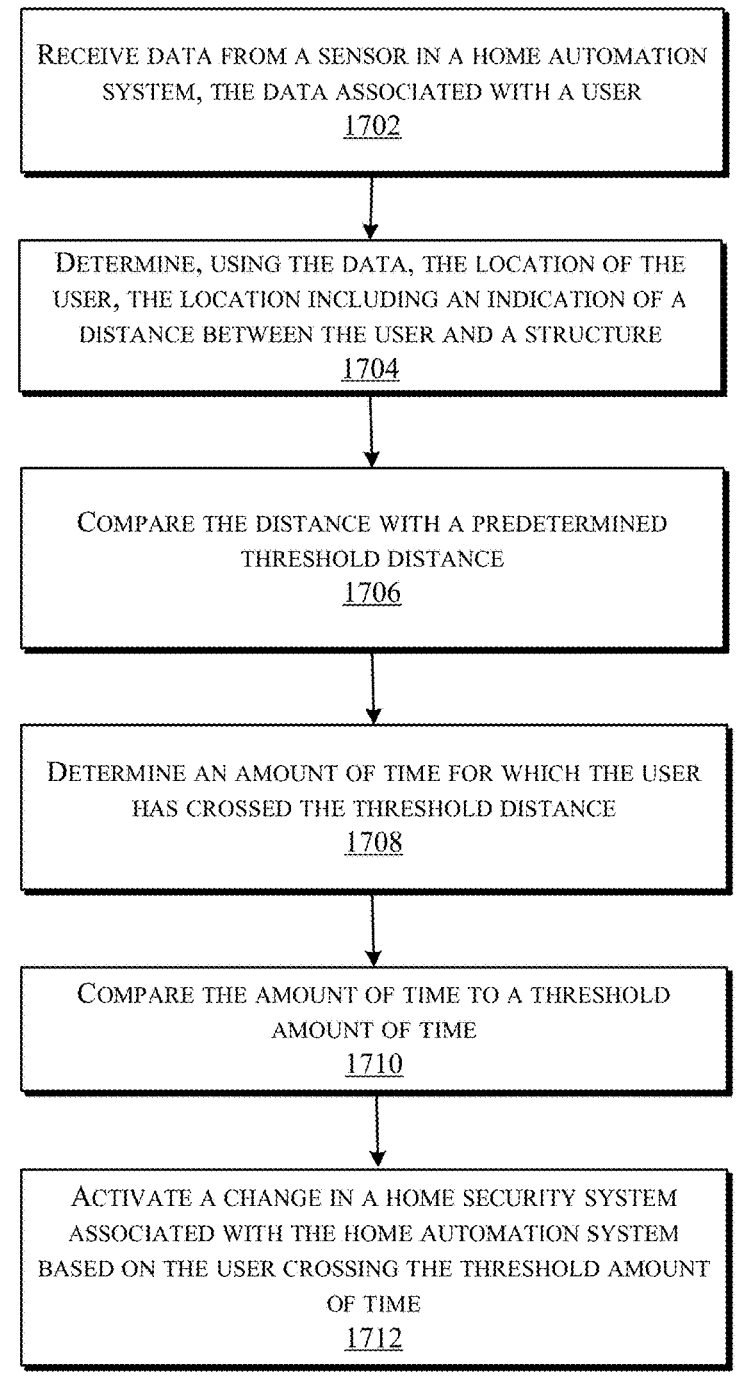
FIG. 17 is a flow chart of another example process used to control a home automation system based on a user's location, according to embodiments of the present technology.

FIG. 17 is a flow chart of another example process used to control a home automation system based on a user's location, according to embodiments of the present technology. Step 1702 includes receiving data from a sensor in a home automation system, the data associated with a user. Step 1704 includes determining, using the data, a location of the user, the location including an indication of a distance between the user and a structure. Step 1706 includes comparing the distance with a predetermined threshold distance. Step 1708 includes determining an amount of time for which the user has crossed the threshold distance. Step 1710 includes comparing the amount of time to a threshold amount of time. Step 1712 includes activating a change in a home security system associated with the home automation system based on the user crossing the threshold amount of time.

Figure 18:
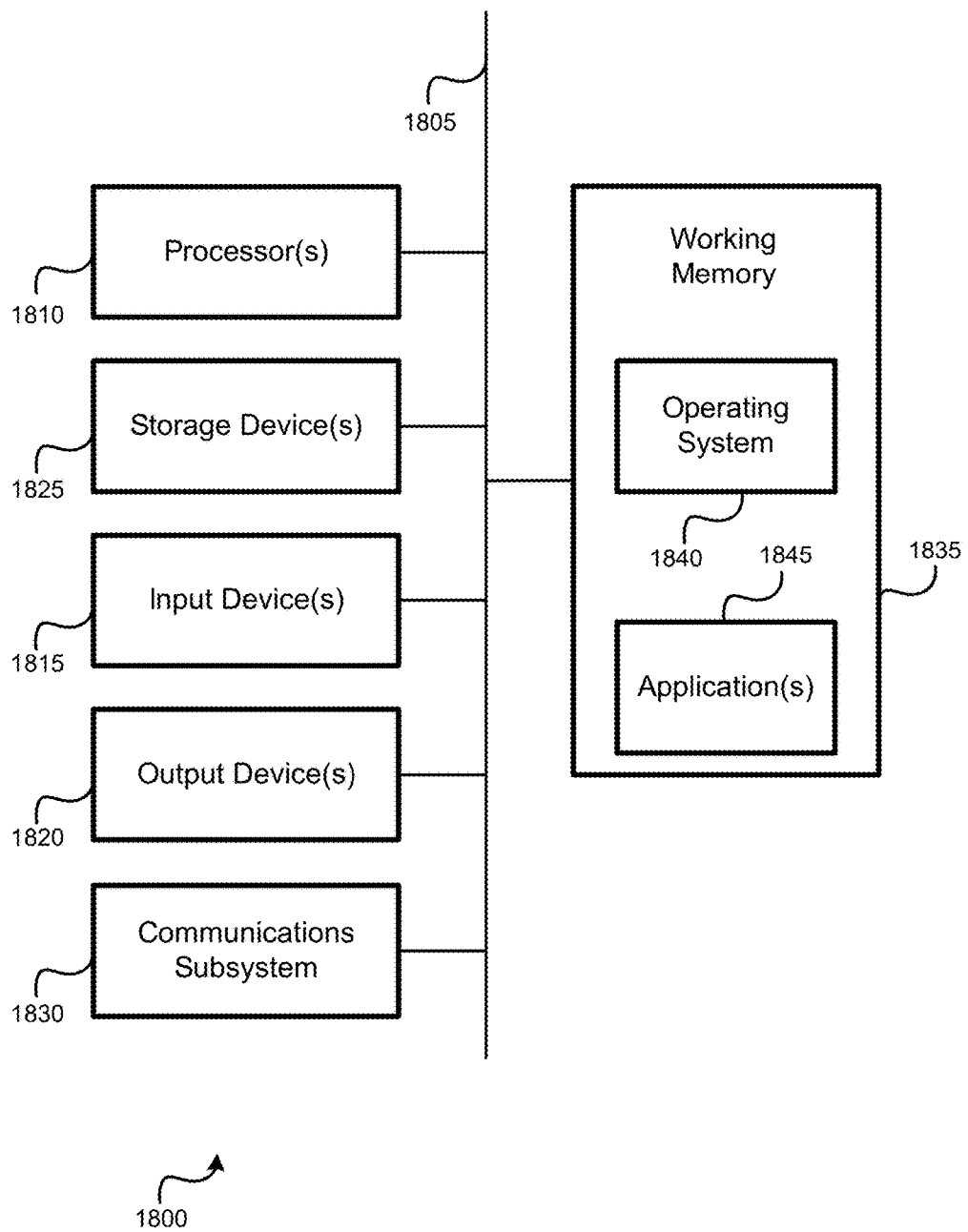
FIG. 18 shows a simplified computer system that may be utilized to perform one or more of the operations discussed.

FIG. 18 illustrates an embodiment of a computer system 1800. A computer system 1800 as illustrated in FIG. 18 may be incorporated into devices such as an STB, a first electronic device, DVR, television, media system, personal computer, and the like. Moreover, some or all of the components of the computer system 1800 may also be incorporated into a portable electronic device, mobile phone, or other device as described herein. FIG. 18 provides a schematic illustration of one embodiment of a computer system 1800 that can perform some or all of the steps of the methods provided by various embodiments. It should be noted that FIG. 18 is meant only to provide a generalized illustration of various components, any or all of which may be utilized as appropriate. FIG. 18, therefore, broadly illustrates how individual system elements may be implemented in a relatively separated or relatively more integrated manner.

The computer system 1800 is shown comprising hardware elements that can be electrically coupled via a bus 1805, or may otherwise be in communication, as appropriate. The hardware elements may include one or more processors 1810, including without limitation one or more general-purpose processors and/or one or more special-purpose processors such as digital signal processing chips, graphics acceleration processors, and/or the like; one or more input devices 1815, which can include without limitation a mouse, a keyboard, a camera, and/or the like; and one or more output devices 1820, which can include without limitation a display device, a printer, and/or the like.

The computer system 1800 may further include and/or be in communication with one or more non-transitory storage devices 1825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1800 might also include a communications subsystem 1830, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1830 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1830. In other embodiments, a portable electronic device, e.g. the first electronic device, may be incorporated into the computer system 1800, e.g., an electronic device or STB, as an input device 1815. In many embodiments, the computer system 1800 will further comprise a working memory 1835, which can include a RAM or ROM device, as described above.

The computer system 1800 also can include software elements, shown as being currently located within the working memory 1835, including an operating system 1840, device drivers, executable libraries, and/or other code, such as one or more application programs 1845, which may comprise computer programs provided by various embodiments, and/or may be designed to implement methods, and/or configure systems, provided by other embodiments, as described herein. Merely by way of example, one or more procedures described with respect to the methods discussed above might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 1825 described above. In some cases, the storage medium might be incorporated within a computer system, such as computer system 1800. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1800 and/or might take the form of source and/or installable code, which, upon compilation and/or installation on the computer system 1800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1800 to perform methods in accordance with various embodiments of the technology. According to a set of embodiments, some or all of the procedures of such methods are performed by the computer system 1800 in response to processor 1810 executing one or more sequences of one or more instructions, which might be incorporated into the operating system 1840 and/or other code, such as an application program 1845, contained in the working memory 1835. Such instructions may be read into the working memory 1835 from another computer-readable medium, such as one or more of the storage device(s) 1825. Merely by way of example, execution of the sequences of instructions contained in the working memory 1835 might cause the processor(s) 1810 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1800, various computer-readable media might be involved in providing instructions/code to processor(s) 1810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1825. Volatile media include, without limitation, dynamic memory, such as the working memory 1835.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1800.

The communications subsystem 1830 and/or components thereof generally will receive signals, and the bus 1805 then might carry the signals and/or the data, instructions, etc. carried by the signals to the working memory 1835, from which the processor(s) 1810 retrieves and executes the instructions. The instructions received by the working memory 1835 may optionally be stored on a non-transitory storage device 1825 either before or after execution by the processor(s) 1810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A computer-implemented method, the method comprising:
    receiving, at a television receiver, an input from a user including a set of preferences associated with a home automation system, wherein the set of preferences includes a weight associated with a first home automation device in a first location and a weight associated with a second home automation device in a second location;
    generating, by the television receiver, a user profile using the set of preferences, wherein the user profile includes settings associated with a user and the home automation system, and wherein the profile includes home automation settings associated with the first home automation device and home automation settings associated with the second home automation device;
    communicating, by the television receiver, with the first home automation device to determine that a mobile device associated with the user is located in the first location;
    transmitting, by the television receiver, the user profile to the mobile device associated with the user, wherein when the user profile is received, the mobile device communicates with the first home automation device to apply, using the weight associated with the first home automation device and the weight associated with the second home automation device, the home automation settings associated with the first home automation device to the first home automation device;
    determining, by the second home automation device, that the mobile device has moved from the first location to the second location using data collected by the second home automation device;
    determining, at the television receiver, that the mobile device has been at the second location for a period of time;
    determining, by the television receiver, that the period of time exceeds a predetermined threshold period of time;
    automatically determining, using the data collected by the second home automation device, an updated weight associated with the first home automation device, an updated weight associated with the second home automation device, and an updated threshold period of time, wherein the data collected by the second home automation device is associated with one or more actions taken by the user in the second location; and
    in response to determining that the period of time exceeds the updated threshold period of time, applying, using the updated weight associated with the first home automation device and the updated weight associated with the second home automation device, the home automation settings associated with the second home automation device to the second home automation device.

2. The method of claim 1, further comprising:
    updating the user profile based on the data collected by the second home automation device.

3. The method of claim 1, wherein the data indicating that the mobile device has moved from the first location to the second location includes data corresponding to communications between the mobile device and the first and second home automation devices.

4. The method of claim 1, further comprising:
    transmitting, by the television receiver, the user profile to a second television receiver, wherein the television receiver and second television receiver are connected to two different networks and are located in two different structures.

5. The method of claim 1, further comprising:
    receiving updated data indicating one or more characteristics of the user;
    updating the user profile using the received updated data; and
    applying the settings of the updated user profile to the home automation system.

6. The method of claim 1, further comprising:
    identifying the user as one of a stored list of users associated with the home automation system;
    retrieving a stored user profile associated with the user;

updating the stored user profile with the received stored user profile; and storing the updated user profile.

7. The method of claim 1, wherein determining a location of the mobile device includes using one or more devices of the home automation system, wherein the one or more devices includes a video camera, a microphone, or a motion detector.

8. The method of claim 1, further comprising:

receiving data associated with a home automation device in a room of a structure, wherein the home automation device is part of the home automation system and the home automation system is in the structure;

determining that the data associated with a home automation device in the room is associated with the user; and determining a location of the user in the room using the data associated with a home automation device.

9. A television receiver, comprising:

one or more processors;

a wireless transceiver communicatively coupled to the one or more processors;

a non-transitory computer readable storage medium communicatively coupled to the one or more processors, wherein the non-transitory computer readable storage medium includes instructions that, when executed by the one or more processors, cause the one or more processors to perform operations including:

receiving, at a television receiver, an input from a user including a set of preferences associated with a home automation system, wherein the set of preferences includes a weight associated with a first home automation device in a first location and a weight associated with a second home automation device in a second location;

generating, by the television receiver, a user profile using the set of preferences, wherein the user profile includes settings associated with a user and the home automation system, and wherein the profile includes home automation settings associated with the first home automation device and home automation settings associated with the second home automation device;

communicating, by the television receiver, with the first home automation device to determine that a mobile device associated with the user is located in the first location;

transmitting, by the television receiver, the user profile to the mobile device associated with the user, wherein when the user profile is received, the mobile device communicates with the first home automation device to apply, using the weight associated with the first home automation device and the weight associated with the second home automation device, the home automation settings associated with the first home automation device to the first home automation device;

determining, by the second home automation device, that the mobile device has moved from the first location to the second location using data collected by the second home automation device;

determining, at the television receiver, that the mobile device has been at the second location for a period of time;

determining, by the television receiver, that the period of time exceeds a predetermined threshold period of time;

automatically determining, using the data collected by the second home automation device, an updated weight associated with the first home automation device, an updated weight associated with the second home automation device, and an updated threshold period of time, wherein the data collected by the second home automation device is associated with one or more actions taken by the user in the second location; and in response to determining that the period of time exceeds the updated threshold period of time, applying, using the updated weight associated with the first home automation device and the updated weight associated with the second home automation device, the home automation settings associated with the second home automation device to the second home automation device.

10. The television receiver of claim 9, wherein the operations further include:

updating the user profile based on the data collected by the second home automation device.

11. The television receiver of claim 9, wherein the data indicating that the mobile device has moved from the first location to the second location includes data corresponding to communications between the mobile device and the first and second home automation devices.

12. The television receiver of claim 9, wherein the operations further include:

transmitting, by the television receiver, the user profile to a second television receiver, wherein the television receiver and second television receiver are connected to two different networks and are located in two different structures.

13. The television receiver of claim 9, wherein the operations further include:

receiving updated data indicating one or more characteristics of the user;

updating the user profile using the received updated data; and applying the settings of the updated user profile to the home automation system.

14. The television receiver of claim 9, wherein the operations further include:

identifying the user as one of a stored list of users associated with the home automation system;

retrieving a stored user profile associated with the user;

updating the stored user profile with the received stored user profile; and storing the updated user profile.

15. The television receiver of claim 9, wherein determining a location of the mobile device includes using one or more devices of the home automation system, wherein the one or more devices includes a video camera, a microphone, or a motion detector.

16. The television receiver of claim 9, wherein the operations further include:

receiving data associated with a home automation device in a room of a structure, wherein the home automation device is part of the home automation system and the home automation system is in the structure;

determining that the data associated with a home automation device in the room is associated with the user; and determining a location of the user in the room using the data associated with a home automation device.

17. A non-transitory computer readable medium comprising instructions that, when executed by one or more processors, cause the one or more processors to perform operations including:
- receiving, at a television receiver, an input from a user including a set of preferences associated with a home automation system, wherein the set of preferences includes a weight associated with a first home automation device in a first location and a weight associated with a second home automation device in a second location;
- generating, by the television receiver, a user profile using the set of preferences, wherein the user profile includes settings associated with a user and the home automation system, and wherein the profile includes home automation settings associated with the first home automation device and home automation settings associated with the second home automation device;
- communicating, by the television receiver, with the first home automation device to determine that a mobile device associated with the user is located in the first location;
- transmitting, by the television receiver, the user profile to the mobile device associated with the user, wherein when the user profile is received, the mobile device communicates with the first home automation device to apply, using the weight associated with the first home automation device and the weight associated with the second home automation device, the home automation settings associated with the first home automation device to the first home automation device;
- determining, by the second home automation device, that the mobile device has moved from the first location to the second location using data collected by the second home automation device;
- determining, at the television receiver, that the mobile device has been at the second location for a period of time;
- determining, by the television receiver, that the period of time exceeds a predetermined threshold period of time;
- automatically determining, using the data collected by the second home automation device, an updated weight associated with the first home automation device, an updated weight associated with the second home automation device, and an updated threshold period of time, wherein the data collected by the second home automation device is associated with one or more actions taken by the user in the second location; and
- in response to determining that the period of time exceeds the updated threshold period of time, applying, using the updated weight associated with the first home automation device and the updated weight associated with the second home automation device, the home automation settings associated with the second home automation device to the second home automation device.

18. The non-transitory computer readable medium of claim 17, wherein detecting the wireless signal further includes:
- receiving data associated with a home automation device in a room of a structure, wherein the home automation device is part of the home automation system and the home automation system is in the structure;
- determining that the data associated with a home automation device in the room is associated with the user; and
- determining a location of the user in the room using the data associated with a home automation device.

* * * * *